(12) United States Patent
Aizawa et al.

(10) Patent No.: US 7,740,995 B2
(45) Date of Patent: Jun. 22, 2010

(54) AZO COMPOUND, COLORED CURABLE COMPOSITION, COLOR FILTER AND MANUFACTURING METHOD THEREFOR

(75) Inventors: Taeko Aizawa, Shizuoka-ken (JP); Yuki Mizukawa, Kanagawa (JP); Nobuo Seto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 998 days.

(21) Appl. No.: 11/494,610

(22) Filed: Jul. 28, 2006

(65) Prior Publication Data
US 2007/0037076 A1  Feb. 15, 2007

(30) Foreign Application Priority Data

Jul. 29, 2005 (JP) ............... 2005-222121
Jul. 29, 2005 (JP) ............... 2005-222168

(51) Int. Cl.
C09B 29/36 (2006.01)
G02B 5/20 (2006.01)

(52) U.S. Cl. ............ 430/7; 430/270.1; 430/281.1; 430/287.1; 544/324

(58) Field of Classification Search ............... None
See application file for complete search history.

(56) References Cited

U.S. PATENT DOCUMENTS

| 2005/0042530 | A1* | 2/2005 | Kato et al. ............. 430/7 |
| 2005/0175908 | A1* | 8/2005 | Seto et al. ............. 430/7 |
| 2006/0009357 | A1* | 1/2006 | Fujiwara et al. .......... 503/227 |

FOREIGN PATENT DOCUMENTS

| JP | 9-234964 A | 9/1997 |
| JP | 9-277703 A | 10/1997 |
| JP | 2002-14221 A | 1/2002 |
| JP | 2003-246942 A | 9/2003 |
| JP | 2005-99677 A | 4/2005 |

* cited by examiner

Primary Examiner—John A. McPherson
(74) Attorney, Agent, or Firm—Sughrue Mion, PLLC

(57) ABSTRACT

A pyrimidine azo compound represented by the following formula (I), or a tautomer thereof:

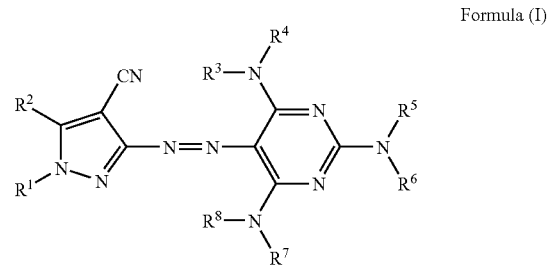

Formula (I)

wherein in formula (I), $R^1$ represents a heterocyclic group, and $R^2$ represents a hydrogen atom or a substituent; $R^3$, $R^4$, $R^5$, $R^6$, $R^7$, and $R^8$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; and $R^3$ and $R^4$, $R^5$ and $R^6$; and $R^7$ and $R^8$ may be mutually bonded to form a 5-, 6-, or 7-membered ring.

16 Claims, No Drawings

AZO COMPOUND, COLORED CURABLE COMPOSITION, COLOR FILTER AND MANUFACTURING METHOD THEREFOR

CROSS-REFERENCE TO RELATED APPLICATION

This application claims priority under 35 USC 119 from Japanese patent Application Nos. 2005-222121 and 2005-222168, the disclosures of which are incorporated by reference herein.

BACKGROUND OF THE INVENTION

1. Field of the Invention

The present invention relates to a novel azo compound which is useful as an azo dye, a colored curable composition which is suitable for forming a color filter for use in a liquid crystal display (LCD) or a solid-state image sensor (such as a CCD and CMOS), a color filter utilizing such colored curable composition, and a manufacturing method therefor.

2. Description of the Related Art

Conventionally, azo dyes, showing optical absorption in various visible regions, have been utilized in various fields as dyes. Azo dyes have been utilized in various fields, such as a colorant for synthetic resin, a printing ink, a dye for a sublimation-type heat transfer material, an inkjet ink, and a dye for a color filter. One of the major performances required for an azo dye as a dye is an absorption spectrum. A color hue of a dye gives a significant influence on the color, texture, or the like of an article colored with such dye, and provides a significant visual effect. Consequently, the absorption spectra of dyes have been researched for many years. An outline is shown in J. Fabian and H. Hartmann "Light Absorption of Organic Colorants" (Springer-Verlag, Berlin, 1980), and the detailed description is shown in Heinrich Zollinger "Color Chemistry" (Weinheim, New York, Basel, Cambridge) and Hiroshi Noguchi "Gosei Senryo" (Sankyo Shuppan, 1970), respectively in the chapters for azo dyes or azo pigments.

Recently, color images have become the main stream as image recording materials, and applications of dyes have been more diversified. Specifically, dyes are frequently employed in an ink jet-type recording material, a thermal transfer-type recording material, an electrophotographic recording material, a transfer-type silver halide photosensitive material, a printing ink, and the like. Moreover, color filters are utilized for recording or reproducing a color image, in an imager such as a CCD for use in image pickup equipment, and in displays such as an LCD or a PDP. Furthermore, dyes are also utilized for coloring matters and hair dying. In these color image recording material or color filters, there are employed colorants (dyes or pigment) of three primary colors in so-called an additive or subtractive color mixing method, in order to reproduce or record a full-color image. However, at present, there is no colorant having; an absorption characteristic capable of realizing a preferred color reproduction range, capable of withstanding various conditions of use and environmental conditions, and having satisfactory color hues and satisfactory resistances. Improvements are therefore being strongly desired.

These colorants used in such respective applications are commonly required to have a preferable absorption characteristic in terms of color reproduction, resistance under environmental conditions where they are used, and a large molar absorption coefficient.

Conventionally, azo dyes having a nitrogen-containing 5-membered ring as an azo component have been disclosed in Japanese Patent Application Laid-Open (JP-A) No. 55-161856, Japanese Patent Application Laid-Open No. 6-145543, Japanese Patent Application Laid-Open No. 7-224230, Japanese Patent Application Laid-Open No. 9-234964, Japanese Patent Application Laid-Open No. 9-277703, and Japanese Patent Application Laid-Open No. 2003-246942. However, they are not satisfactory in terms of color hue, resistance, and molar absorption coefficient. Moreover a method of synthesizing a 5-membered heterocyclic azo dye is disclosed in the Journal of Heterocyclic Chemistry, Vol. 22, pp. 813-816 (1985) but this does not provide an azo dye satisfactory in terms of color hue, spectral absorption coefficient, and the like.

As a color filter to be formed on a device for realizing a color structure in a solid-state image sensor or a liquid crystal display, there is known a color filter comprising a yellow filter layer, a magenta filter layer, and a cyan filter layer, and a color filter comprising a red filter layer, a green filter layer, and a blue filter layer, in which such filter layers are formed in an adjacent manner in the same plane on a substrate. In these filter layers are formed a striped pattern or a mosaic pattern. As a manufacturing method of a color filter, there have been proposed various methods. Among these, a so-called color resist method is widely practiced, in which a patterning step for exposing and developing a dye-containing a photosensitive resinous composition, is repeated for a necessary number of times.

The color resist method is a method (hereunder, also called "pigment dispersion method") of producing a color filter by a photolithographic method utilizing colored radiation-sensitive compositions in which pigments are dispersed in various photosensitive compositions. This method is suitable for producing a color filter for a color display of a large size or a high definition, since it can provide high stability against light and heat because of the use of pigments, and it can provide a sufficient positional precision by photolithographic patterning.

In order to produce a color filter by the pigment dispersion method, a radiation-sensitive composition is coated on a glass substrate by a spin coater or a roll coater to form a coated film, which is then pattern exposed and developed to obtain colored pixels. By performing such operation for each color, the color filter can be obtained. As the pigment dispersion method, there is disclosed a negative-type photosensitive composition utilizing a photopolymerizable monomer and a photopolymerization initiator in combination with an alkali-soluble resin (for example, refer to Japanese Patent Application Laid-Open No. H1-102469, Japanese Patent Application Laid-Open No. 1-152499, Japanese Patent Application Laid-Open No. 2-181704, Japanese Patent Application Laid-Open No. 2-199403, Japanese Patent Application Laid-Open No. 4-76062, Japanese Patent Application Laid-Open No. 5-273411, Japanese Patent Application Laid-Open No. 6-184482, and Japanese Patent Application Laid-Open No. 7-140654).

However, recently, a higher definition is desired for color filters for use in solid-state image sensors. However, the conventional pigment dispersion system is incapable of improving the resolution, has a problem of causing an unevenness in color due to coarse pigment particles, and therefore is unsuitable for an application requiring a fine pattern such as a solid-state image sensor. In order to solve this problem, it has been conventionally proposed to use a dye, and a positive-type photosensitive composition using a dye has been disclosed (for example, refer to Japanese Patent Application Laid-Open No. 6-75375, Japanese Patent Application Laid-Open No. 2002-14221, and Japanese Patent Publication (JP-B) No. 7-111485).

However, a colored curable composition containing a dye has the following problems and further improvements are desired.

(1) A dye is generally inferior in heat resistance and light resistance to a pigment, and thus further improvements in the resistances are required.

(2) In a case where a dye has a low molar absorption coefficient, it is required to add a large amount of the dye, and thus other components in the colored curable composition, such as a polymerizable compound, a binder, and a photopolymerization initiator, have to be decreased. Therefore, there are desired improvements in problems such as the decrease in; a curing property of the composition, heat resistance after curing, or developability of an uncured area.

(3) A dye often shows an interaction with other components in the curable composition, and thus it is difficult to regulate the developability (solubility) of a cured area and an uncured area. Therefore, there are also desired improvements in this point.

In this manner, dyes that have been conventionally employed in the photosensitive composition are not satisfactory particularly in the resistance, and, having a low solubility in the photosensitive composition, cannot be easily contained at a high concentration. Therefore, there are desired improvements in these points.

On the other hand, it is known to use a yellow dye in green and red filter arrays of a color filter (for example, refer to Japanese Patent Application Laid-Open No. 2002-14222). However, the yellow dye used for this color filter is insufficient in heat resistance and light resistance. Similarly in a color filter comprising a yellow filter layer, a magenta filter layer, and a cyan filter layer, there is desired a further improvement in resistance in the yellow dye used for the yellow filter layer.

As described above, a dye containing a curable composition is useful in applications requiring a high definition and a uniformity of color such as a solid-state image sensor, however is still incapable of achieving an excellent color hue nor stably maintaining a color concentration and a color hue of the dye, due to fading or the like, and it has been a task to improve resistances such as heat resistance and light resistance in dyes, particularly in yellow dyes. Moreover, it has been one of the tasks to improve the low stability with time of a liquid preparation or a coated film resulting from the low solubility of dyes. Furthermore, it has been also one of the tasks to improve the pattern rectangularity for forming a pattern, and to suppress the situation where films remain in areas other than a desired area for pattern formation (so called "residual film").

SUMMARY OF THE INVENTION

The present invention takes the above problems into consideration, and provides an azo compound, a colored curable composition, a color filter, and a manufacturing method therefor.

The present inventors have earnestly studied and found that a specific nitrogen-containing heterocyclic azo dye has a satisfactory color hue and exhibits satisfactory resistance to heat and light.

A first aspect of the present invention provides a pyrimidine azo compound represented by the following formula (I), or a tautomer thereof:

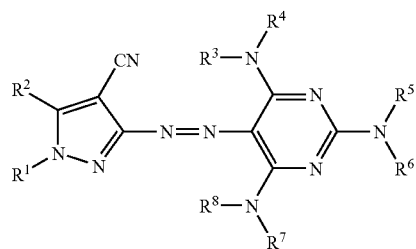

Formula (I)

where, in the formula (I), $R^1$ represents a heterocyclic group, and $R^2$ represents a hydrogen atom or a substituent; $R^3$, $R^4$, $R^5$, $R^6$, $R^7$, and $R^8$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; and $R^3$ and $R^4$, $R^5$ and $R^6$, and $R^7$ and $R^8$ may be mutually bonded to form a 5-, 6-, or 7-membered ring.

Moreover, as a result of detailed research on various dye compounds having a satisfactory color hue, a satisfactory heat resistance and light resistance, a superior preservation stability, and a satisfactory pattern forming property, it was found that a pyridine azo dye having a specific heterocycle as a substituent is particularly useful in improving resistance such as the heat resistance and light resistance, and furthermore superior in the pattern forming property.

A second aspect of the present invention provides a colored curable composition comprising a dye represented by the following formula (V):

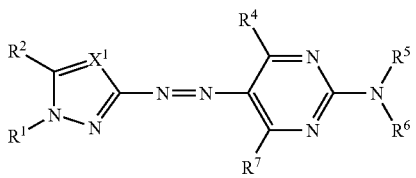

Formula (V)

where, in the formula, $R^1$ represents a heterocyclic group, and $R^2$ represents a hydrogen atom or a substituent; $X^1$ represents —N═, or —C($R^3$)═, and $R^3$ represents a hydrogen atom or a substituent. If $X^1$ is —C($R^3$)═, $R^2$ and $R^3$ may be mutually bonded to form a 5-, 6-, or 7-membered ring; $R^4$ represents a hydrogen atom or a substituent; $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; $R^5$ and $R^6$ may be mutually bonded to form a 5-, 6-, or 7-membered ring; and $R^7$ represents a hydrogen atom or a substituent.

A third aspect of the present invention provides a colored curable composition comprising a dye represented by the following formula (II):

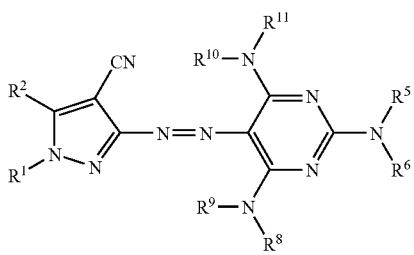

Formula (II)

where, in the formula, $R^1$ represents a heterocyclic group, and $R^2$ represents a hydrogen atom or a substituent; $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; $R^5$ and $R^6$ may be mutually bonded to form a 5-, 6-, or 7-membered ring; $R^8$, $R^9$, $R^{10}$, and $R^{11}$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; and $R^5$ and $R^6$, $R^8$ and $R^9$, and $R^{10}$ and $R^{11}$ may be mutually bonded to form a 5-, 6-, or 7-membered ring.

A fourth aspect of the present invention is a positive-type colored curable composition comprising a dye represented by the formula (V), a photosensitizer, and a solvent.

A fifth aspect of the present invention provides a color filter comprising a color layer containing at least one type of the aforementioned colored curable compositions.

A sixth aspect of the present invention provides a method of manufacturing a color filter, comprising: coating any one of the aforementioned colored curable compositions on a substrate, so as to form a color layer; and pattern exposing the color layer to light through a mask, and developing it, so as to form a colored pattern.

This manufacturing method may comprise curing the pattern by means of heating and/or exposing as required, and these operations may be repeated for a plurality of times.

Moreover, these dyes may be changed to form a color filter having a plurality of colors.

DESCRIPTION OF THE PRESENT INVENTION

Hereunder is a detailed description of the present invention.

The "heterocyclic group" in the present specification has one or more hetero ring(s) having a hetero atom (such as a nitrogen atom, a sulfur atom, and an oxygen atom) in the ring structure. It may be a saturated ring or an unsaturated ring, may be a single ring or condensed rings, and may be non-substituted or substituted. Examples thereof include a tetrahydrofuranyl group, a dihydrofuranyl group, a dihydrofuranyl group, a tetrahydropyranyl group, a dihydropyranyl group, an oxocanyl group, a dioxanyl group, a tetrahydrothiophenyl group, a dithienyl group, a pyrrolidinyl group, a pyrrolinyl group, a tetrahydropyridinyl group, a piperazinyl group, a homopiperazinyl group, a piperidinyl group, a pyrrolyl group, a furyl group, a thiophenyl group, a benzopyrrolyl group, a benzofuryl group, a benzothiophenyl group, a pyrazolyl group, an isoxazolyl group, an isothiazolyl group, an indazolyl group, a benzoisoxazolyl group, a benzoisothiazolyl group, an imidazolyl group, an oxazolyl group, a thiazolyl group, a benzoimidazolyl group, a benzooxazolyl group, a benzothiazolyl group, a pyridyl group, a quinolinyl group, an isoquinolinyl group, a pyridazinyl group, a pyrimidinyl group, a pyrazinyl group, a cinnolyl group, a phthalazinyl group, a quinazolinyl group, a quinoxalinyl group, an acridinyl group, a phenanthridinyl group, a phthalazinyl group, a carbazolyl group, an uracil group, a dithiouracil group, a carbolinyl group, a purinyl group, and a thiadiazolyl group. They may be non-substituted or substituted.

Moreover, the "substituent" in the present specification may be any substitutable group. Examples thereof include an alkyl group, an alkenyl group, an alkynyl group, an aryl group, a heterocyclic group, an acyl group, an acyloxy group, an acylamino group, an alkyloxy group, an alkenyloxy group, an alkynyloxy group, an aryloxy group, a heterocyclic oxy group, an alkyloxycarbonyl group, an alkenyloxycarbonyl group, an alkynyloxycarbonyl group, an aryloxycarbonyl group, a heterocyclic oxycarbonyl group, a carbamoyl group, an alkylsulphonyl group, an alkenylsulfonyl group, an alkynylsulfonyl group, an arylsulphonyl group, a heterocyclic sulfonyl group, an alkylsulfonyloxy group, an alkenylsulfonyloxy group, an alkynylsulfonyloxy group, an arylsulfonyloxy group, a heterocyclic sulfonyloxy group, a sulfamoyl group, an alkylsulfonamide group, an alkenylsulfonamide group, an alkynylsulfonamide group, an arylsulfonamide group, a heterocyclic sulfonamide group, an amino group, an alkylamino group, an alkenylamino group, an alkynylamino group, an arylamino group, a heterocyclic amino group, an alkyloxycarbonylamino group, an alkenyloxycarbonylamino group, an alkynyloxycarbonylamino group, an aryloxycarbonylamino group, a heterocyclic oxycarbonylamino group, an alkylsulfinyl group, an alkenylsulfinyl group, an alkynylsulfinyl group, an arylsulfinyl group, an alkylthio group, an alkenylthio group, an alkynylthio group, an arylthio group, a hydroxy group, a cyano group, a sulfo group, a carboxyl group, an alkyloxyamino group, an alkenyloxyamino group, an alkynyloxyamino group, an aryloxyamino group, a carbamoylamino group, a sulfamoylamino group, a halogen atom, a sulfamoylcarbamoyl group, a carbamoylsulfamoyl group, a dialkyloxyphosphinyl group, a dialkenyloxyphosphinyl group, a dialkynyloxyphosphinyl group, and a diaryloxyphosphinyl group.

Furthermore, the "aryl group" in the present specification may be a single ring or condensed rings, and may be non-substituted or have one or more substitutent(s) (substituent described above) (if it has two or more substituents, these substituents may be the same or different).

Hereunder is a detailed description of the compound represented by the formula (I) of the present invention.

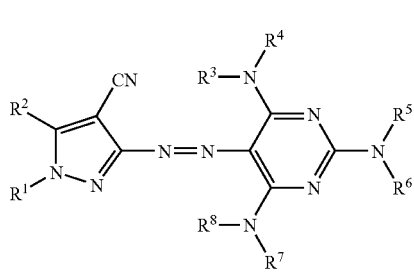

Formula (I)

In the formula, $R^1$ represents a heterocyclic group, preferably a heterocyclic group having 1 to 36 carbon atoms, and more preferably a heterocyclic group having 2 to 24 carbon atoms. Preferred examples thereof include a pyrrolyl group, a furyl group, a thiophenyl group, a benzopyrrolyl group, a benzofuryl group, a benzothiophenyl group, a pyrazolyl group, an isoxazolyl group, an isothiazolyl group, an indazolyl group, a benzoisoxazolyl group, a benzoisothiazolyl group, an imidazolyl group, an oxazolyl group, a thiazolyl group, a benzoimidazolyl group, a benzooxazolyl group, a benzothiazolyl group, a pyridyl group, a quinolinyl group, an isoquinolinyl group, a pyridazinyl group, a pyrimidinyl group, a pyrazinyl group, a cinnolyl group, a phthalazinyl group, a quinazolinyl group, a quinoxalinyl group, an acridinyl group, a phenanthridinyl group, a phthalazinyl group, a carbazolyl group, a carbolinyl group, a purinyl group, a triazolyl group, an oxadiazolyl group, and a thiadiazolyl group. Further preferred examples thereof include a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 2-pyridyl group, a 3-pyridyl group, a 4-pyridyl group, a 2-quinolinyl group, a 4-quinolinyl group, a 1-isoquinolinyl group, a 3-isoquinolinyl group, a 3-pyridazinyl group, a 4-pyridazinyl group, a 2-pyrimidinyl group, a 4-pyrimidinyl group, a 5-pyrimidinyl group, a 2-pyrazinyl group, a 2-purinyl group, a 6-purinyl group, a 8-purinyl group, a 3-triazolyl group, a 5-triazolyl group, a 3-oxadiazolyl group, a 5-oxadiazolyl group, a 3-thiadiazolyl group, and a 5-thiadiazolyl group.

If the heterocyclic group of $R^1$ is a substitutable group, it may be substituted by one or more substituent(s) described in the aforementioned paragraph regarding the substituent. If it is substituted by two or more substituents, these substituents may be the same or different. From the point of effectively demonstrating the effect of the present invention, the following groups are suitable. That is, a halogen atom (such as fluorine, chlorine, and bromine), an alkyl group (preferably a linear, branched, or cyclic alkyl group having 1 to 48 carbon atoms, such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamanthyl), an alkenyl group (preferably an alkenyl group having 2 to 48 carbon atoms, such as vinyl, aryl, and 3-butene-1-yl), an aryl group (preferably an aryl group having 6 to 48 carbon atoms, such as phenyl and naphthyl), a heterocyclic group (preferably a heterocyclic group having 1 to 32 carbon atoms, such as 2-thienyl, 4-pyridyl, 2-furyl, 2-pyrimidinyl, 1-pyridyl, 2-benzothiazolyl, 1-imidazolyl, 1-pyrazolyl, and benzotriazole-1-yl), a silyl group (preferably a silyl group having 3 to 38 carbon atoms, such as trimethylsilyl, triethylsilyl, tributylsilyl, t-butyldimethylsilyl, and t-hexyldimethylsilyl), a hydroxyl group, a cyano group, a nitro group, an alkoxy group (preferably an alkoxy group having 1 to 48 carbon atoms, such as methoxy, ethoxy, 1-butoxy, 2-butoxy, isopropoxy, t-butoxy, dodecyloxy, and a cycloalkyloxy group such as cyclopentyloxy and cyclohexyloxy), an aryloxy group (preferably an aryloxy group having 6 to 48 carbon atoms, such as phenoxy and 1-naphthoxy), a heterocyclic oxy group (preferably a heterocyclic oxy group having 1 to 32 carbon atoms, such as 1-phenyltetrazole-5-oxy and 2-tetrahydropyranyloxy), a silyloxy group (preferably a silyloxy group having 1 to 32 carbon atoms, such as trimethylsilyloxy, t-butyldimethylsilyloxy, and diphenylmethylsilyloxy), an acyloxy group (preferably an acyloxy group having 2 to 48 carbon atoms, such as acetoxy pivaloyloxy, benzoyloxy, and dodecanoyloxy), an alkoxycarbonyloxy group (preferably an alkoxycarbonyloxy group having 2 to 48 carbon atoms, such as ethoxycarbonyloxy, t-butoxycarbonyloxy, and a cycloalkyloxycarbonyloxy group e.g., cyclohexyloxycarbonyloxy), an aryloxycarbonyloxy group (preferably an aryloxycarbonyloxy group having 7 to 32 carbon atoms, such as phenoxycarbonyloxy), a carbamoyloxy group (preferably a carbamoyloxy group having 1 to 48 carbon atoms, such as N,N-dimethylcarbamoyloxy, N-butylcarbamoyloxy, N-phenylcarbamoyloxy, and N-ethyl-N-phenylcarbamoyloxy), a sulfamoyloxy group (preferably a sulfamoyloxy group having 1 to 32 carbon atoms, such as N,N-diethylsulfamoyloxy and N-propylsulfamoyloxy), an alkylsulfonyloxy group (preferably an alkylsulfonyloxy group having 1 to 38 carbon atoms, such as methylsulfonyloxy, hexadecylsulfonyloxy, and cyclohexylsulfonyloxy), an arylsulfonyloxy group (preferably an arylsulfonyloxy group having 6 to 32 carbon atoms, such as phenylsulfonyloxy), an acyl group (preferably an acyl group having 1 to 48 carbon atoms, such as formyl, acetyl, pivaloyl, benzoyl, tetradecanoyl, and cyclohexanoyl), an alkoxycarbonyl group (preferably an alkoxycarbonyl group having 2 to 48 carbon atoms, such as methoxycarbonyl, ethoxycarbonyl, octadecyloxycarbonyl, and cyclohexyloxycarbonyl), an aryloxycarbonyl group (preferably an aryloxycarbonyl group having 7 to 32 carbon atoms, such as phenoxycarbonyl), a carbamoyl group (preferably a carbamoyl group having 1 to 48 carbon atoms, such as carbamoyl, N,N-diethylcarbamoyl, N-ethyl-N-octylcarbamoyl, N,N-dibutylcarbamoyl, N-propylcarbamoyl, N-phenylcarbamoyl, N-methyl-N-phenylcarbamoyl, and N,N-dicyclohexylcarbamoyl), an amino group (preferably an amino group having 32 carbon atoms or less, such as amino, methylamino, N,N-dibutylamino, tetradecylamino, 2-ethylhexylamino, and cyclohexylamino), an anilino group (preferably an anilino group having 6 to 32 carbon atoms, such as anilino and N-methylanilino); a heterocyclic amino group (preferably a heterocyclic amino group having 1 to 32 carbon atoms, such as 4-pyridylamino), a carbonamido group (preferably, a carbonamido group having 1 to 32 carbon atoms, such as acetoamido, benzamido, pivaloylamido, cyclohexanamido, adamanthylamino, and 2-ethylhexanamido, except for a perfluoroalkylcarbonylamino group), an ureido group (preferably an ureido group having 1 to 32 carbon atoms, such as ureido, N,N-dimethylureido, and N-phenylureido), an imido group (preferably an imido group having 10 carbon atoms or less, such as N-succinimido and N-phthalimido), an alkoxycarbonylamino group (preferably an alkoxycarbonylamino group having 2 to 48 carbon atoms, such as methoxycarbonylamino, ethoxycarbonylamino, t-butoxycarbonylamino, octadecyloxycarbonylamino, and cyclohexyloxycarbonylamino), an aryloxycarbonylamino group (preferably an aryloxycarbonylamino group having 7 to 32 carbon atoms, such as phenoxycarbonylamino), an azo group (preferably an azo group having 1 to 32 carbon atoms, such as phenylazo and 3-pyrazolylazo), an alkylthio group (preferably an alkylthio group having 1 to 48 carbon atoms, such as methylthio, ethylthio, octylthio, and cyclohexylthio), an arylthio group (preferably an arylthio group having 6 to 48 carbon atoms, such as phenylthio), a heterocyclic thio group (preferably a heterocyclic thio group having 1 to 32 carbon atoms, such as 2-benzothiazolylthio, 2-pyridylthio, and 1-phenyltetrazolylthio), an alkylsulfinyl group (preferably an alkylsulfinyl group having 1 to 32 carbon atoms, such as dodecanesulfinyl), an arylsulfinyl group (preferably an arylsulfinyl group having 6 to 32 carbon atoms, such as phenylsulfinyl), an alkylsulphonyl group (preferably an alkylsulphonyl group having 1 to 48 carbon atoms, such as methylsulfonyl, ethylsulfonyl, propylsulfonyl, butylsulfonyl, isopropylsulfonyl, 2-ethylhexylsulfonyl, hexadecylsulfonyl, octylsulfonyl, and cyclohexylsulfonyl), an arylsulphonyl group (preferably an arylsulphonyl group having 6 to 48 carbon atoms, such as phenylsulfonyl and 1-naphthylsulfonyl), a sulfamoyl group (preferably a sulfamoyl group having 32 carbon atoms or less, such as sulfamoyl, N,N-dipropylsulfamoyl, N-ethyl-N-dodecylsulfamoyl, N-ethyl-N-phenylsulfamoyl, and N-cyclohexylsulfamoyl), a sulfo group, a phosphonyl group (preferably a phosphonyl group having 1 to 32 carbon atoms, such as phenoxyphosphonyl, octyloxyphosphonyl, and phenylphosphonyl), and a phosphinoylamino group (preferably a phosphinoylamino group having 1 to 32 carbon atoms, such as diethoxyphosphinoylamino and dioctyloxyphosphinoylamino).

If these substituents are further substitutable groups, they may be substituted by one or more of the aforementioned substituent(s). If they are substituted by two or more substituents, these substituents may be the same or different.

$R^2$ in the formula (I) represents a hydrogen atom or a substituent. The substituent of $R^2$ is synonymous with a group described in the aforementioned paragraph regarding the substituent.

If the substituent of $R^2$ is a further substitutable group, it may be substituted by one or more substituent(s) described in the aforementioned paragraph regarding the substituent. If it is substituted by two or more substituents, these substituents may be the same or different.

From the point of effectively demonstrating the effect of the present invention, the following groups are suitable for $R^2$.

That is, $R^2$ is preferably a hydrogen atom, an alkyl group, an alkenyl group, an alkynyl group, an aryl group, an acyloxy group, an acylamino group, an alkyloxy group, an alkenyloxy group, an alkynyloxy group, an alkylsulfonyloxy group, an alkenylsulfonyloxy group, an alkynylsulfonyloxy group, an arylsulfonyloxy group, an alkylsulfonamide group, an alkenylsulfonamide group, an alkynylsulfonamide group, an arylsulfonamide group, an amino group, an alkylamino group, an alkenylamino group, an alkynylamino group, an arylamino group, an alkyloxycarbonylamino group, an alkenyloxycarbonylamino group, an alkynyloxycarbonylamino group, an aryloxycarbonylamino group, a heterocyclic oxycarbonylamino group, a hydroxy group, a cyano group, a sulfo group, a carbamoylamino group, or a sulfamoylamino group, more preferably a hydrogen atom, an alkyl group, an alkenyl group, an alkynyl group, a cyano group, an aryl group, an acyloxy group, an alkyloxy group, an alkenyloxy group, an alkynyloxy group, an alkylsulfonyloxy group, an alkenylsulfonyloxy group, or an alkynylsulfonyloxy group, and most preferably a hydrogen atom, an alkyl group, an alkenyl group, an alkynyl group, or a cyano group.

The $R^3$, $R^4$, $R^5$, $R^6$, $R^7$ and $R^8$ each independently represent a hydrogen atom, an alkyl group, an alkenyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group.

If $R^3$, $R^4$, $R^5$, $R^6$, $R^7$ or $R^8$ is a substitutable group, it may have one or more substituent(s) described in the aforementioned paragraph regarding the "substituent". If it has two or more substituents, these substituents may be the same or different. Moreover, $R^3$ and $R^4$, $R^5$ and $R^6$, and $R^7$ and $R^8$ may be mutually bonded to form a 5-, 6-, or 7-membered ring. From the point of effectively demonstrating the effect of the present invention, $R^3$, $R^4$, $R^5$, $R^6$, $R^7$ and $R^8$ preferably represents a hydrogen atom, an alkyl group, an alkenyl group, an aryl group, a heterocyclic group, an acyl group, a carbamoyl group, an alkylsulphonyl group, an arylsulphonyl group, or a sulfamoyl group, more preferably a hydrogen atom, an alkyl group, an alkenyl group, an aryl group, a heterocyclic group, an alkylsulphonyl group, or an arylsulphonyl group, and most preferably a hydrogen atom, an alkyl group, an aryl group, a heterocyclic group, or an alkylsulphonyl group.

From the point of effectively demonstrating the effect of the present invention, $R^3$, $R^4$, $R^5$, $R^6$, $R^7$ and $R^8$ preferably represents a hydrogen atom, an alkyl group, an alkenyl group, an aryl group, a heterocyclic group, an acyl group, a carbamoyl group, an alkylsulphonyl group, an arylsulphonyl group, or a sulfamoyl group, more preferably a hydrogen atom, an alkyl group, an alkenyl group, an aryl group, a heterocyclic group, an alkylsulphonyl group, or an arylsulphonyl group, and most preferably a hydrogen atom, an alkyl group, an aryl group, a heterocyclic group, or an alkylsulphonyl group.

More preferably, examples of dye are such that in the formula (I), $R^1$ represents a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 2-pyridyl group, a 3-pyridyl group, a 4-pyridyl group, a 2-quinolinyl group, a 4-quinolinyl group, a 1-isoquinolinyl group, a 3-isoquinolinyl group, a 3-pyridazinyl group, a 4-pyridazinyl group, a 2-pyrimidinyl group, a 4-pyrimidinyl group, a 5-pyrimidinyl group, a 2-pyrazinyl group, a 2-purinyl group, a 6-purinyl group, a 8-purinyl group, a 3-triazolyl group, a 5-triazolyl group, a 3-oxadiazolyl group, a 5-oxadiazolyl group, a 3-thiadiazolyl group, or a 5-thiadiazolyl group, $R^2$ represents a hydrogen atom, an alkyl group, an alkenyl group, an alkynyl group, a cyano group, an aryl group, an acyloxy group, an alkyloxy group, an alkenyloxy group, an alkynyloxy group, an alkylsulfonyloxy group, an alkenylsulfonyloxy group, or an alkynylsulfonyloxy group, and $R^3$, $R^4$, $R^5$, $R^6$, $R^7$ and $R^8$ represent a hydrogen atom, an alkyl group, an alkenyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group.

Even more preferably, examples of dye are such that in the formula (I), $R^1$ represents a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 2-pyridyl group, a 3-pyridyl group, a 4-pyridyl group, a 2-quinolinyl group, a 4-quinolinyl group, a 1-isoquinolinyl group, a 3-isoquinolinyl group, a 3-pyridazinyl group, a 4-pyridazinyl group, a 2-pyrimidinyl group, a 4-pyrimidinyl group, a 5-pyrimidinyl group, a 2-pyrazinyl group, a 2-purinyl group, a 6-purinyl group, a 8-purinyl group, a 3-triazolyl group, a 5-triazolyl group, a 3-oxadiazolyl group, a 5-oxadiazolyl group, a 3-thiadiazolyl group, or a 5-thiadiazolyl group, $R^2$ represents a hydrogen atom, an alkyl group, an alkenyl group, a cyano group, an acyloxy group, an alkyloxy group, or an alkylsulfonyloxy group, and $R^3$, $R^4$, $R^5$, $R^6$, $R^7$ and $R^8$ represent a hydrogen atom, an alkyl group, an alkenyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group.

Most preferably, examples of dye are such that in the formula (I), $R^1$ represents a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 3-pyridazinyl group, a 4-pyridazinyl group, a 2-pyrimidinyl group, a 4-pyrimidinyl group, a 5-pyrimidinyl group, a 2-pyrazinyl group, a 3-triazolyl group, a 5-triazolyl group, a 3-oxadiazolyl group, a 5-oxadiazolyl group, a 3-thiadiazolyl group, or a 5-thiadiazolyl group, $R^2$ represents a hydrogen atom, an alkyl group, or a cyano group, and $R^3$, $R^4$, $R^5$, $R^6$, $R^7$ and $R^8$ represent a hydrogen atom, an alkyl group, an alkenyl group, an aryl group, a heterocyclic group, an acyl group, an alkylsulphonyl group, an arylsulphonyl group, or a sulfamoyl group.

The dye of the present invention may form a salt together with a metal ion, a cation comprising a nitrogen-containing compound, or the like, via $R^1$ to $R^8$. If the metal ion is divalent or multivalent, two or more of the dyes represented by the formula (I) (may be the same or different) may be bonded via any one of $R^1$ to $R^9$ to form a dimmer, a trimmer, or a polymer. The metal ion in this case is not limited as long as it is cationic to form a salt together with an amniotic site included in the substituent of the dye represented by the formula (I). Examples of the preferred metal ion include Li, Na, K, Rb, Cs, Ag, Mg, Ca, Sr, Ba, Zn, Al, Ni, Cu, Co, and Fe. Examples of the nitrogen-containing compound include compounds described in Japanese Patent Application Laid-Open No. 2005-99658, page 12 to page 20.

Here is a description of a mole ratio (hereunder called n) of nitrogen-containing compound/acidic dye in the salt of the dye represented by the formula (I) and the cation comprising a nitrogen-containing compound. n is a value determining the mole ratio of the dye molecule represented by the formula (I) and the nitrogen-containing compound serving as the counter ion thereof, and is freely selected according to the condition for forming the salt of the dye represented by the formula (I)-amine compound. Specifically, there is often used in practice a numerical value of $0 < n \leq 5$ which is the number of acidic functional groups in the dye represented by the formula (I), and it is selected by considering all required performances such as the solubility into the organic solvent or the developer, the salt forming property, the absorption, the interaction with other components in the curable composition, the light resistance, the heat resistance, and the like. If it is selected only from the viewpoint of absorption, n is preferably a numerical value of $0 < n \leq 4.5$, more preferably a numerical value of $0 < n \leq 4$, and particularly preferably a numerical value of $0 < n \leq 3.5$.

Next, specific examples (exemplary compounds (1) to (74)) of the pyrimidine azo composition represented by the formula (I) in the present invention are shown below, however the present invention is not limited to them.

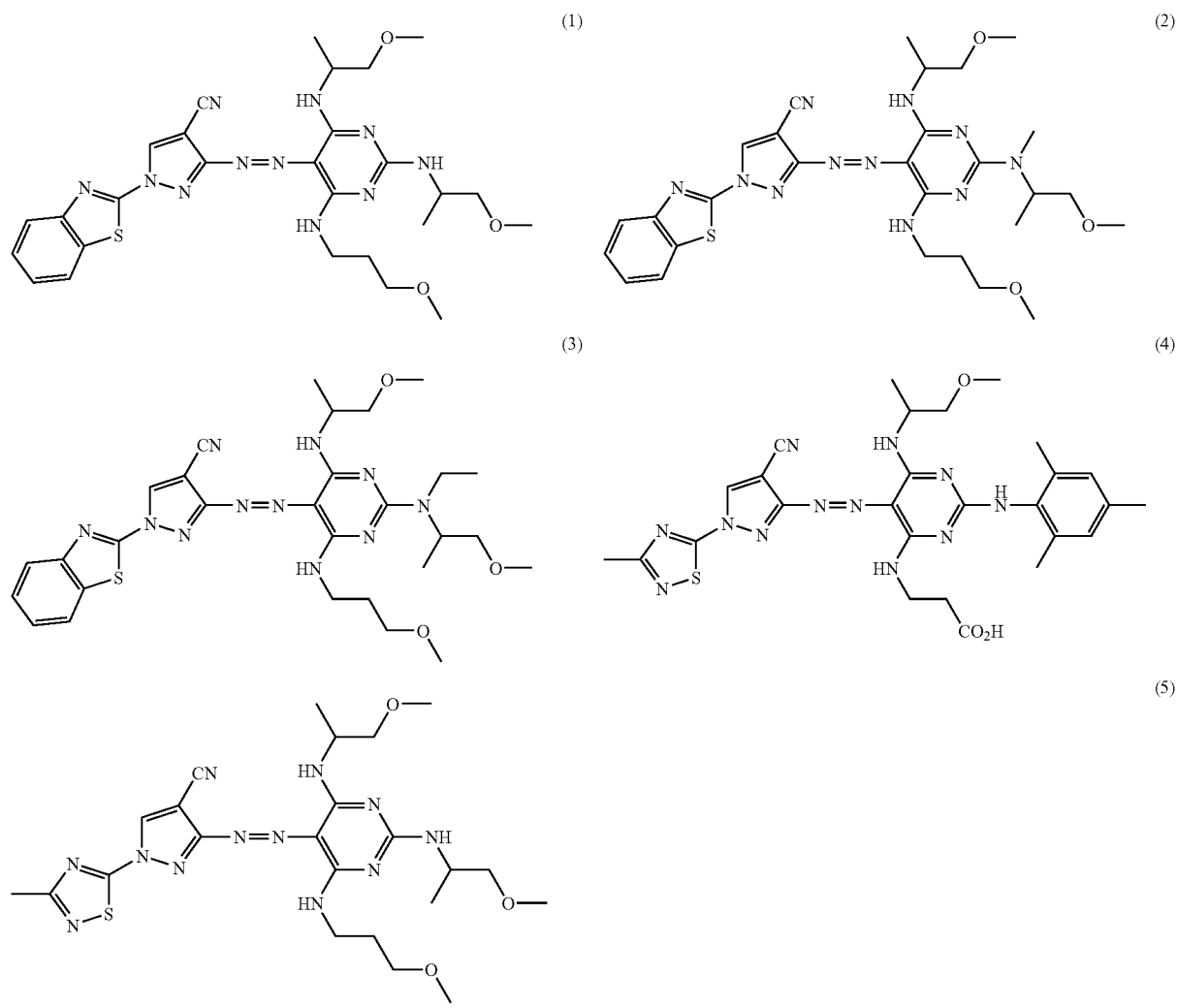

-continued
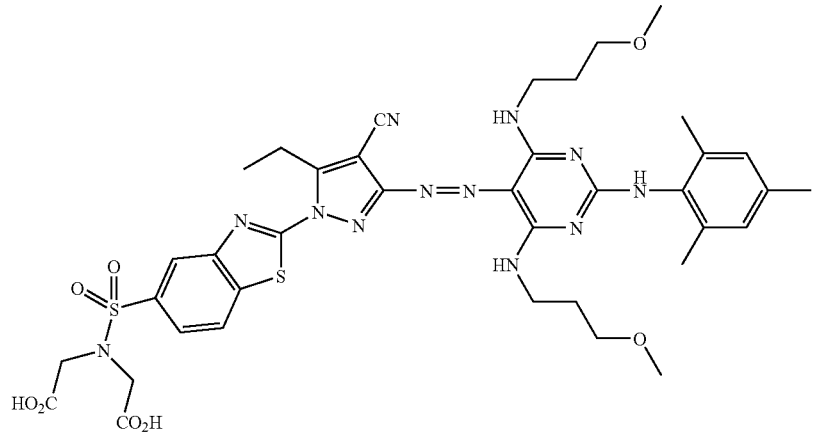
(6)
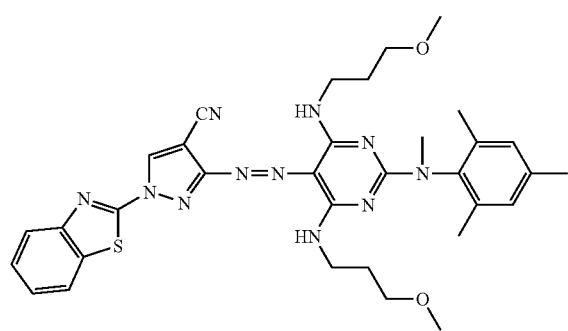
(7)
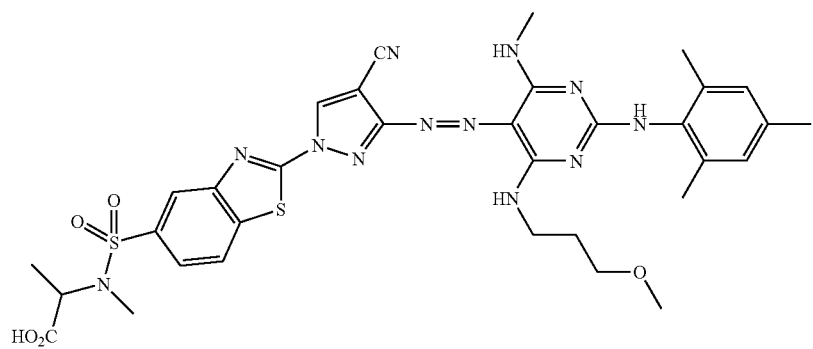
(8)
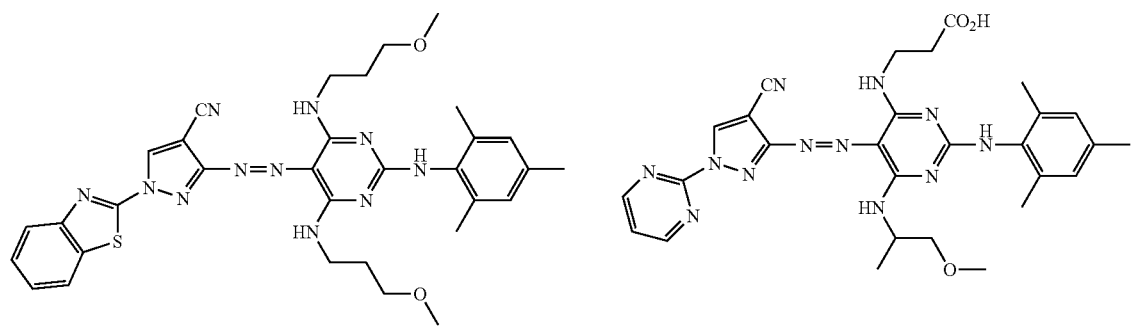
(9)
(10)

-continued
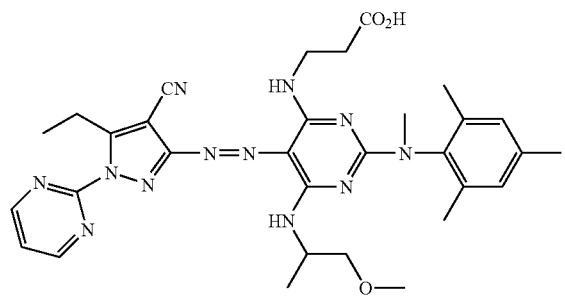
(11)
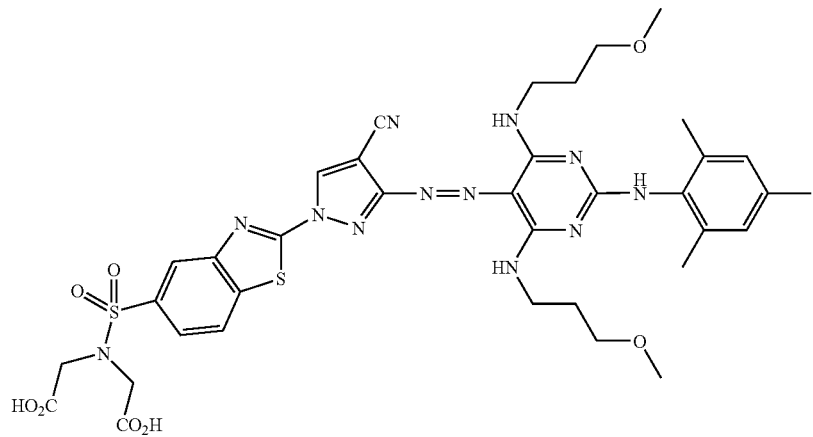
(12)
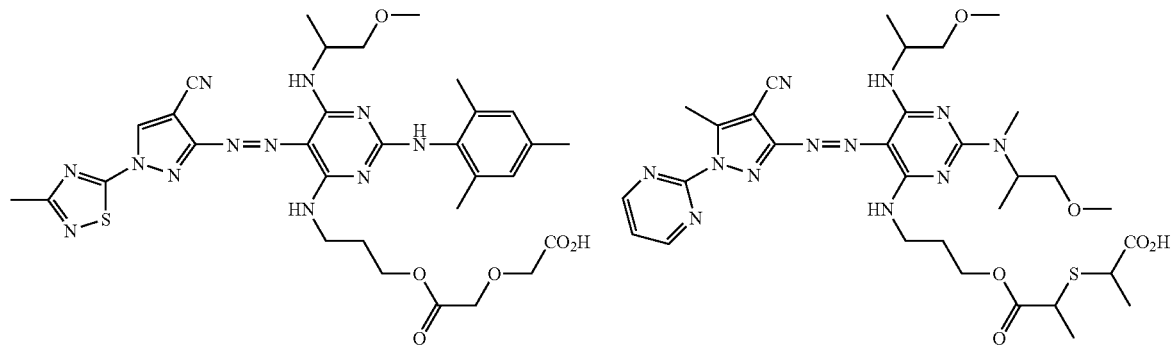
(13)
(14)
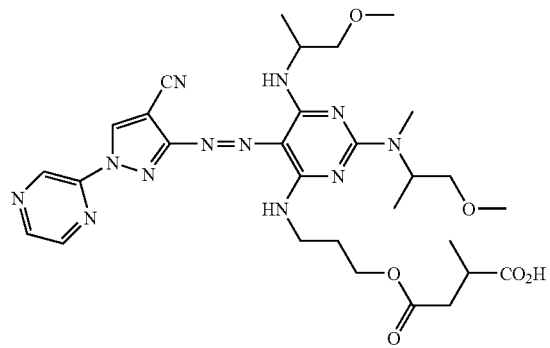
(15)
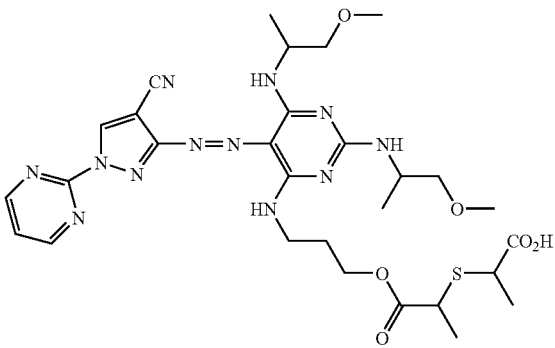
(16)

-continued
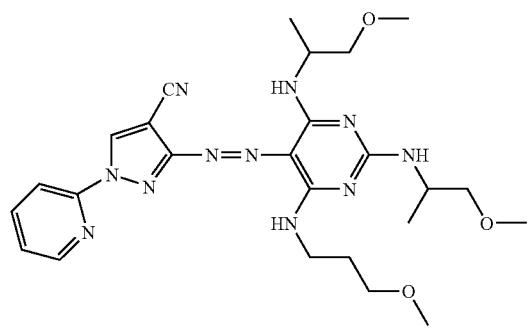
(17)
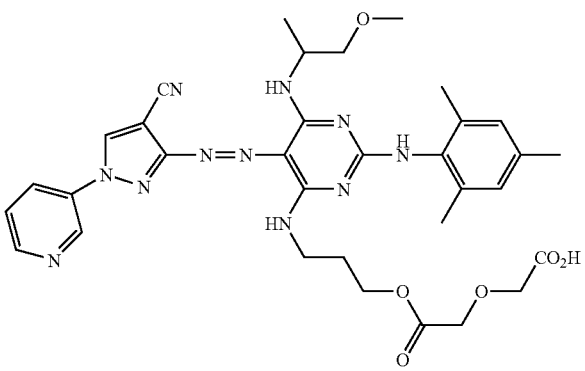
(18)
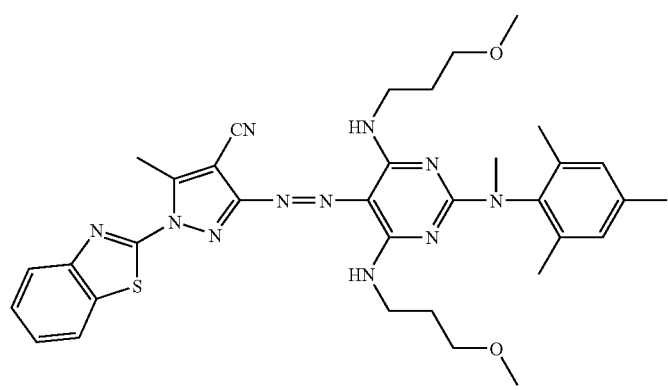
(19)
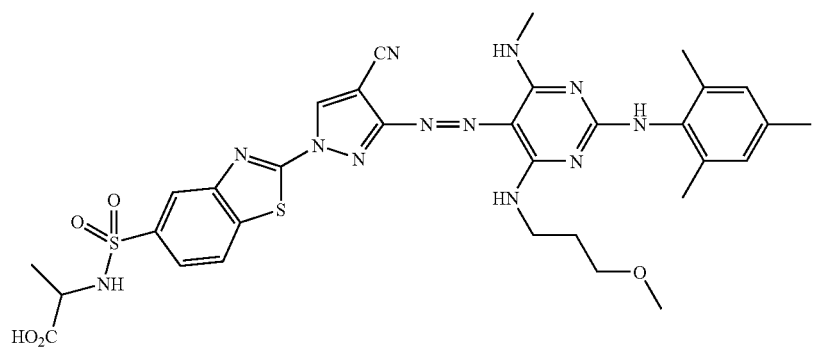
(20)
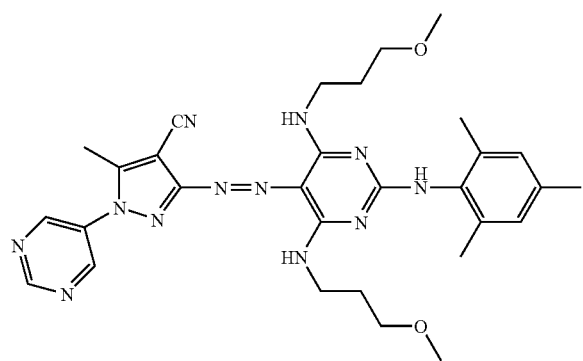
(21)
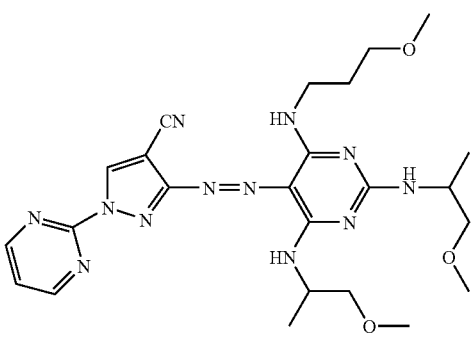
(22)

-continued
(23)
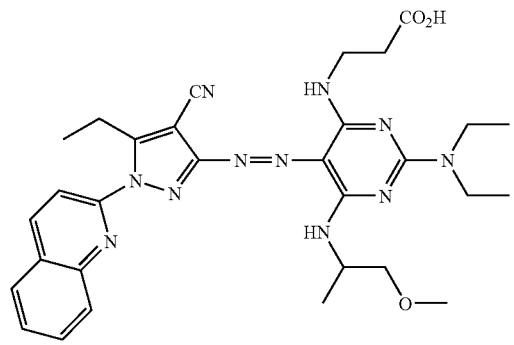
(24)
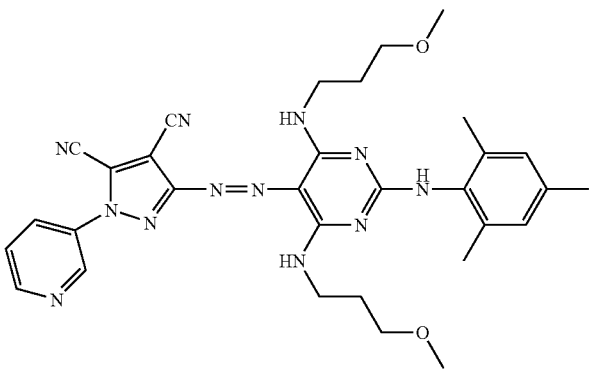
(25)
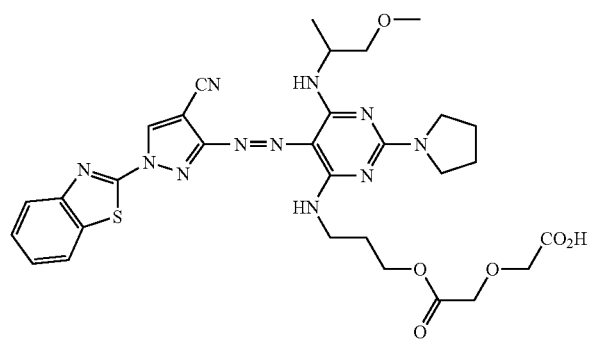
(26)
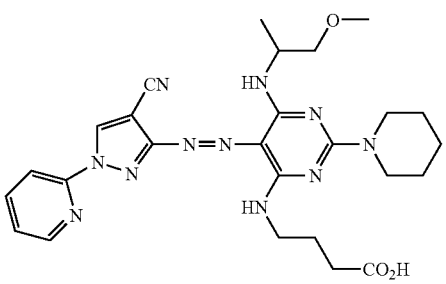
(27)
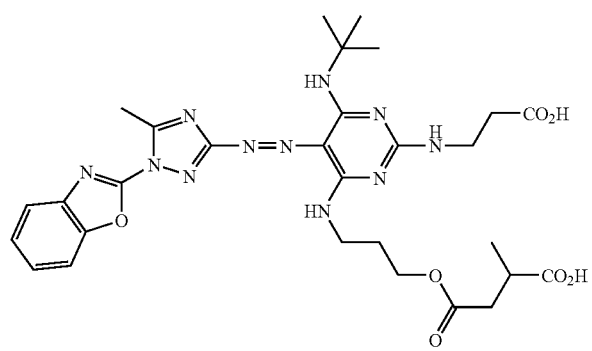
(28)
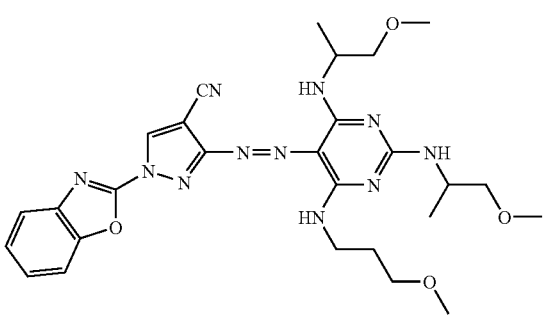
(29)
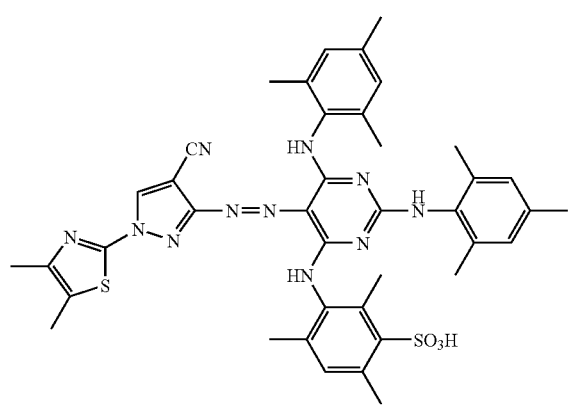
(30)
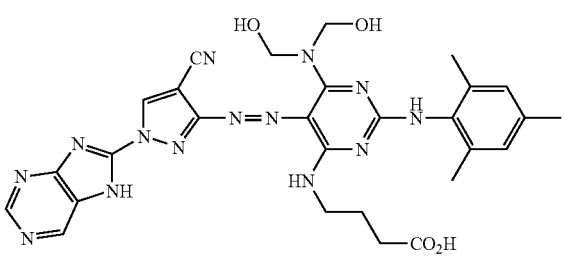

-continued
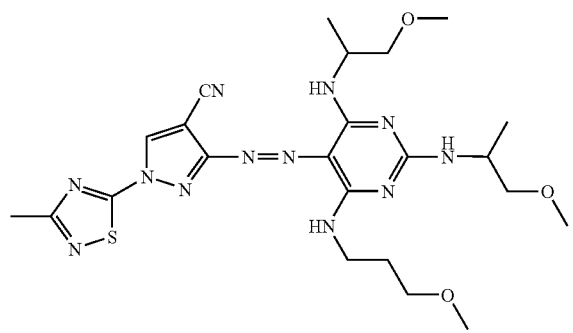
(31)
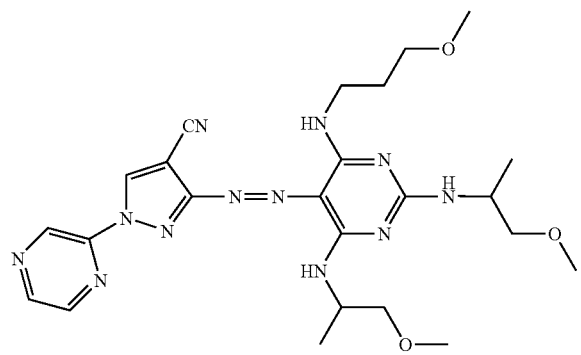
(32)
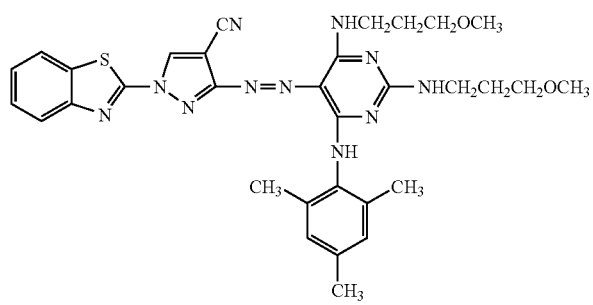
(33)
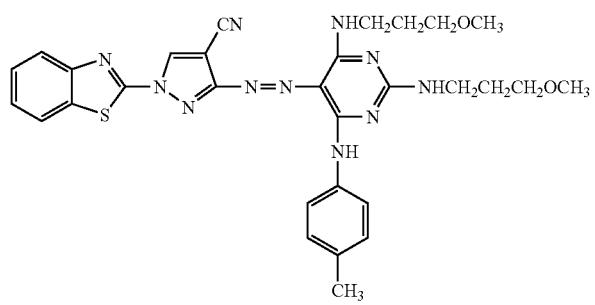
(34)
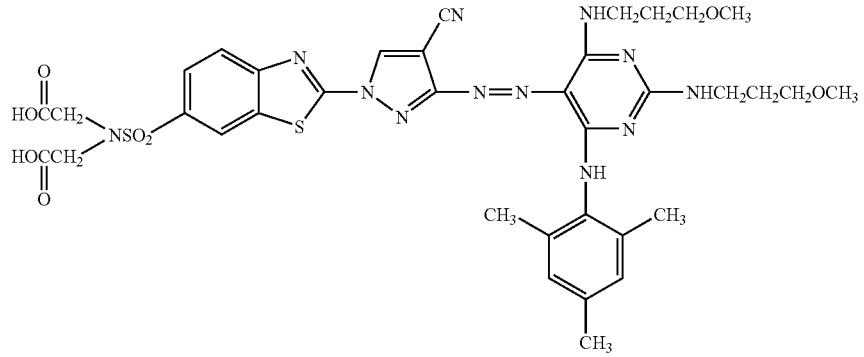
(35)
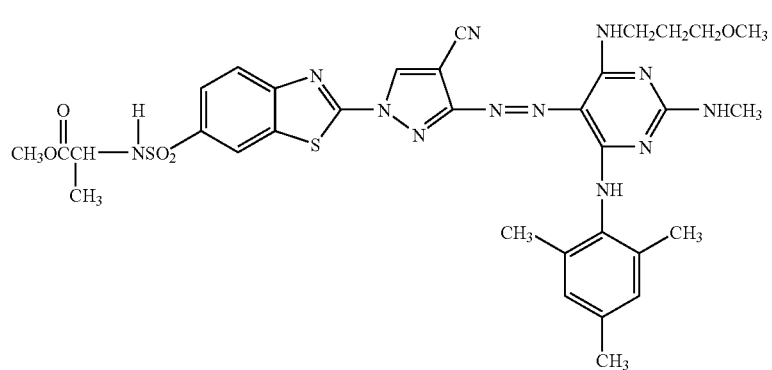
(36)

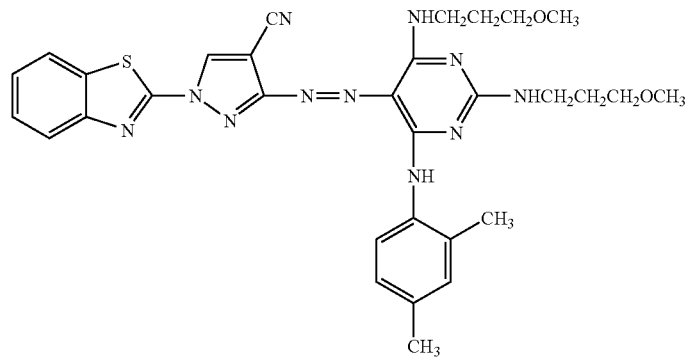
(37)
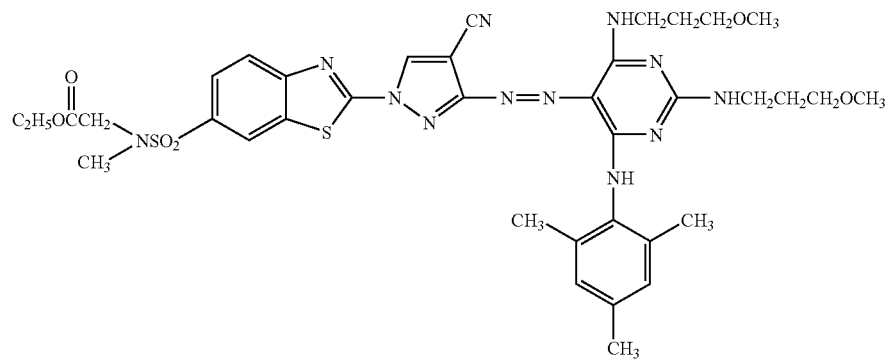
(38)
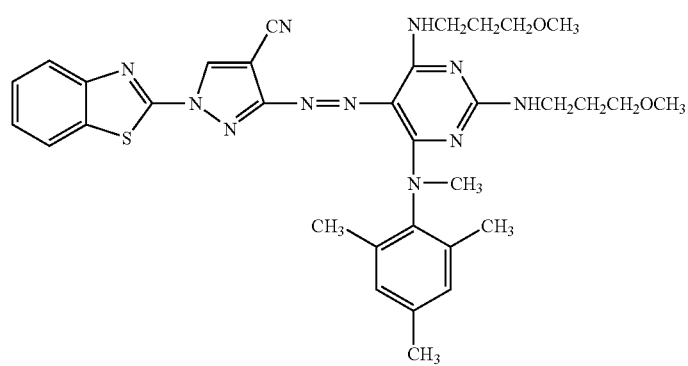
(39)
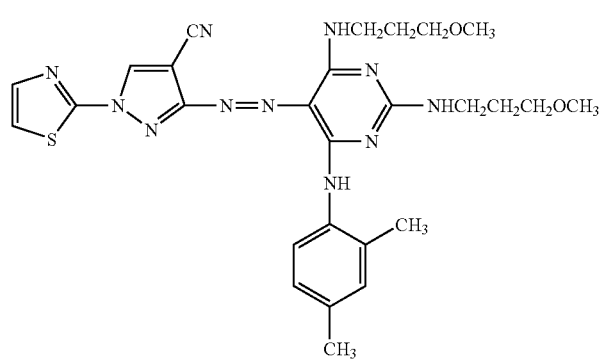
(40)

-continued
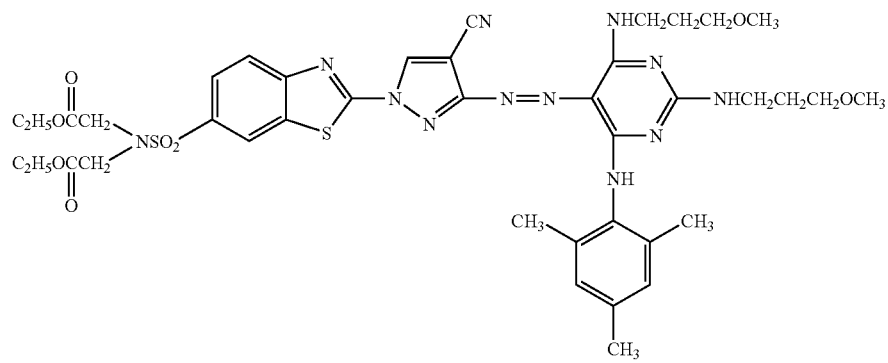
(41)
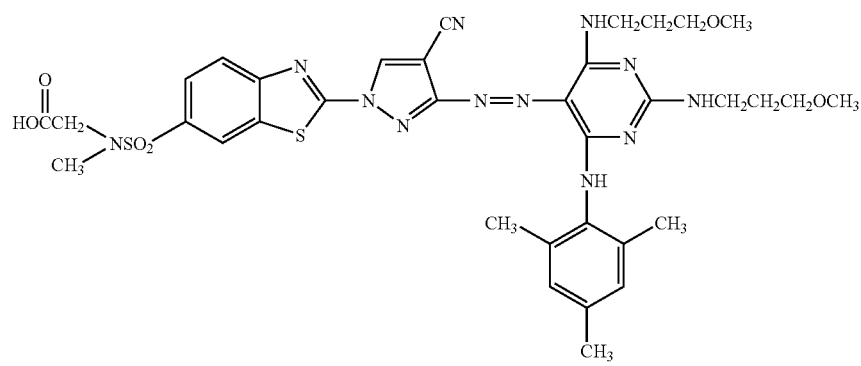
(42)
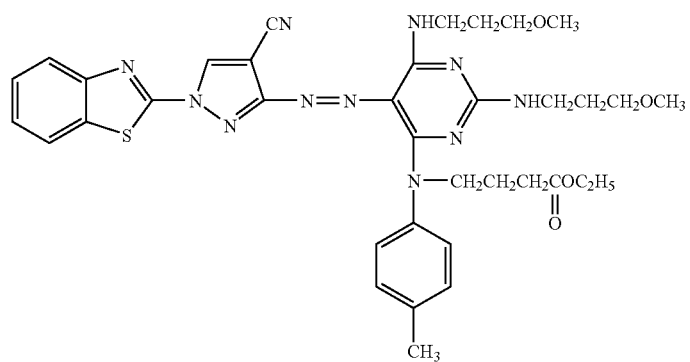
(43)
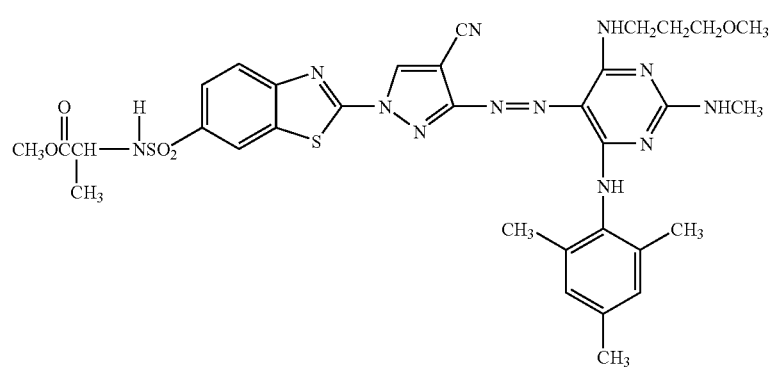
(44)

(45)
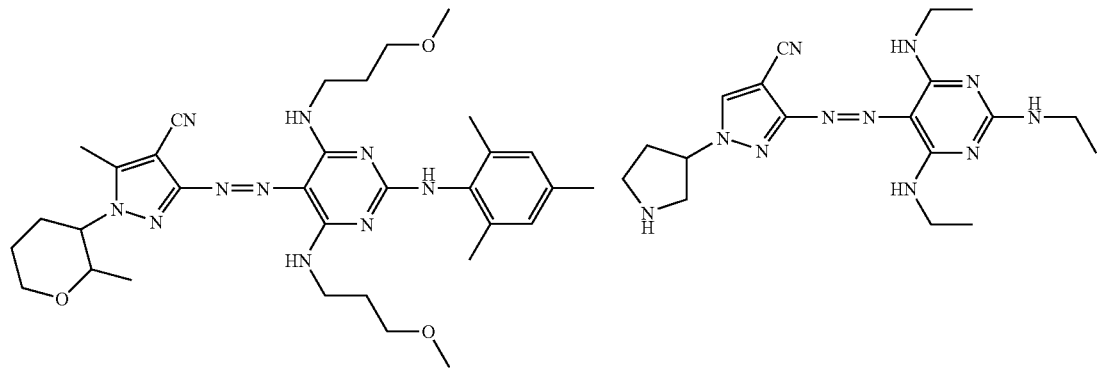
(46)
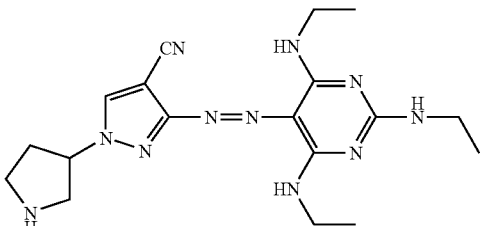
(47)
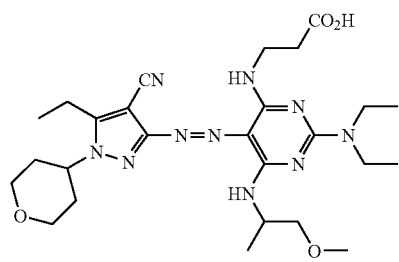
(48)
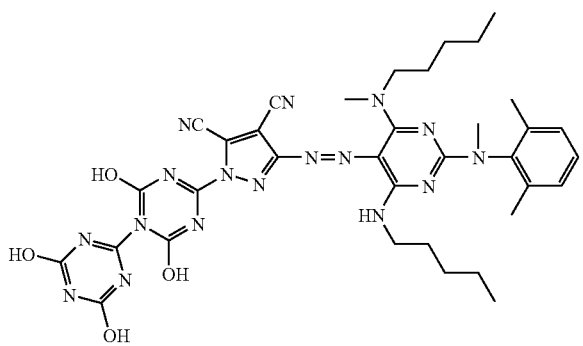
(49)
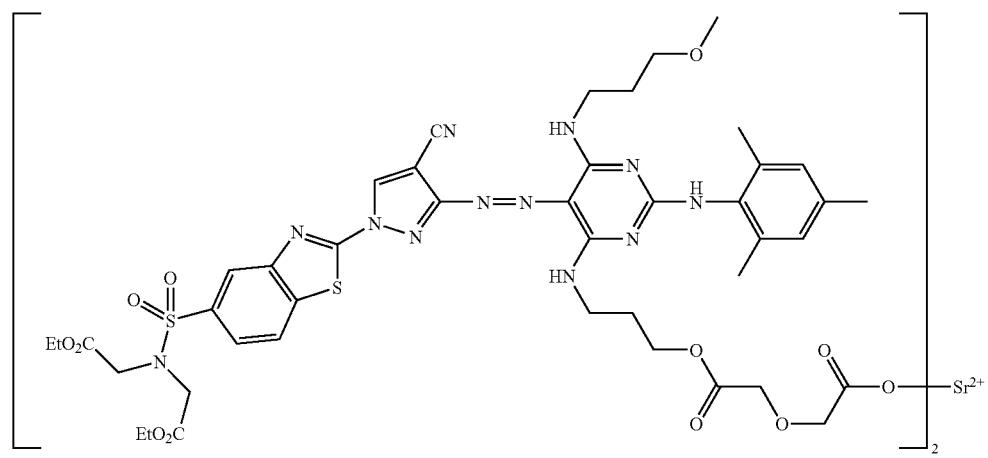

-continued
(50)
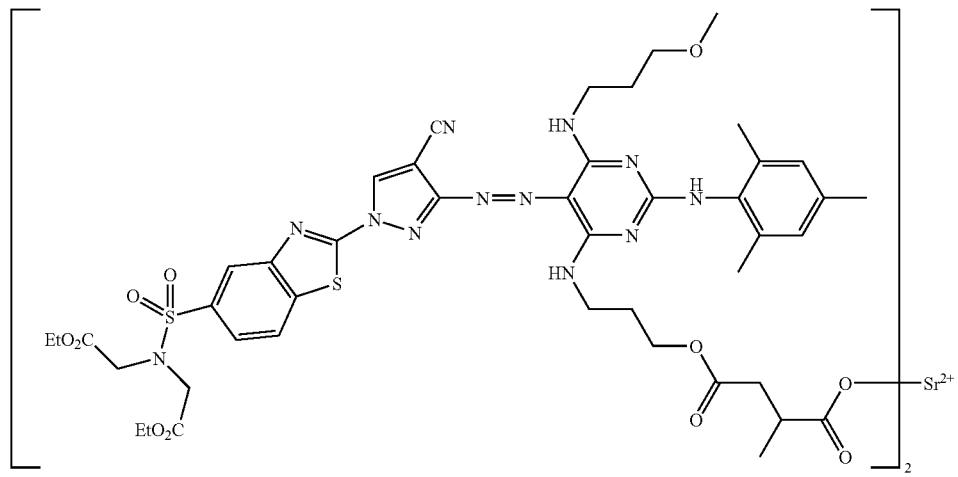
(51)
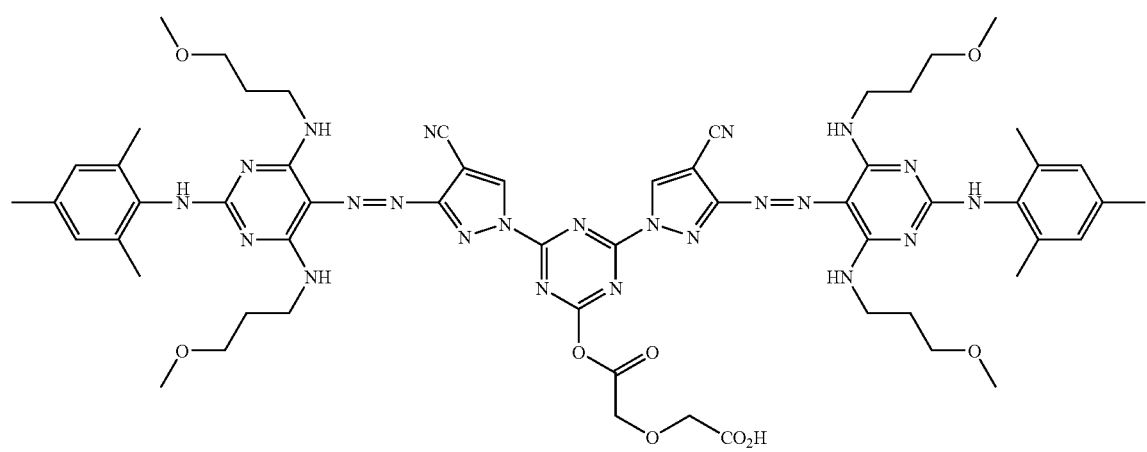
(52)
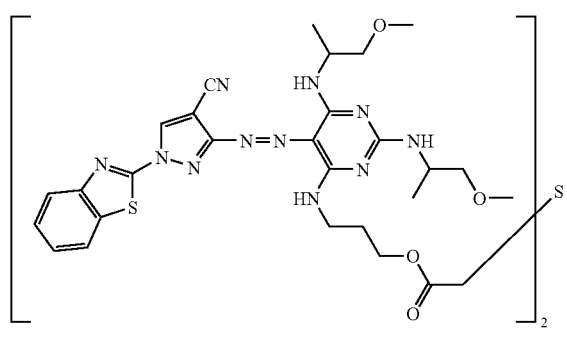
(53)
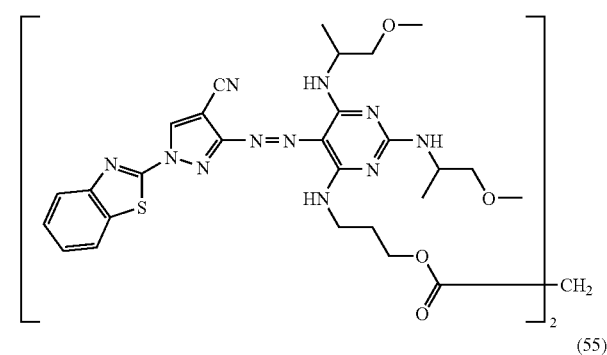
(54)
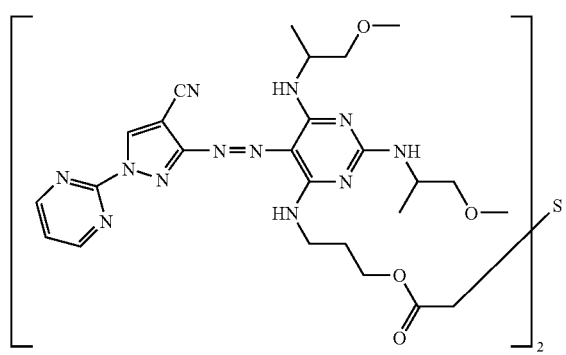
(55)
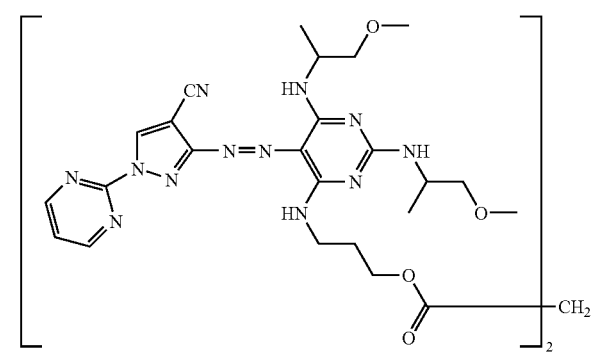

-continued
(56)
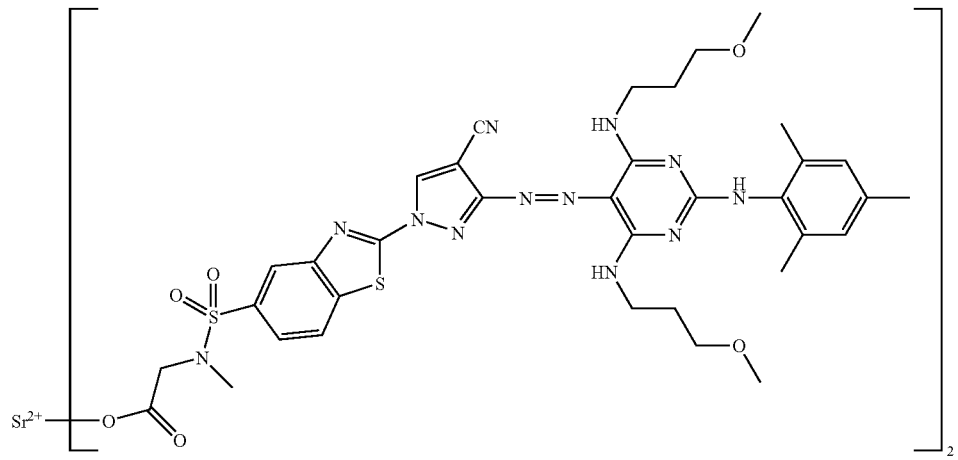
(57)
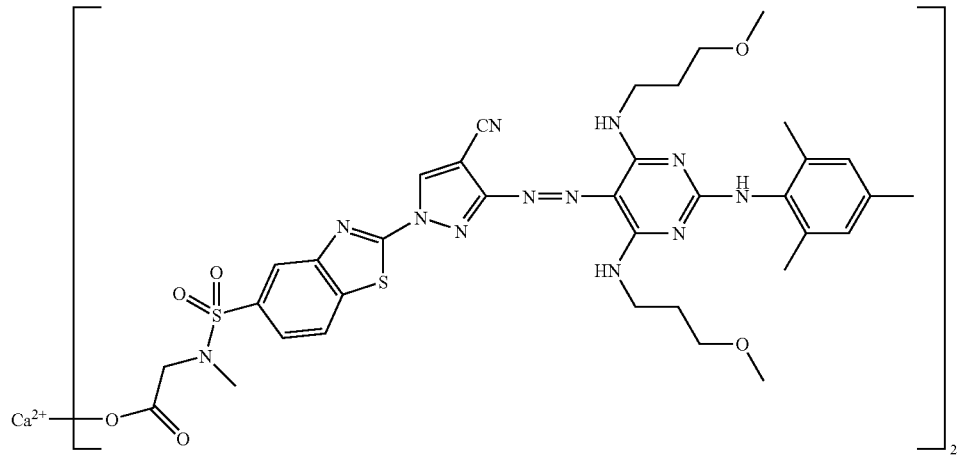
(58)
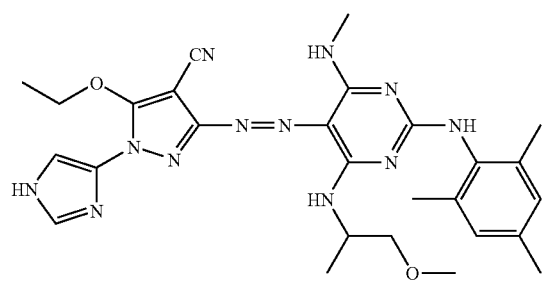
(59)
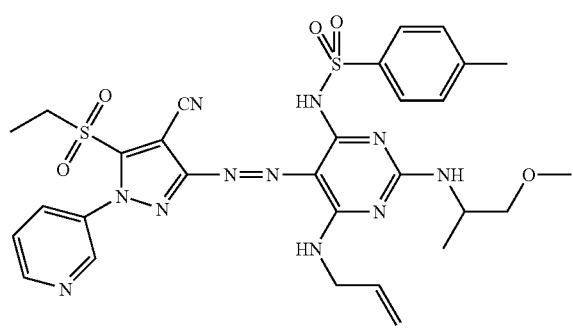
(60)
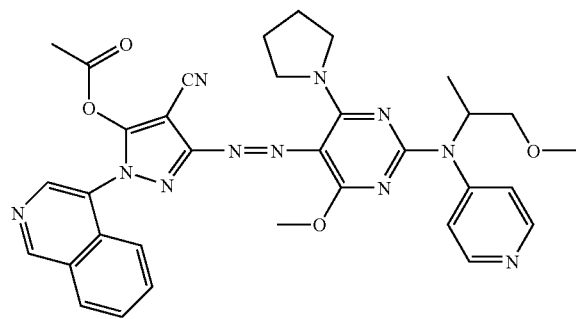
(61)
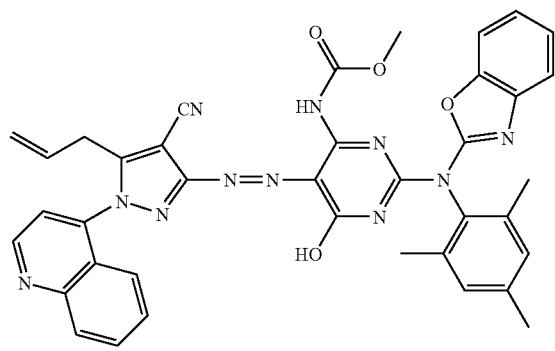

-continued
(62)
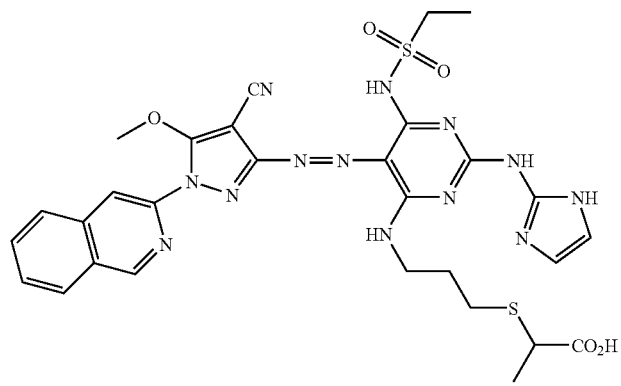
(63)
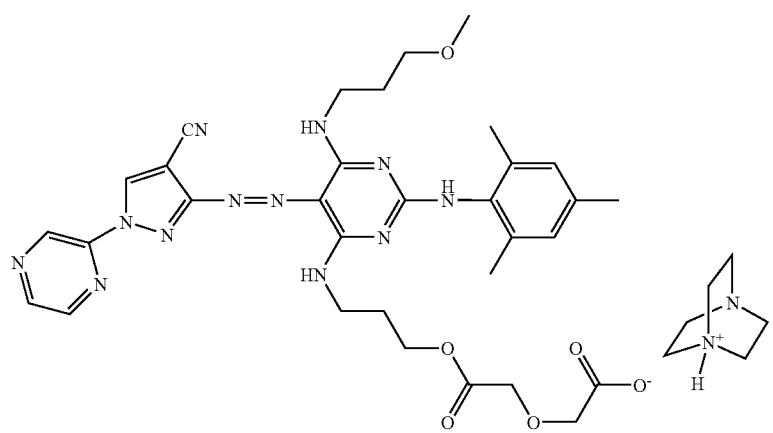
(64)
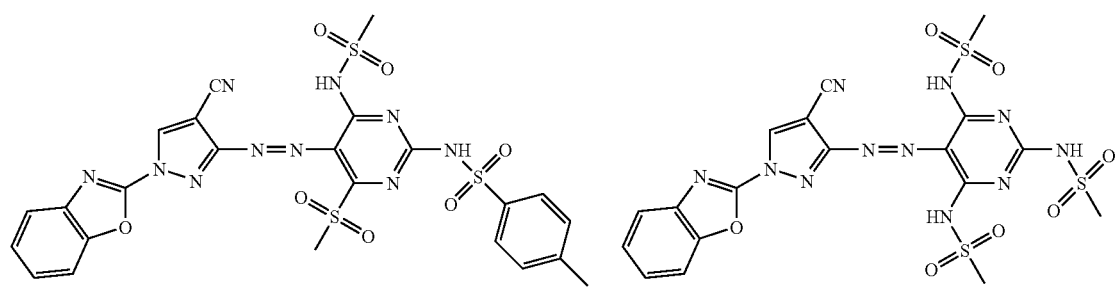
(65)
(66)
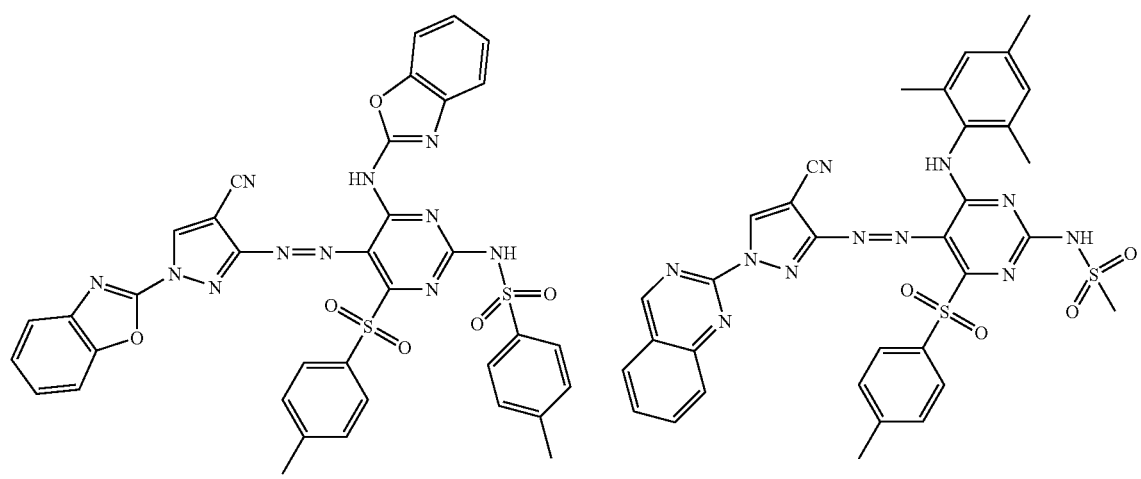
(67)

-continued
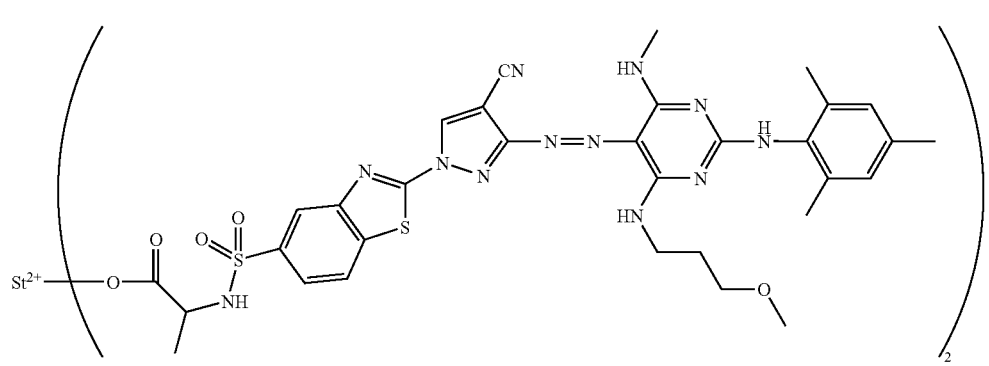
(68)
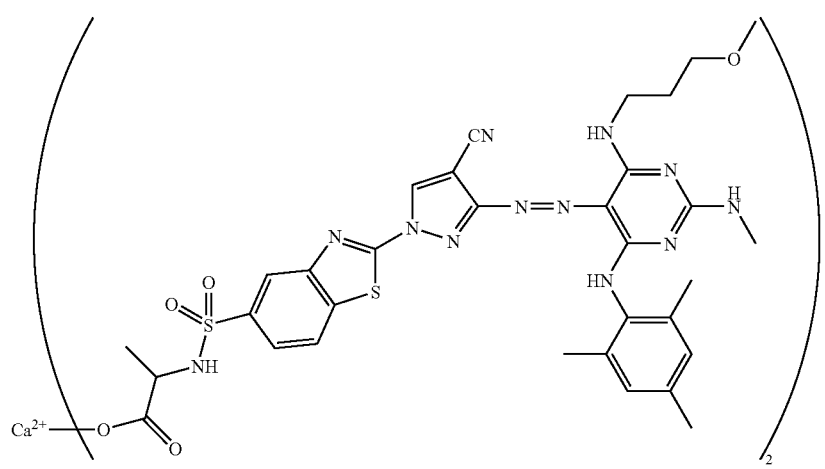
(69)
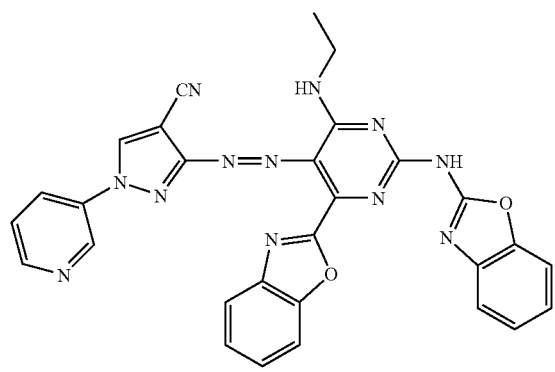
(70)
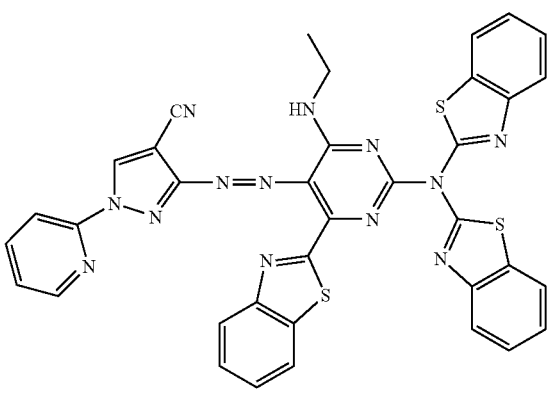
(71)
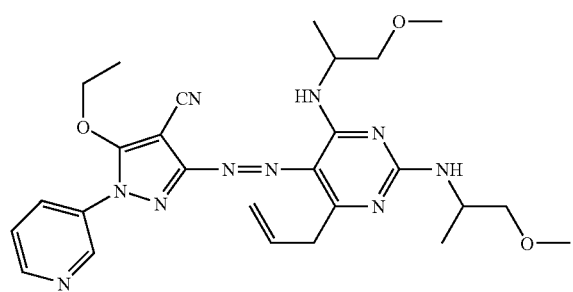
(72)
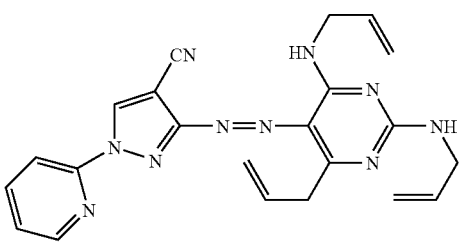
(73)

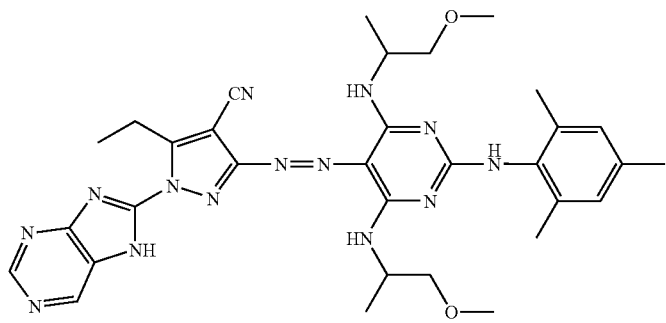

(74)

Hereunder is a detailed description of the colored curable composition, the color filter, and the manufacturing method therefor, of the present invention.

[Colored Curable Composition]

The colored curable composition of the present invention comprises a dye represented by the following formula (V), and preferably comprises a radiation-sensitive compound such as a photopolymerization initiator, and a polymerizable monomer. Moreover, generally it may comprise a solvent, and furthermore other components such as a binder and a cross linking agent as required.

Specifically, if the composition of the present invention is a negative-type composition, it preferably comprises a solvent, a polymerizable compound (monomer), a binder (preferably alkali-soluble binder), and a photopolymerization initiator, in addition to the dye. Furthermore, it may comprise a cross linking agent.

Moreover, if the composition of the present invention is a positive-type composition, it preferably comprises an organic solvent, a curing agent, or a photosensitizer, in addition to the dye.

—Compound Represented by Formula (V)—

The colored curable composition of the present invention contains at least one type of dye represented by the following formula (V). This dye has satisfactory color hues, no precipitation with time of a liquid preparation or a coated film, a superior preservation stability, and a satisfactory heat and light resistance. Furthermore, when a pattern is formed by a liquid preparation containing this dye, the pattern is in a rectangular form, and there is less residual film in areas other than desired pattern formation areas.

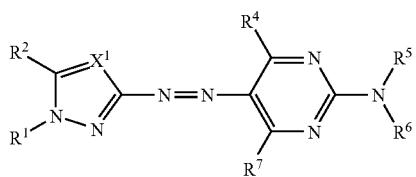

Formula (V)

In the formula (V), $R^1$ represents a heterocyclic group, and $R^2$ represents a hydrogen atom or a substituent. $X^1$ represents —N=, or —C($R^3$)=, wherein $R^3$ represents a hydrogen atom or a substituent. If $X^1$ is —C($R^3$)=, $R^2$ and $R^3$ may be mutually bonded to form a 5-, 6-, or 7-membered ring. $R^4$ represents a hydrogen atom or a substituent. $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group. $R^5$ and $R^6$ may be mutually bonded to form a 5-, 6-, or 7-membered ring. $R^7$ represents a hydrogen atom or a substituent.

Hereunder is a detailed description of $R^1$ to $R^7$, and $X^1$ in the formula (V).

$R^1$ in the formula (V) represents a heterocyclic group, preferably a heterocyclic group having 1 to 36 carbon atoms, more preferably a heterocyclic group having 2 to 24 carbon atoms, such as a pyrrolyl group, a furyl group, a thiophenyl group, a benzopyrrolyl group, a benzofuryl group, a benzothiophenyl group, a pyrazolyl group, an isoxazolyl group, an isothiazolyl group, an indazolyl group, a benzoisoxazolyl group, a benzoisothiazolyl group, an imidazolyl group, an oxazolyl group, a thiazolyl group, a benzoimidazolyl group, a benzooxazolyl group, a benzothiazolyl group, a pyridyl group, a quinolinyl group, an isoquinolinyl group, a pyridazinyl group, a pyrimidinyl group, a pyrazinyl group, a cinnolyl group, a phthalazinyl group, a quinazolinyl group, a quinoxalinyl group, an acridinyl group, a phenanthridinyl group, a phthalazinyl group, a carbazolyl group, a carbolinyl group, a purinyl group, a triazolyl group, an oxadiazolyl group, or a thiadiazolyl, and even more preferably a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 2-pyridyl group, a 3-pyridyl group, a 4-pyridyl group, a 2-quinolinyl group, a 4-quinolinyl group, a 1-isoquinolinyl group, a 3-isoquinolinyl group, a 3-pyridazinyl group, a 4-pyridazinyl group, a 2-pyrimidinyl group, a 4-pyrimidinyl group, a 5-pyrimidinyl group, a 2-pyrazinyl group, a 2-purinyl group, a 6-purinyl group, a 8-purinyl group, a 3-triazolyl group, a 5-triazolyl group, a 3-oxadiazolyl group, a 5-oxadiazolyl group, a 3-thiadiazolyl group, or a 5-thiadiazolyl group.

If the heterocyclic group of $R^1$ is a substitutable group, it may be substituted by one or more substituent(s) described in the aforementioned paragraph regarding the substituent. If it is substituted by two or more substituents, these substituents may be the same or different. From the point of effectively demonstrating the effect of the present invention, the following groups are suitable.

That is, a halogen atom (such as fluorine, chlorine, and bromine), an alkyl group (preferably a linear, branched, or cyclic alkyl group having 1 to 48 carbon atoms, such as methyl, ethyl, propyl, isopropyl, butyl, t-butyl, pentyl, hexyl, heptyl, octyl, 2-ethylhexyl, dodecyl, hexadecyl, cyclopropyl, cyclopentyl, cyclohexyl, 1-norbornyl, and 1-adamanthyl), an alkenyl group (preferably an alkenyl group having 2 to 48 carbon atoms, such as vinyl, aryl, and 3-butene-1-yl), an aryl group (preferably an aryl group having 6 to 48 carbon atoms, such as phenyl and naphthyl), a heterocyclic group (preferably a heterocyclic group having 1 to 32 carbon atoms, such as 2-thienyl, 4-pyridyl, 2-furyl, 2-pyrimidinyl, 1-pyridyl, 2-benzothiazolyl, 1-imidazolyl, 1-pyrazolyl, and benzotriazole-1-yl), a silyl group (preferably a silyl group having 3 to 38 carbon atoms, such as trimethylsilyl, triethylsilyl, tributylsilyl, t-butyldimethylsilyl, and t-hexyldimethylsilyl), a hydroxyl group, a cyano group, a nitro group, an alkoxy group (preferably an alkoxy group having 1 to 48 carbon atoms, such as methoxy, ethoxy, 1-butoxy, 2-butoxy, isopropoxy, t-butoxy, dodecyloxy, a cycloalkyloxy group (e.g., cyclopentyloxy and cyclohexyloxy)), an aryloxy group (preferably an aryloxy group having 6 to 48 carbon atoms, such as phenoxy and 1-naphthoxy), a heterocyclic oxy group (preferably a heterocyclic oxy group having 1 to 32 carbon atoms, such as 1-phenyltetrazole-5-oxy and 2-tetrahydropyranyloxy), a silyloxy group (preferably a silyloxy group having 1 to 32 carbon atoms, such as trimethylsilyloxy, t-butyldimethylsilyloxy, and diphenylmethylsilyloxy), an acyloxy group (preferably an acyloxy group having 2 to 48 carbon atoms, such as acetoxy, pivaloyloxy, benzoyloxy, and dodecanoyloxy), an alkoxycarbonyloxy group (preferably an alkoxycarbonyloxy group having 2 to 48 carbon atoms, such as ethoxycarbonyloxy, t-butoxycarbonyloxy, a cycloalkyloxycarbonyloxy group (e.g., cyclohexyloxycarbonyloxy)), an aryloxycarbonyloxy group (preferably an aryloxycarbonyloxy group having 7 to 32 carbon atoms, such as phenoxycarbonyloxy), a carbamoyloxy group (preferably a carbamoyloxy group having 1 to 48 carbon atoms, such as N,N-dimethylcarbamoyloxy, N-butylcarbamoyloxy, N-phenylcarbamoyloxy, and N-ethyl-N-phenylcarbamoyloxy), a sulfamoyloxy group (preferably a sulfamoyloxy group having 1 to 32 carbon atoms, such as N,N-diethylsulfamoyloxy and N-propylsulfamoyloxy), an alkylsulfonyloxy group (preferably an alkylsulfonyloxy group having 1 to 38 carbon atoms, such as methylsulfonyloxy, hexadecylsulfonyloxy, and cyclohexylsulfonyloxy), an arylsulfonyloxy group (preferably an arylsulfonyloxy group having 6 to 32 carbon atoms, such as phenylsulfonyloxy), an acyl group (preferably an acyl group having 1 to 48 carbon atoms, such as formyl, acetyl, pivaloyl, benzoyl, tetradecanoyl, and cyclohexanoyl), an alkoxycarbonyl group (preferably an alkoxycarbonyl group having 2 to 48 carbon atoms, such as methoxycarbonyl, ethoxycarbonyl, octadecyloxycarbonyl, and cyclohexyloxycarbonyl), an aryloxycarbonyl group (preferably an aryloxycarbonyl group having 7 to 32 carbon atoms, such as phenoxycarbonyl), a carbamoyl group (preferably a carbamoyl group having 1 to 48 carbon atoms, such as carbamoyl, N,N-diethylcarbamoyl, N-ethyl-N-octylcarbamoyl, N,N-dibutylcarbamoyl, N-propylcarbamoyl, N-phenylcarbamoyl, N-methyl N-phenylcarbamoyl, and N,N-dicyclohexylcarbamoyl), an amino group (preferably an amino group having 32 carbon atoms or less, such as amino, methylamino, N,N-dibutylamino, tetradecylamino, 2-ethylhexylamino, and cyclohexylamino), an anilino group (preferably an anilino group having 6 to 32 carbon atoms, such as anilino and N-methylanilino), a heterocyclic amino group (preferably a heterocyclic amino group having 1 to 32 carbon atoms, such as 4-pyridylamino), a carbonamido group (preferably, a carbonamido group having 1 to 32 carbon atoms, such as acetoamido, benzamido, pivaloylamido, cyclohexanamido, adamanthylamino, and 2-ethylhexanamido, except for a perfluoroalkylcarbonylamino group), an ureido group (preferably an ureido group having 1 to 32 carbon atoms, such as ureido, N,N-dimethylureido, and N-phenylureido), an imido group (preferably an imido group having 10 carbon atoms or less, such as N-succinimido and N-phthalimido), an alkoxycarbonylamino group (preferably an alkoxycarbonylamino group having 2 to 48 carbon atoms, such as methoxycarbonylamino, ethoxycarbonylamino, t-butoxycarbonylamino, octadecyloxycarbonylamino, and cyclohexyloxycarbonylamino), an aryloxycarbonylamino group (preferably an aryloxycarbonylamino group having 7 to 32 carbon atoms, such as phenoxycarbonylamino), an azo group (preferably an azo group having 1 to 32 carbon atoms, such as phenylazo and 3-pyrazolylazo), an alkylthio group (preferably an alkylthio group having 1 to 48 carbon atoms, such as methylthio, ethylthio, octylthio, and cyclohexylthio), an arylthio group (preferably an arylthio group having 6 to 48 carbon atoms, such as phenylthio), a heterocyclic thio group (preferably a heterocyclic thio group having 1 to 32 carbon atoms, such as 2-benzothiazolylthio, 2-pyridylthio, and 1-phenyltetrazolylthio), an alkylsulfinyl group (preferably an alkylsulfinyl group having 1 to 32 carbon atoms, such as dodecanesulfinyl), an arylsulfinyl group (preferably an arylsulfinyl group having 6 to 32 carbon atoms, such as phenylsulfinyl), an alkylsulphonyl group (preferably an alkylsulphonyl group having 1 to 48 carbon atoms, such as methylsulfonyl, ethylsulfonyl, propylsulfonyl, butylsulfonyl, isopropylsulfonyl, 2-ethylhexylsulfonyl, hexadecylsulfonyl, octylsulfonyl, and cyclohexylsulfonyl), an arylsulphonyl group (preferably an arylsulphonyl group having 6 to 48 carbon atoms, such as phenylsulfonyl and 1-naphthylsulfonyl), a sulfamoyl group (preferably a sulfamoyl group having 32 carbon atoms or less, such as sulfamoyl, N,N-dipropylsulfamoyl, N-ethyl-N-dodecylsulfamoyl, N-ethyl-N-phenylsulfamoyl, and N-cyclohexylsulfamoyl), a sulfo group, a phosphonyl group (preferably a phosphonyl group having 1 to 32 carbon atoms, such as phenoxyphosphonyl, octyloxyphosphonyl, and phenylphosphonyl), and a phosphinoylamino group (preferably a phosphinoylamino group having 1 to 32 carbon atoms, such as diethoxyphosphinoylamino and dioctyloxyphosphinoylamino). If these substituents are further substitutable groups, they may be substituted by one or more of the aforementioned substituent(s). If they are substituted by two or more substituents, these substituents may be the same or different.

In the formula (V), $R^2$ represents a hydrogen atom or a substituent. Moreover, $X^1$ represents —N=, or —C($R^3$)=, wherein $R^3$ represents a hydrogen atom or a substituent. If $X^1$ is —C($R^3$)=, $R^2$ and $R^3$ may be mutually bonded to form a 5-, 6-, or 7-membered ring.

The substituents represented by $R^2$ and $R^3$ are independently synonymous with groups described in the aforementioned paragraph regarding the substituent.

If the substituent of $R^2$ or $R^3$ is a further substitutable group, it may be substituted by one or more substituent(s) described in the aforementioned paragraph regarding the substituent. If it is substituted by two or more substituents, these substituents may be the same or different.

From the point of effectively demonstrating the effect of the present invention, the following groups are respectively suitable for $R^2$ and $R^3$. That is, $R^2$ is preferably a hydrogen atom, an alkyl group, an alkenyl group, an alkynyl group, an aryl group, an acyloxy group, an acylamino group, an alkyloxy group, an alkenyloxy group, an alkynyloxy group, an alkylsulfonyloxy group, an alkenylsulfonyloxy group, an alkynylsulfonyloxy group, an arylsulfenyloxy group, an alkylsulfonamide group, an alkenylsulfonamide group, an alkynylsulfonamide group, an arylsulfonamide group, an amino group, an alkylamino group, an alkenylamino group, an alkynylamino group, an arylamino group, an alkyloxycarbonylamino group, an alkenyloxycarbonylamino group, an alkynyloxycarbonylamino group, an aryloxycarbonylamino group, a heterocyclic oxycarbonylamino group, a hydroxy group, a cyano group, a sulfo group, a carbamoylamino group, or a sulfamoylamino group, more preferably a hydrogen atom, an alkyl group, an alkenyl group, an alkynyl group, a cyano group, an aryl group, an acyloxy group, an alkyloxy group, an alkenyloxy group, an alkynyloxy group, an alkylsulfonyloxy group, an alkenylsulfonyloxy group, or an alkynylsulfonyloxy group, and most preferably a hydrogen atom, an alkyl group, an alkenyl group, an alkynyl group, or a cyano group.

Moreover, $R^3$ is preferably an alkyl group, an alkenyl group, an alkynyl group, an aryl group, an acyl group, an acylamino group, an alkyloxycarbonylamino group, an alkenyloxycarbonylamino group, an alkynyloxycarbonylamino group, an aryloxycarbonyl group, a carbamoyl group, an alkylsulphonyl group, an alkenylsulfonyl group, an alkynylsulfonyl group, an arylsulphonyl group, a heterocyclic sulfonyl group, an alkylsulfonyloxy group, an alkenylsulfonyloxy group, an alkynylsulfonyloxy group, an arylsulfonyloxy group, an alkylsulfonamide group, an alkenylsulfonamide group, an alkynylsulfonamide group, an arylsulfonamide group, a cyano group, or a carboxyl group. $X^1$ is preferably selected from —C($R^3$)═ wherein $R^3$ is represented by any of the above, and —N═. Moreover, $R^3$ is more preferably an acyl group, an alkyloxycarbonylamino group, an alkenyloxycarbonylamino group, an alkynyloxycarbonylamino group, an alkylsulphonyl group, an alkenylsulfonyl group, an alkynylsulfonyl group, an arylsulphonyl group, a cyano group, or a carboxyl group. $X^1$ is more preferably selected from —C($R^3$)═ wherein $R^3$ is represented by any of the above, and —N═. Furthermore, $R^3$ is most preferably an alkyloxycarbonylamino group, an alkenyloxycarbonylamino group, an alkynyloxycarbonylamino group, an alkylsulphonyl group, an alkenylsulfonyl group, an alkynylsulfonyl group, or a cyano group. $X^1$ is most preferably selected from —C($R^3$)═ wherein $R^3$ is represented by any of the above, and —N═.

The substituent represented by $R^4$ and $R^7$ may be a substitutable group and a group described in the aforementioned paragraph regarding the "substituent". Moreover, if $R^4$ or $R^7$ is a substitutable group, it may have one or more substituent(s) described in the aforementioned paragraph regarding the "substituent". If it has two or more substituents, these substituents may be the same or different. From the point of effectively demonstrating the effect of the present invention, $R^4$ and $R^7$ are preferably a hydrogen atom, an alkyl group, an alkenyl group, an alkynyl group, an aryl group, a heterocyclic group, an acyl group, an acyloxy group, an acylamino group, an alkyloxy group, an alkenyloxy group, an alkynyloxy group, an aryloxy group, a heterocyclic oxy group, an alkyloxycarbonyl group, an alkenyloxycarbonyl group, an alkynyloxycarbonyl group, a carbamoyl group, a sulfamoyl group, an alkylsulfonamide group, an alkenylsulfonamide group, an alkynylsulfonamide group, an arylsulfonamide group, a heterocyclic sulfonamide group, an amino group, an alkylamino group, an alkenylamino group, an alkynylamino group, an arylamino group, a heterocyclic amino group, an alkyloxycarbonylamino group, an alkenyloxycarbonylamino group, an alkynyloxycarbonylamino group, an aryloxycarbonylamino group, a heterocyclic oxycarbonylamino group, an alkylthio group, an alkenylthio group, an alkynylthio group, an arylthio group, a heterocyclic thio group, a hydroxy group, a cyano group, a sulfo group, a carboxyl group, a carbamoylamino group, a sulfamoylamino group, or a halogen atom, more preferably a hydrogen atom, an alkyl group, an alkenyl group, an alkynyl group, a heterocyclic group, an acylamino group, an alkyloxy group, an alkenyloxy group, an alkynyloxy group, an aryloxy group, an alkylsulfonamide group, an alkenylsulfonamide group, an alkynylsulfonamide group, an arylsulfonamide group, an alkylamino group, an alkenylamino group, an alkynylamino group, an arylamino group, a heterocyclic amino group, an alkylthio group, an alkenylthio group, an alkynylthio group, an arylthio group, or a halogen atom, and most preferably an alkyloxy group, an alkenyloxy group, an alkylamino group, an alkenylamino group, an arylamino group, a heterocyclic amino group, or an alkylthio group.

The $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group. If $R^5$ or $R^6$ is a substitutable group, it may have one or more substituent(s) described in the aforementioned paragraph regarding the "substituent". If it has two or more substituents, these substituents may be the same or different. Moreover, $R^5$ and $R^6$ may be mutually bonded to form a 5-, 6-, or 7-membered ring. From the point of effectively demonstrating the effect of the present invention, $R^5$ and $R^6$ preferably represent a hydrogen atom, an alkyl group, an alkenyl group, an aryl group, a heterocyclic group, an acyl group, a carbamoyl group, an alkylsulphonyl group, an arylsulphonyl group, or a sulfamoyl group, more preferably a hydrogen atom, an alkyl group, an alkenyl group, an aryl group, a heterocyclic group, an alkylsulphonyl group, or an arylsulphonyl group, and most preferably a hydrogen atom, an alkyl group, an aryl group, a heterocyclic group, or an alkylsulphonyl group.

Examples of the 5-, 6-, or 7-membered ring formed by mutually bonding $R^5$ and $R^6$ include a piperidinyl group, a pyrrolidinyl group, an azepanyl group, a morpholinyl group, or the like which may have one or more substituent(s), and preferably a piperidinyl group or a pyrrolidinyl group.

The dye represented by the formula (V) is preferably a dye represented by the following formula (II).

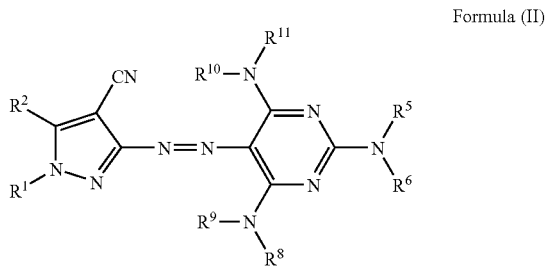

Formula (II)

In the formula (II), $R^1$, $R^2$, $R^5$ and $R^6$ are synonymous with those in the formula (V), and the respective preferred examples are the same. Moreover, in the formula (II), $R^8$, $R^9$, $R^{10}$ and $R^{11}$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group; or a sulfamoyl group. If $R^5$ or $R^6$ is a substitutable group, it may have one or more substituent(s) described in the aforementioned paragraph regarding the "substituent". If it has two or more substituents, these substituents may be the same or different. Moreover, $R^5$ and $R^6$ may be mutually bonded to form a 5-, 6-, or 7-membered ring. From the point of effectively demonstrating the effect of the present invention, $R^8$, $R^9$, $R^{10}$ and $R^{11}$ preferably represent a hydrogen atom, an alkyl group, an alkenyl group, an aryl group, a heterocyclic group, an acyl group, a carbamoyl group, an alkylsulphonyl group, an arylsulphonyl group, or a sulfamoyl group, more preferably a hydrogen atom, an alkyl group, an alkenyl group, an aryl group, a heterocyclic group, an alkylsulphonyl group, or an arylsulphonyl group, and most preferably a hydrogen atom, an alkyl group, an aryl group, a heterocyclic group, or an alkylsulphonyl group. If $R^8$, $R^9$, $R^{10}$ or $R^{11}$ is a substitutable group, it may have one or more substituent(s) described in the aforementioned paragraph regarding the "substituent". If it has two or more substituents, these substituents may be the same or different.

More preferably, examples of the dye of the present invention are such that in the formula (II): $R^1$ represents a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 2-pyridyl group, a 3-pyridyl group, a 4-pyridyl group, a 2-quinolinyl group, a 4-quinolinyl group, a 1-isoquinolinyl group, a 3-isoquinolinyl group, a 3-pyridazinyl group, a 4-pyridazinyl group, a 2-pyrimidinyl group, a 4-pyrimidinyl group, a 5-pyrimidinyl group, a 2-pyrazinyl group, a 2-purinyl group, a 6-purinyl group, a 8-purinyl group, a 3-triazolyl group, a 5-triazolyl group, a 3-oxadiazolyl group, a 5-oxadiazolyl group, a 3-thiadiazolyl group, or a 5-thiadiazolyl group;

$R^2$ represents a hydrogen atom, an alkyl group, an alkenyl group, an alkynyl group, a cyano group, an aryl group, an acyloxy group, an alkyloxy group, an alkenyloxy group, an alkynyloxy group, an alkylsulfonyloxy group, an alkenylsulfonyloxy group, or an alkynylsulfonyloxy group; and $R^5$, $R^6$, $R^8$, $R^9$, $R^{10}$ and $R^{11}$ each independently represent a hydrogen atom, an alkyl group, an alkenyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group.

More preferably, examples of the dye of the present invention are such that in the formula (II): $R^1$ represents a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 2-pyridyl group, a 3-pyridyl group, a 4-pyridyl group, a 2-quinolinyl group, a 4-quinolinyl group, a 1-isoquinolinyl group, a 3-isoquinolinyl group, a 3-pyridazinyl group, a 4-pyridazinyl group, a 2-pyrimidinyl group, a 4-pyrimidinyl group, a 5-pyrimidinyl group, a 2-pyrazinyl group, a 2-purinyl group, a 6-purinyl group, a 8-purinyl group, a 3-triazolyl group, a 5-triazolyl group, a 3-oxadiazolyl group, a 5-oxadiazolyl group, a 3-thiadiazolyl group, or a 5-thiadiazolyl group;

$R^2$ represents a hydrogen atom, an alkyl group, an alkenyl group, a cyano group, an acyloxy group, an alkyloxy group, or an alkylsulfonyloxy group; and $R^5$, $R^6$, $R^8$, $R^9$, $R^{10}$ and $R^{11}$ each independently represent a hydrogen atom, an alkyl group, an alkenyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group.

Most preferably, examples of the dye are such that in the formula (II): $R^1$ represents a 3-pyrazolyl group, a 4-pyrazolyl group, a 2-imidazolyl group, a 4-imidazolyl group, a 5-imidazolyl group, a 2-oxazolyl group, a 2-thiazolyl group, a 2-benzoimidazolyl group, a 2-benzooxazolyl group, a 2-benzothiazolyl group, a 3-pyridazinyl group, a 4-pyridazinyl group, a 2-pyrimidinyl group, a 4-pyrimidinyl group, a 5-pyrimidinyl group, a 2-pyrazinyl group, a 3-triazolyl group, a 5-triazolyl group, a 3-oxadiazolyl group, a 5-oxadiazolyl group, a 3-thiadiazolyl group, or a 5-thiadiazolyl group;

$R^2$ represents a hydrogen atom, an alkyl group, or a cyano group; and $R^5$, $R^6$, $R^8$, $R^9$, $R^{10}$, and $R^{11}$ represent a hydrogen atom, an alkyl group, an alkenyl group, an aryl group, a heterocyclic group, an acyl group, an alkylsulphonyl group, an arylsulphonyl group, or a sulfamoyl group.

In the present invention, the dye represented by the formula (V) or (II) may form a salt together with a metal ion, a cation comprising a nitrogen-containing compound, or the like, via $R^1$ to $R^{11}$. If the metal ion is divalent or multivalent, there may be two or more dyes represented by the formula (V) or (II) (may be the same or different), and the two or more dyes may be bonded via any one of $R^1$ to $R^{11}$ to form a dimer, a trimer, or a polymer. The metal ion in this case is not limited as long as it is cationic to form a salt together with an aniotic site included in the substituent of the dye represented by the formula (V) or (II). Examples of the preferred metal ion include Li, Na, K, Rb, Cs, Ag, Mg, Ca, Sr, Ba, Zn, Al, Ni, Cu, Co, and Fe. Examples of the nitrogen-containing compound include compounds described in Japanese Patent Application Laid-Open No. 2005-99658, page 12 to page 20.

Here is a description of a mole ratio (hereunder called n) of nitrogen-containing compound/acidic dye in the salt of the dye represented by the formula (V) or (II) and the cation comprising a nitrogen-containing compound. n is a value determining the mole ratio of the dye molecule represented by the formula (V) or (II) and the nitrogen-containing compound serving as the counter ion thereof, and is freely selected according to the condition for forming the salt of the dye represented by the formula (V) or (II)-amine compound. Specifically, there is often used in practice a numerical value of $0 < n \leq 5$ which is the number of acidic functional groups in the dye represented by the formula (V) or (II), and it is selected by considering all required performances such as the solubility into the organic solvent or the developer, the salt forming property, the absorption, the interaction with other components in the curable composition, the light resistance, the heat resistance, and the like. If it is selected only from the viewpoint of absorption, n is preferably a numerical value of $0 < n \leq 4.5$, more preferably a numerical value of $0 < n \leq 4$, and particularly preferably a numerical value of $0 < n \leq 3.5$.

Next, specific examples (exemplary compounds (101) to (203)) of the pyrimidine azo composition represented by the formula (V) or (II) in the present invention are shown below, however the present invention is not limited to them.

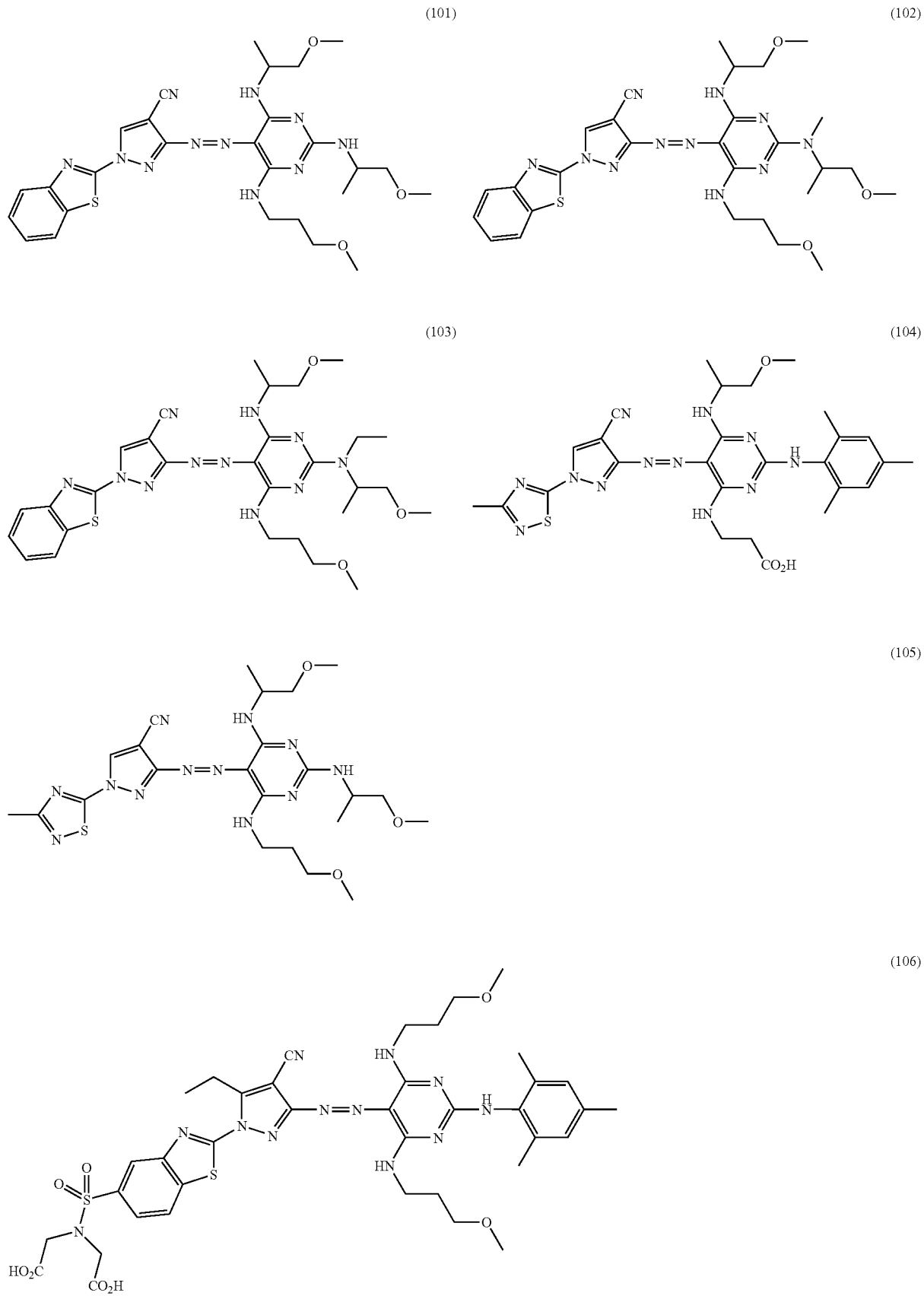

(107)
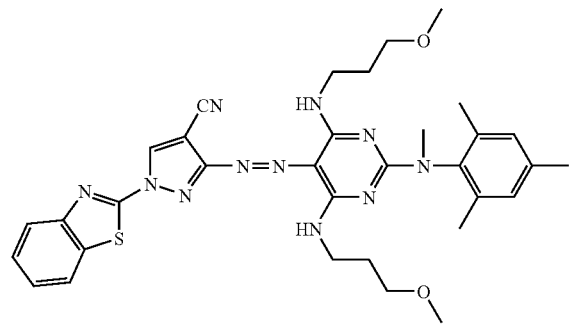
(108)
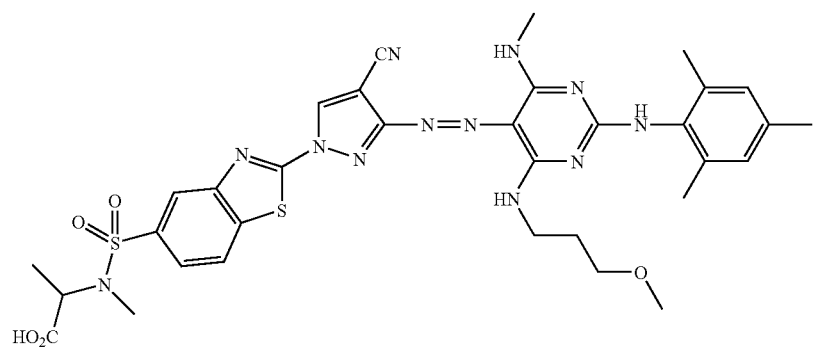
(109)
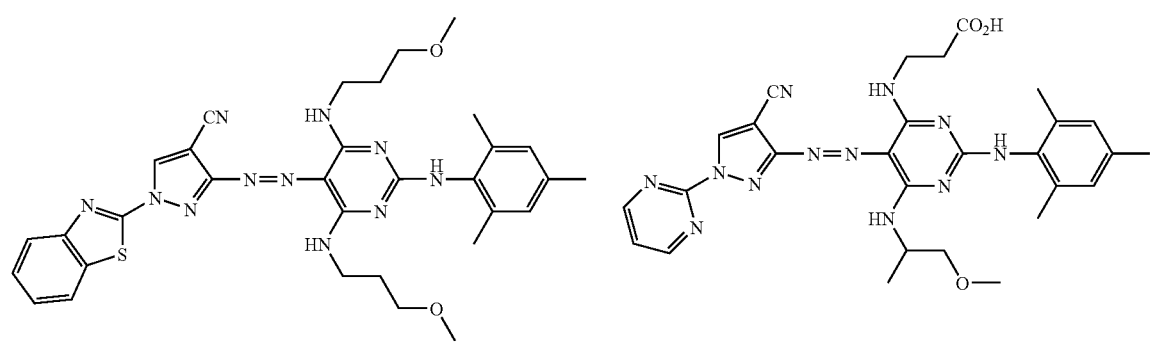
(110)
(111)
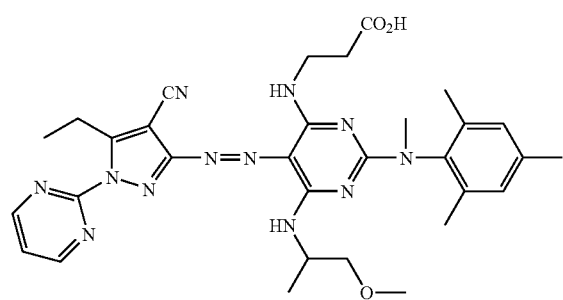

-continued
(112)
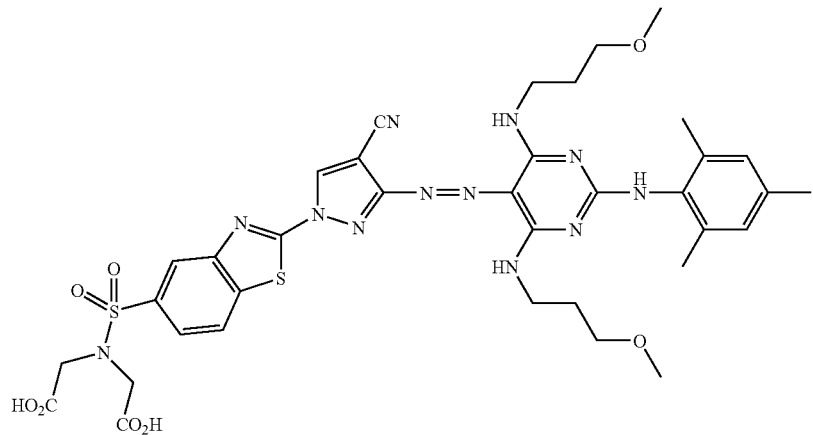
(113)
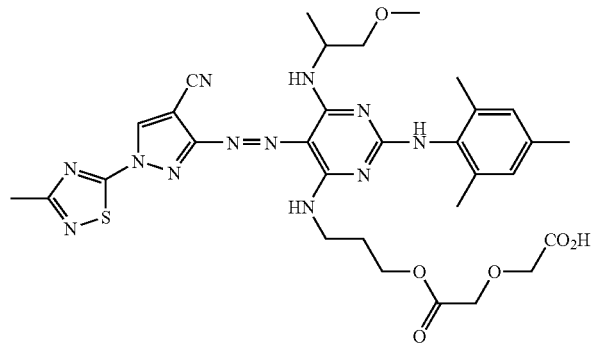
(114)
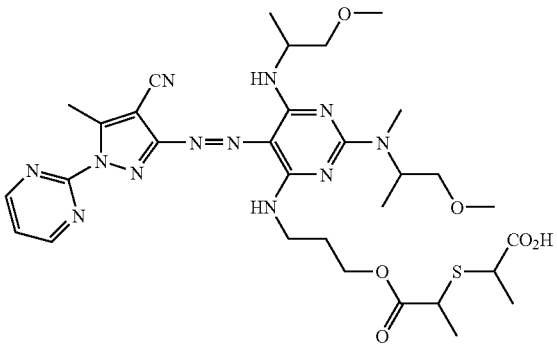
(115)
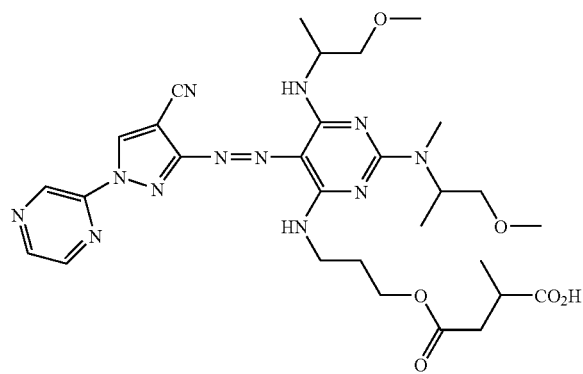
(116)
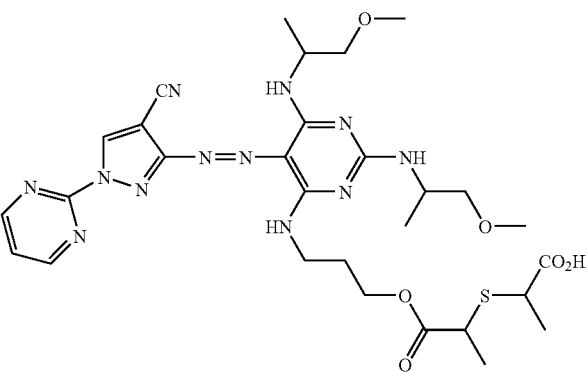
(117)
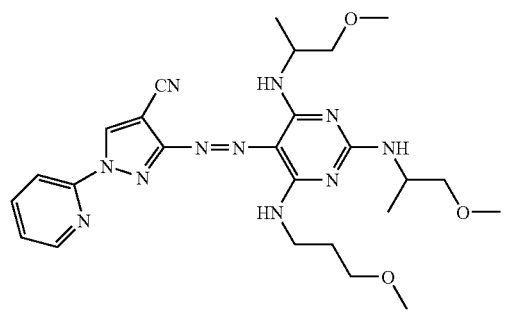
(118)
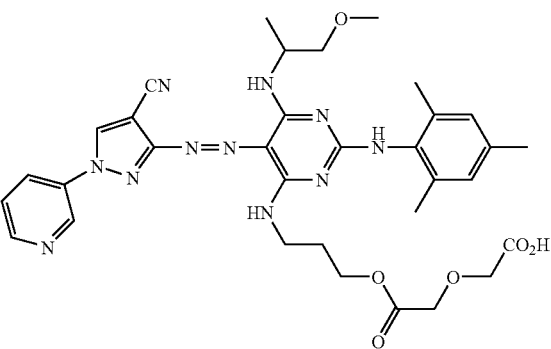

-continued
(119)
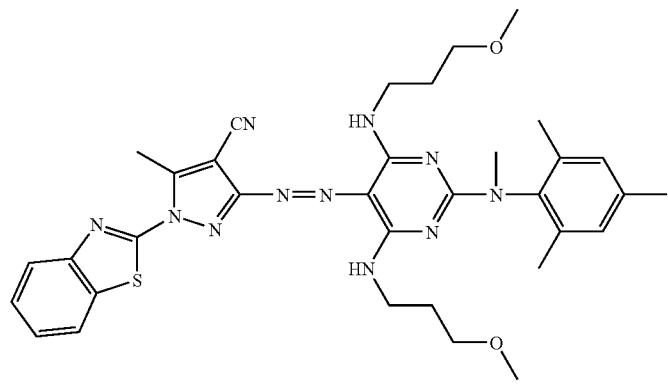
(120)
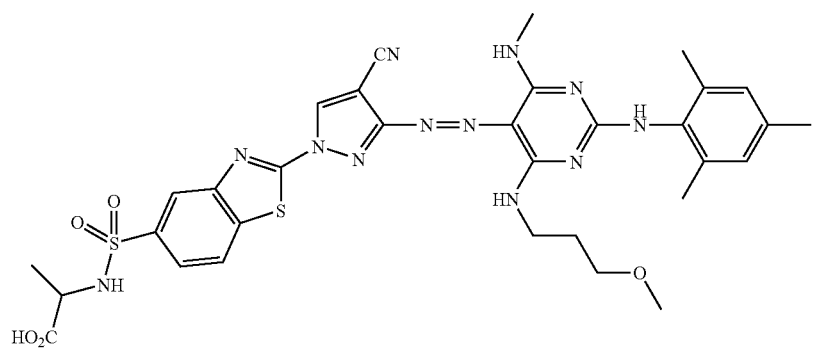
(121)
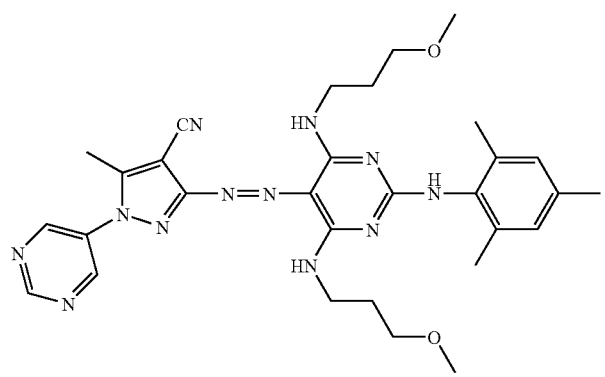
(122)
(123)
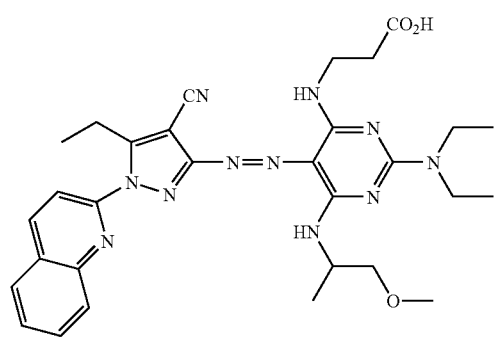
(124)
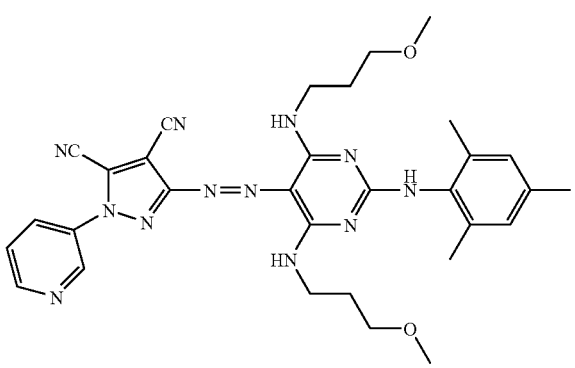

-continued
(125)
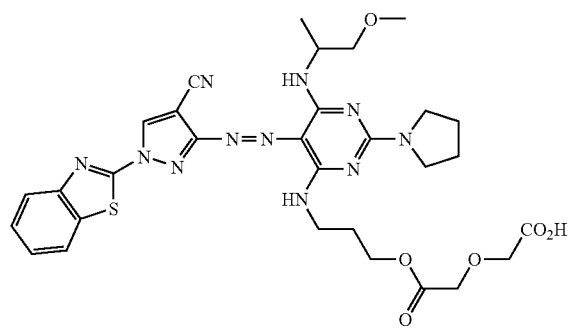
(126)
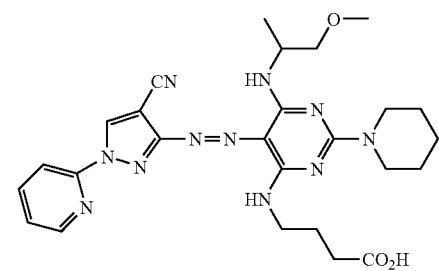
(127)
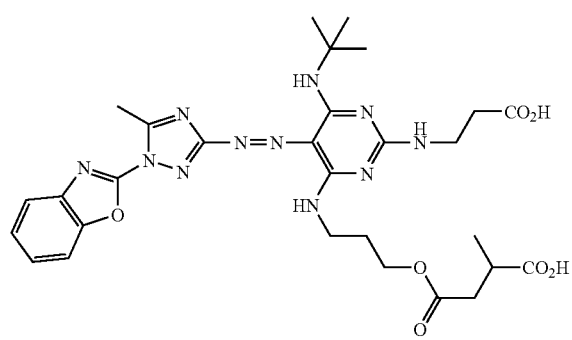
(128)
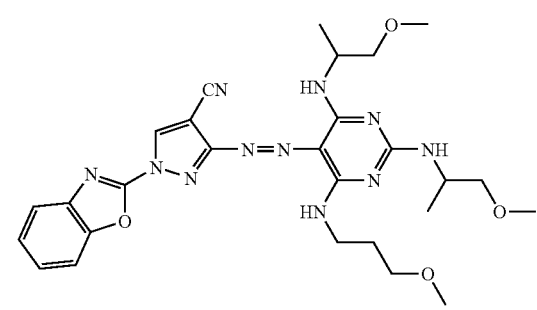
(129)
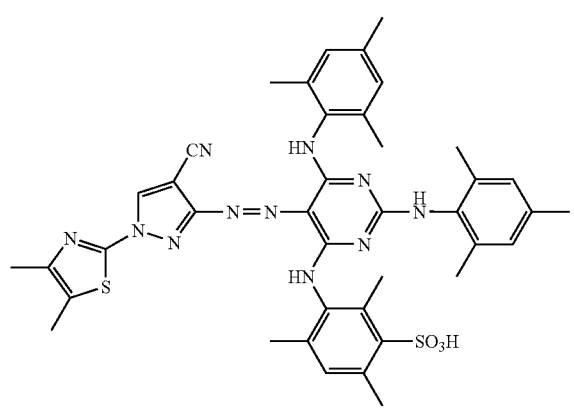
(130)
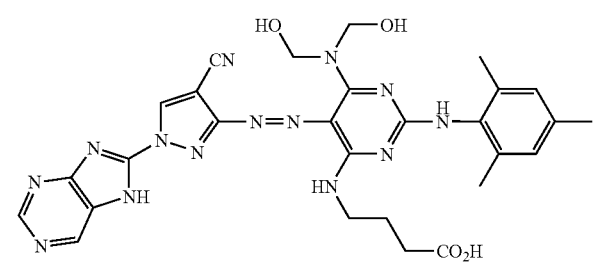
(131)
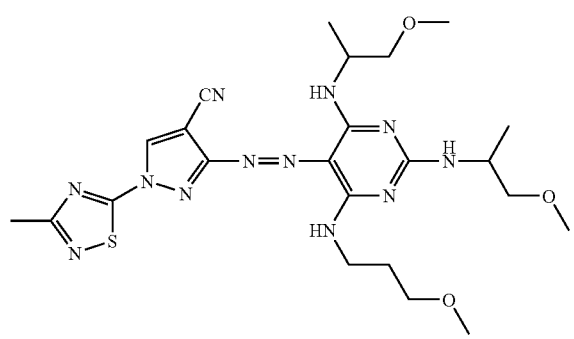
(132)
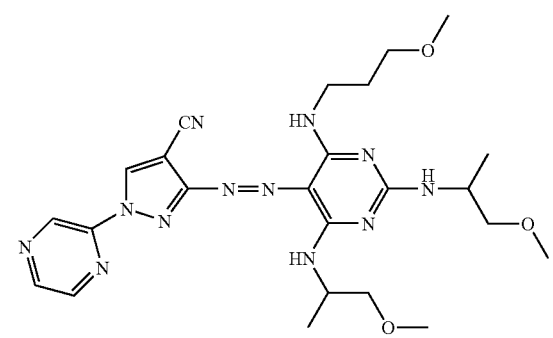

-continued
(133) (134)
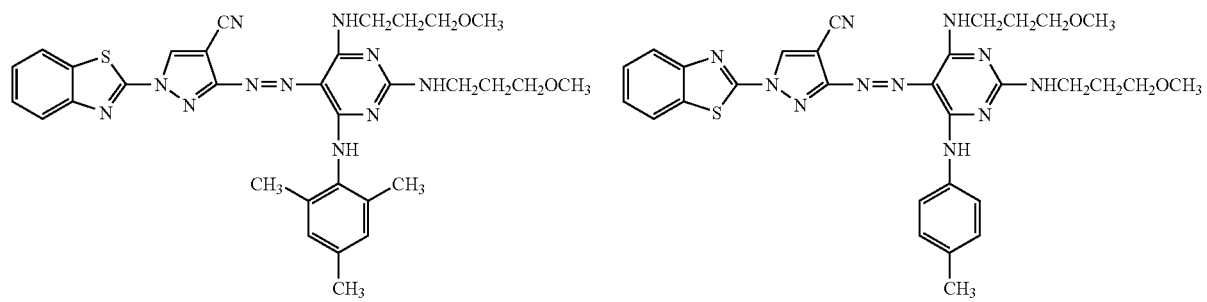
(135)
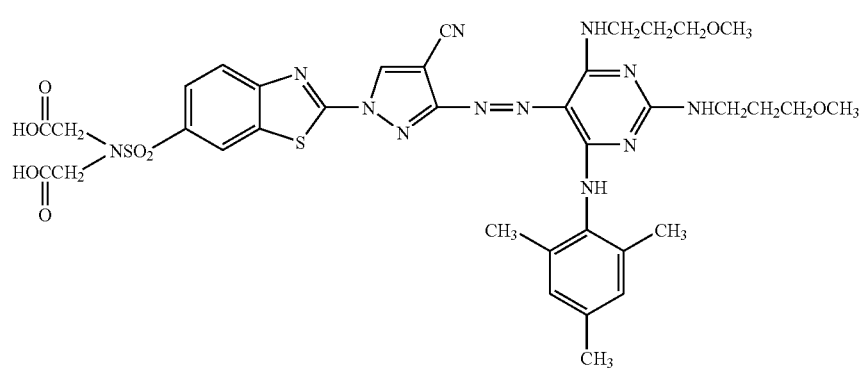
(136)
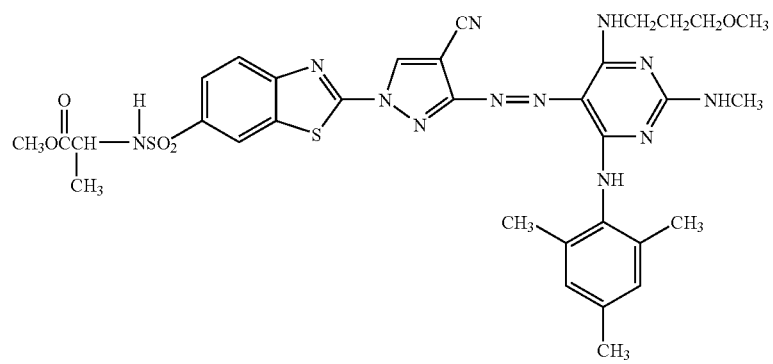
(137)
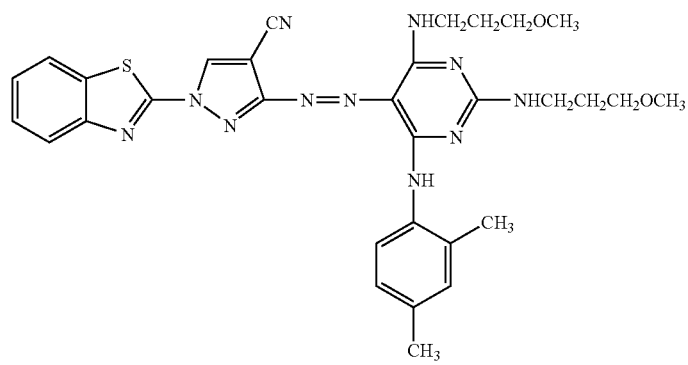

-continued
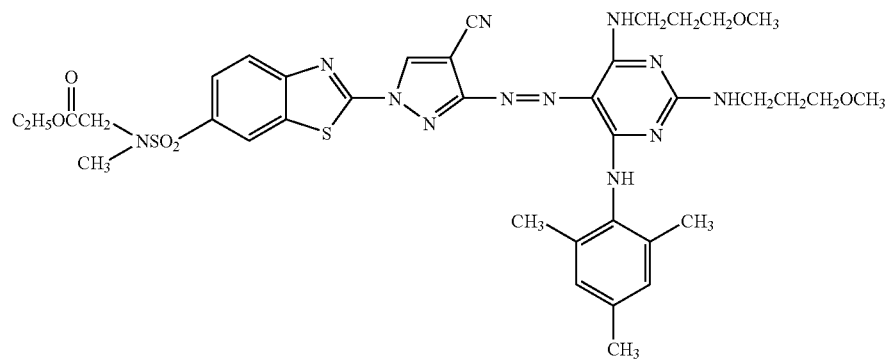
(138)
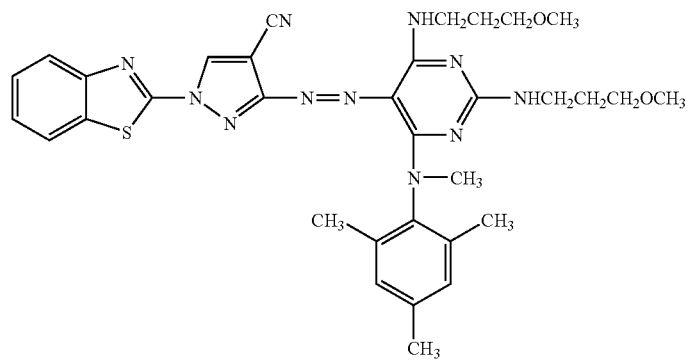
(139)
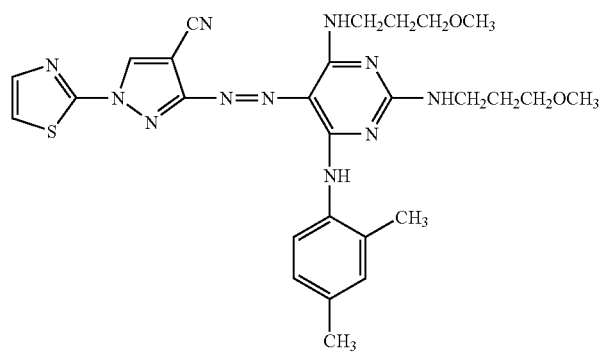
(140)
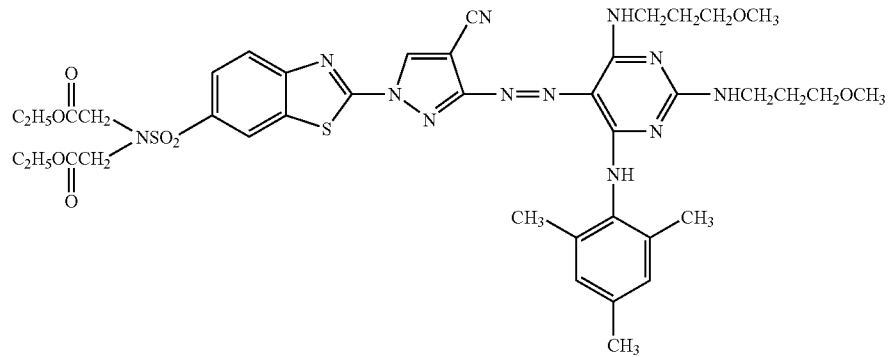
(141)

-continued
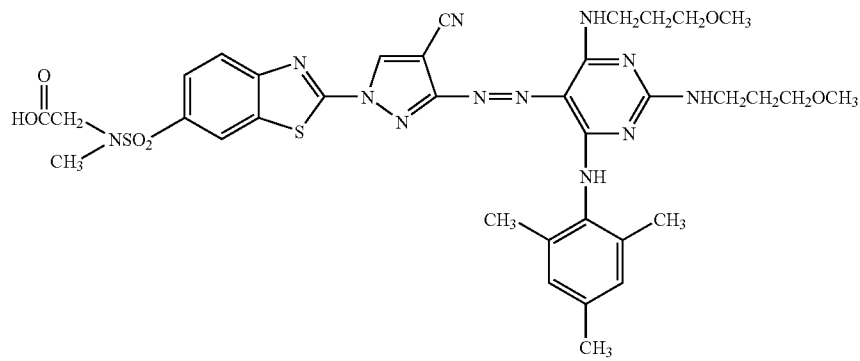
(142)
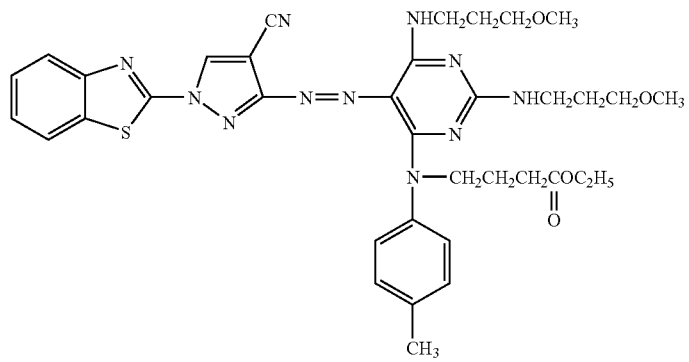
(143)
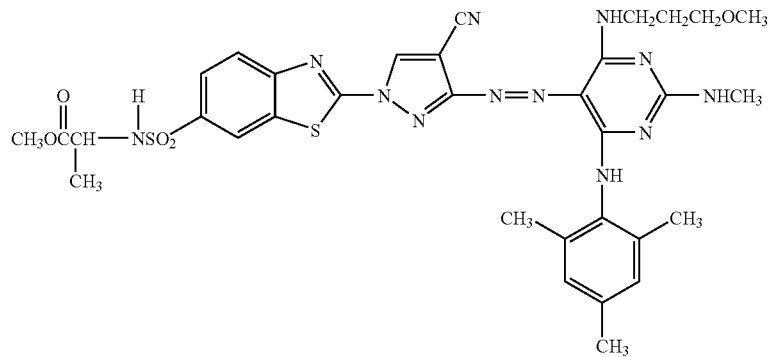
(144)
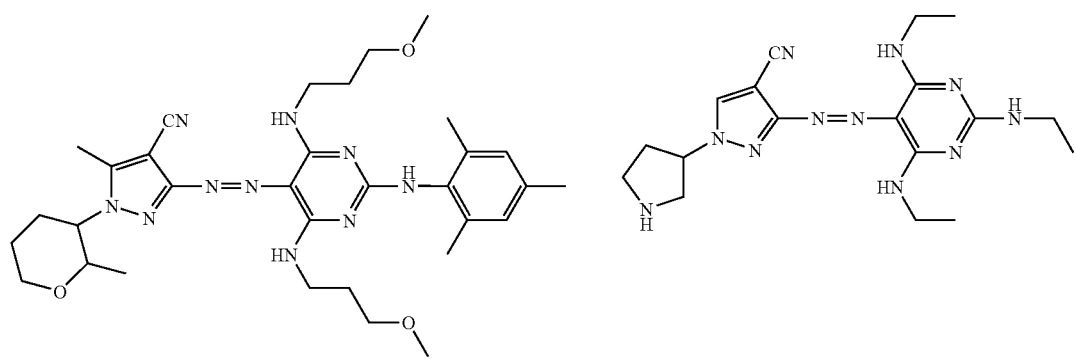
(145) (146)

-continued
(147)
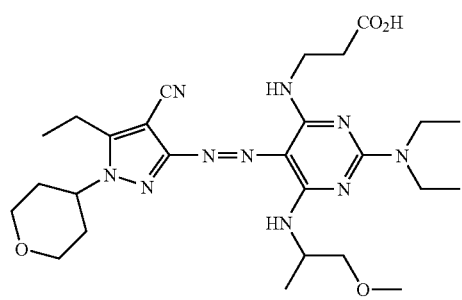
(148)
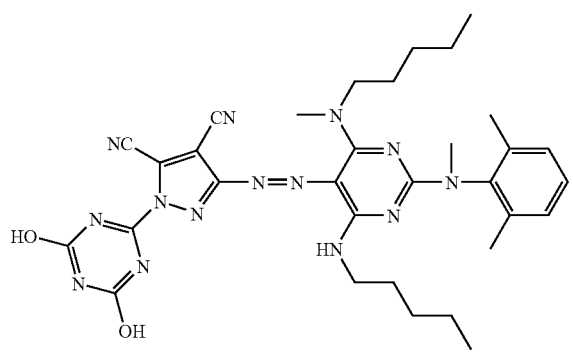
(149)
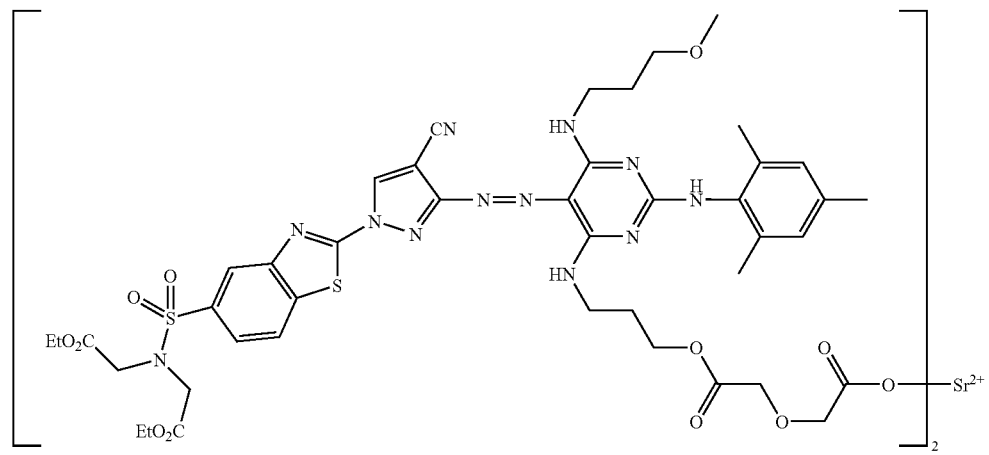
(150)
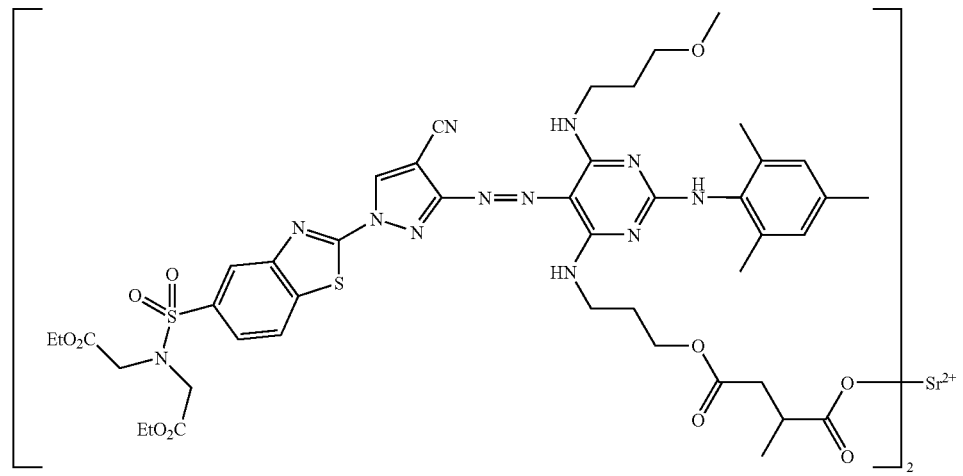

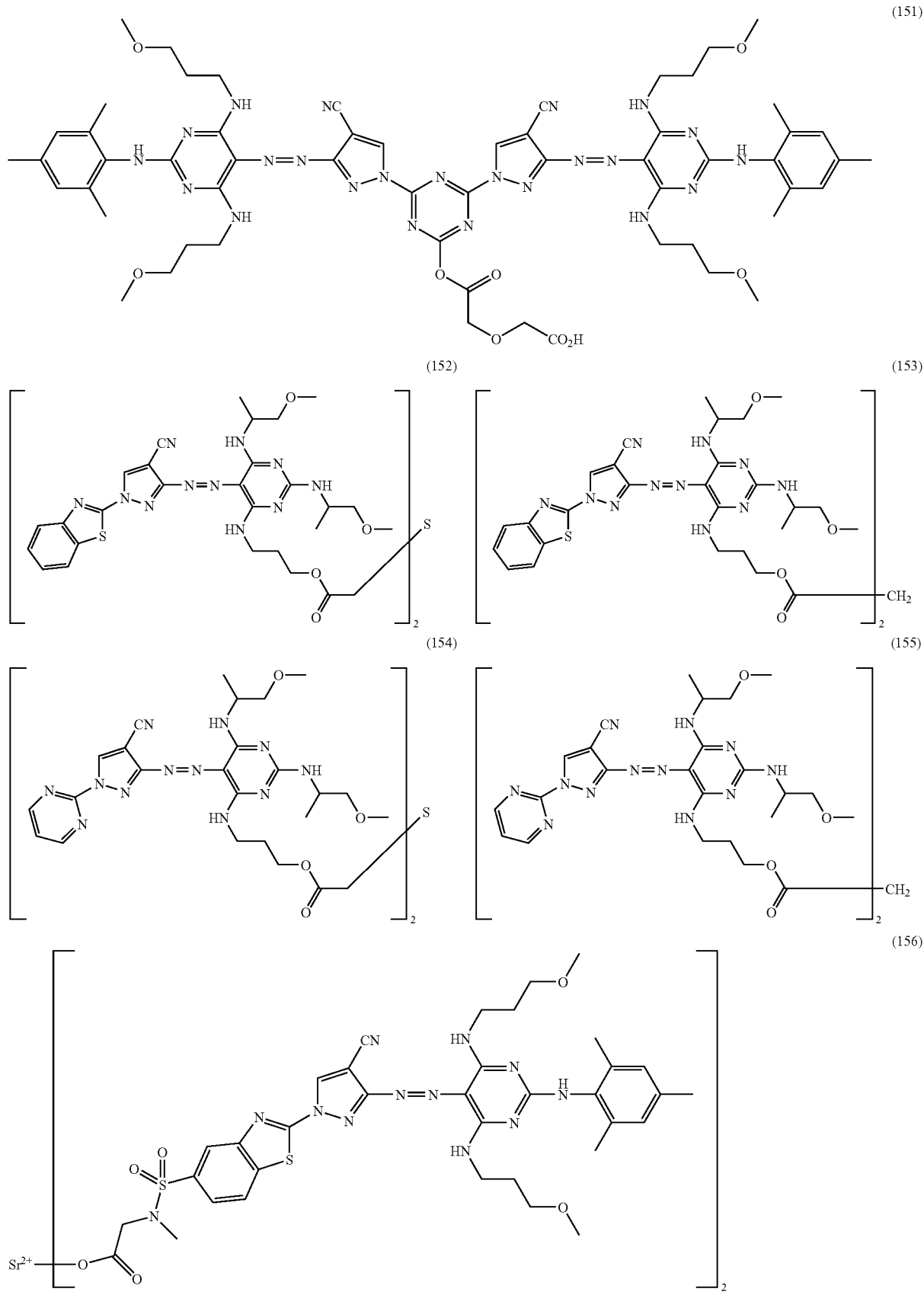

-continued
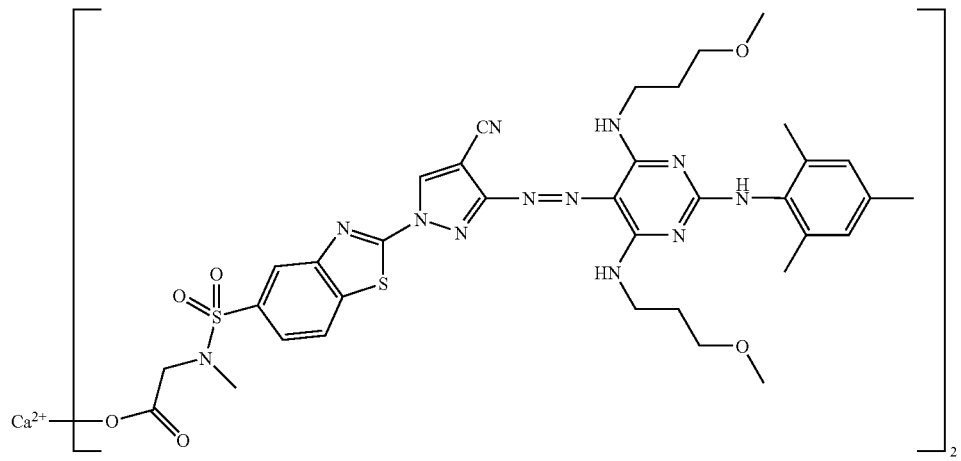
(157)
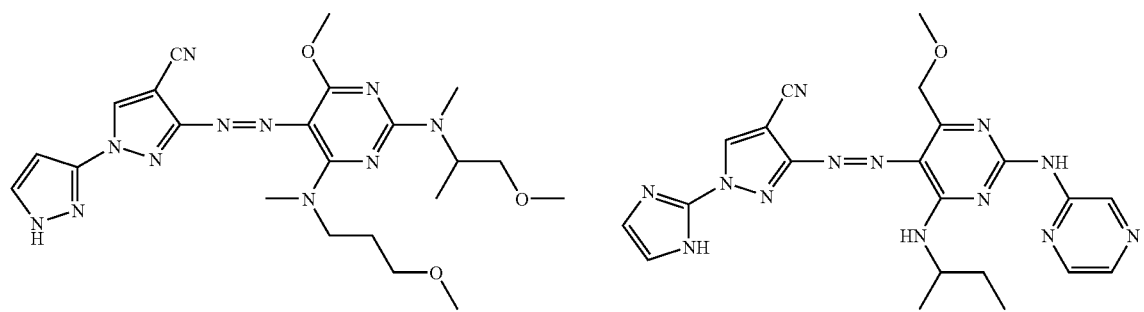
(158) (159)
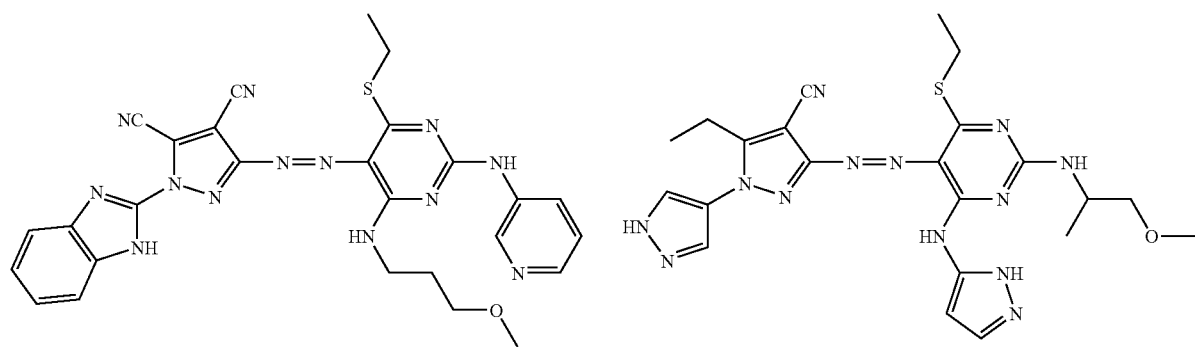
(160) (161)
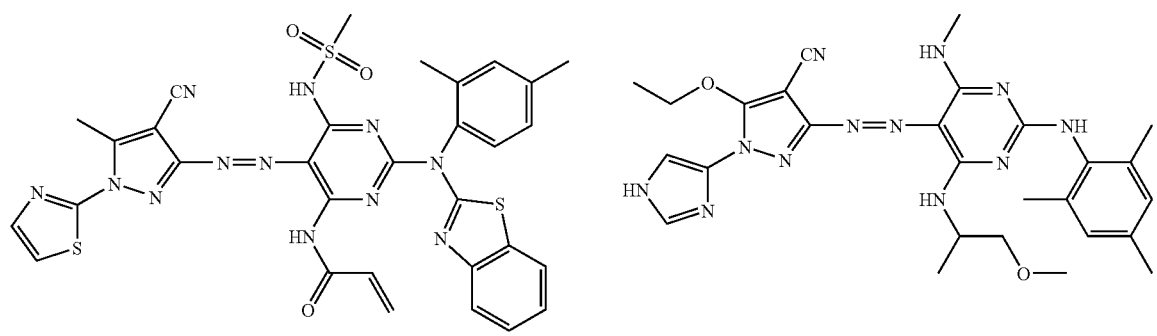
(162) (163)

(164)
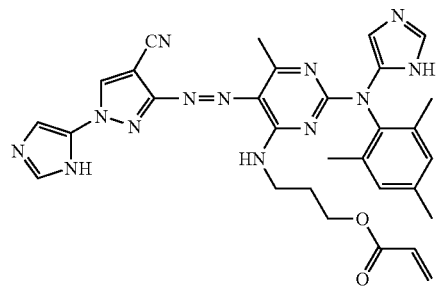
(165)
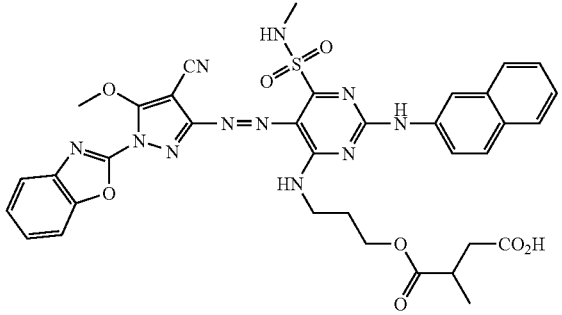
(166)
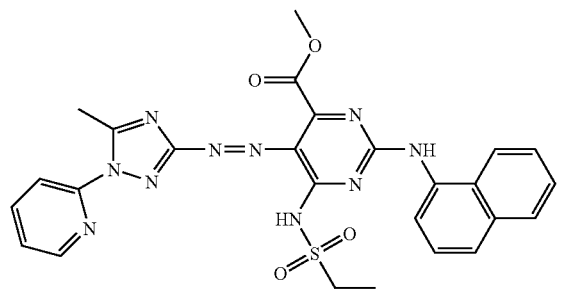
(167)
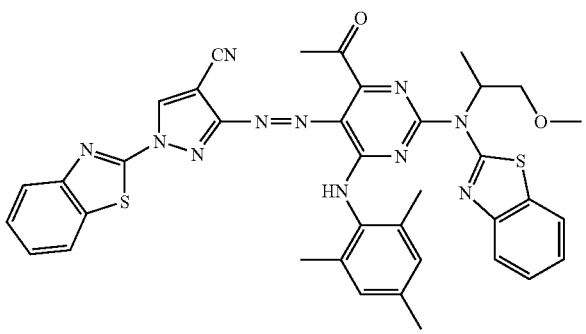
(168)
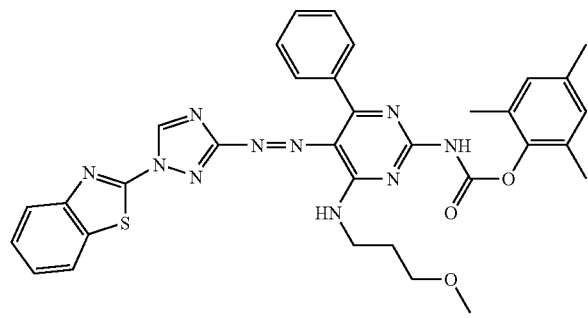
(169)
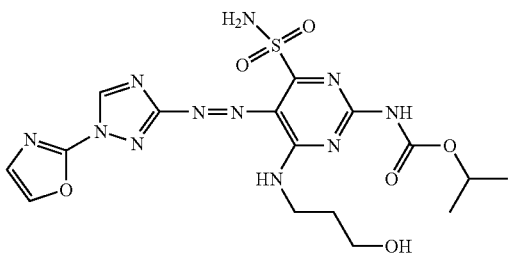
(170)
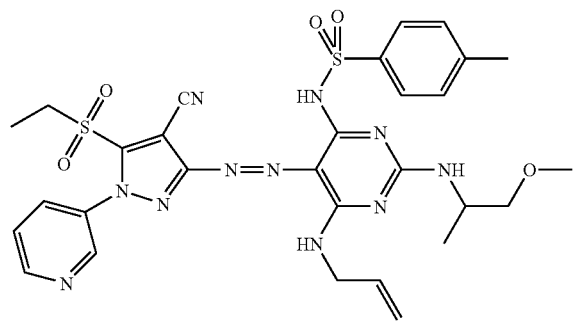
(171)
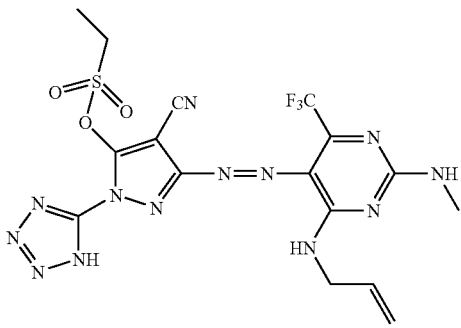

-continued
(172)
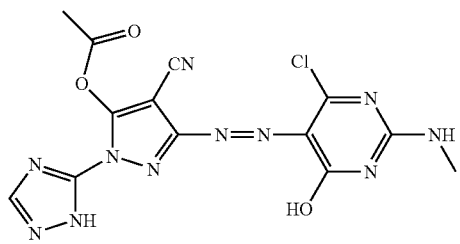
(173)
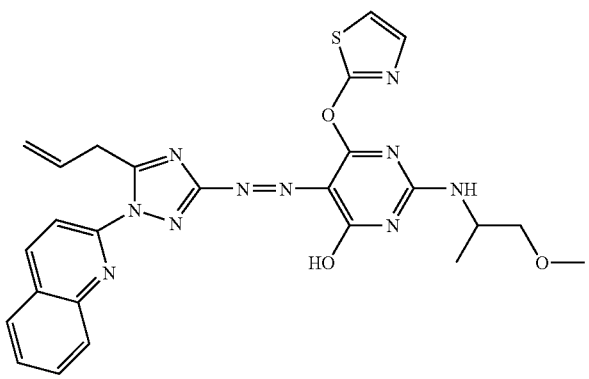
(174)
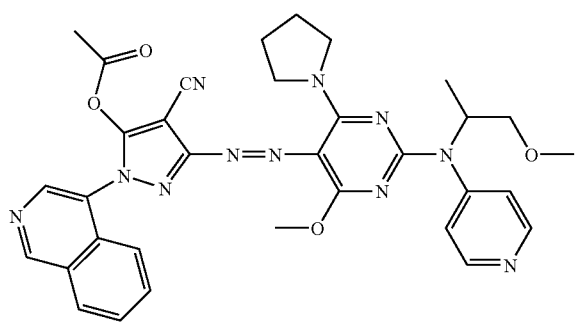
(175)
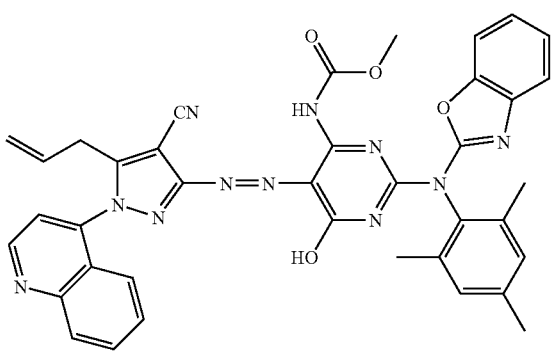
(176)
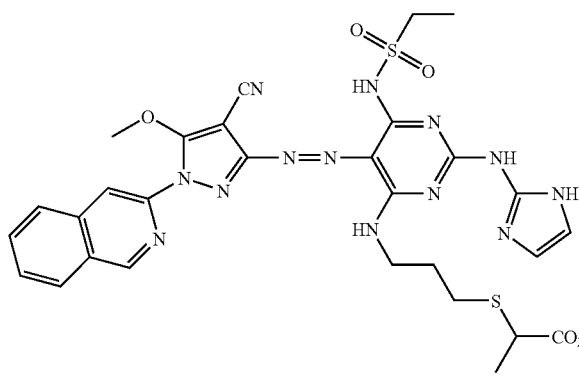
(177)
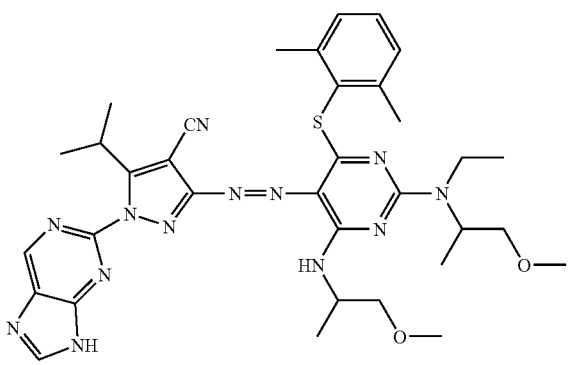
(178)
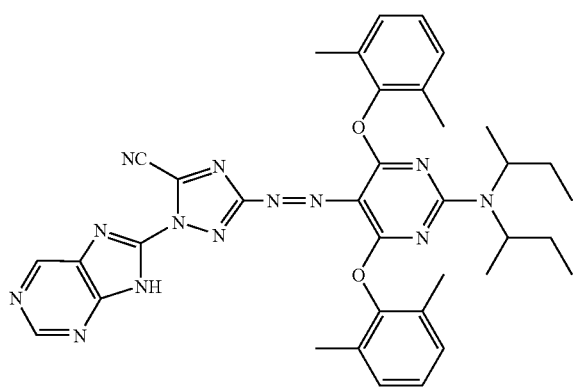
(179)
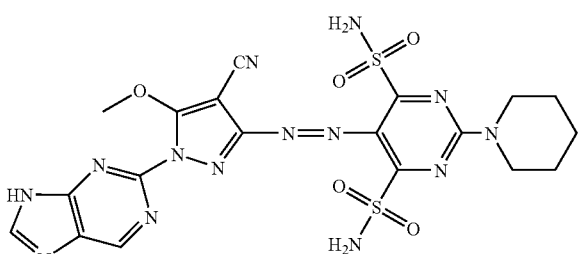

-continued
(180) 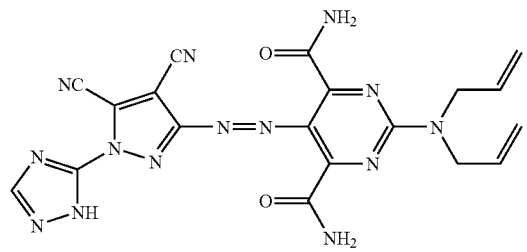
(181) 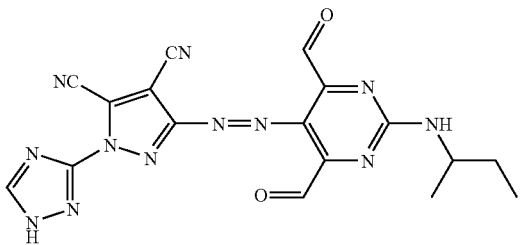
(182) 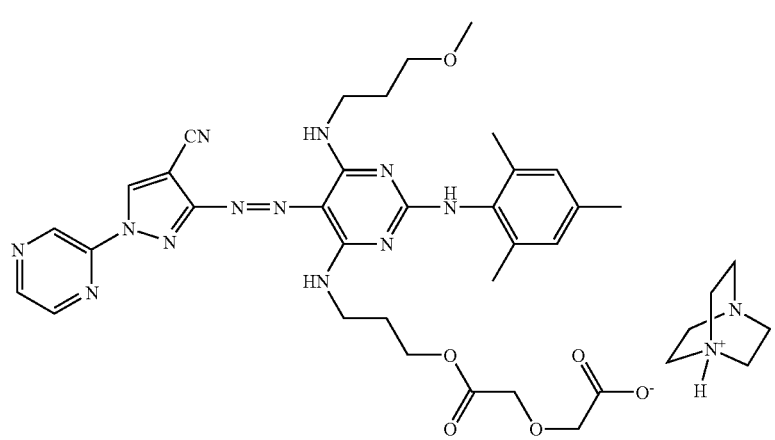
(183) 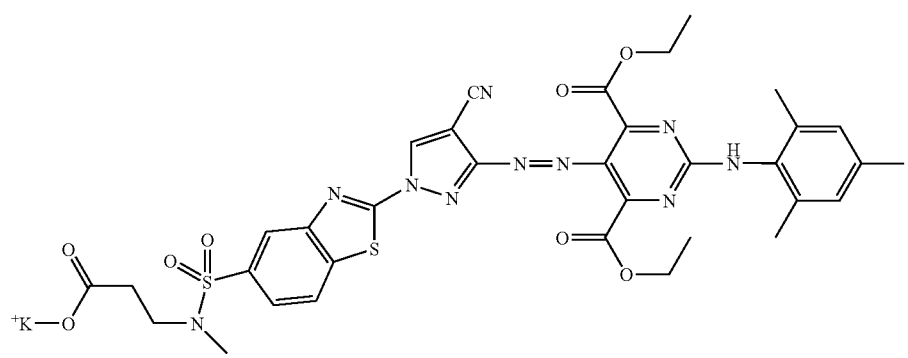
(184) 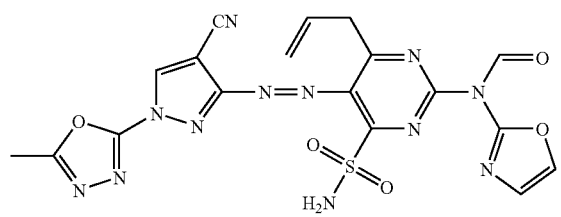
(185) 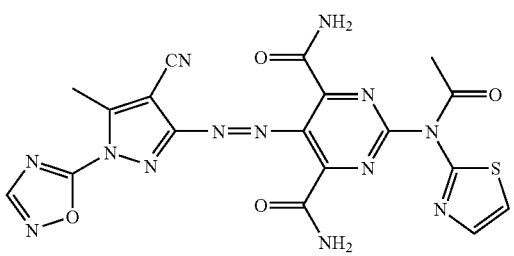
(186) 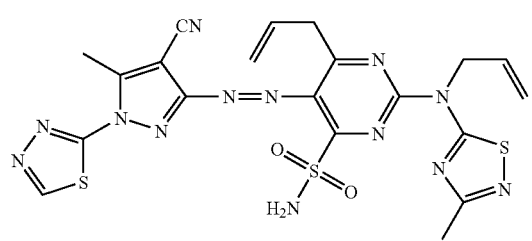
(187) 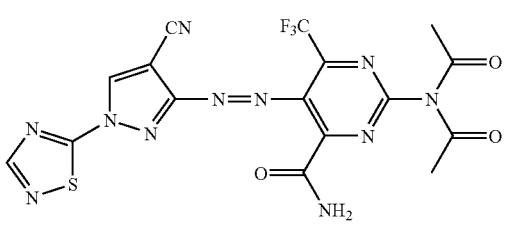

-continued
(188)
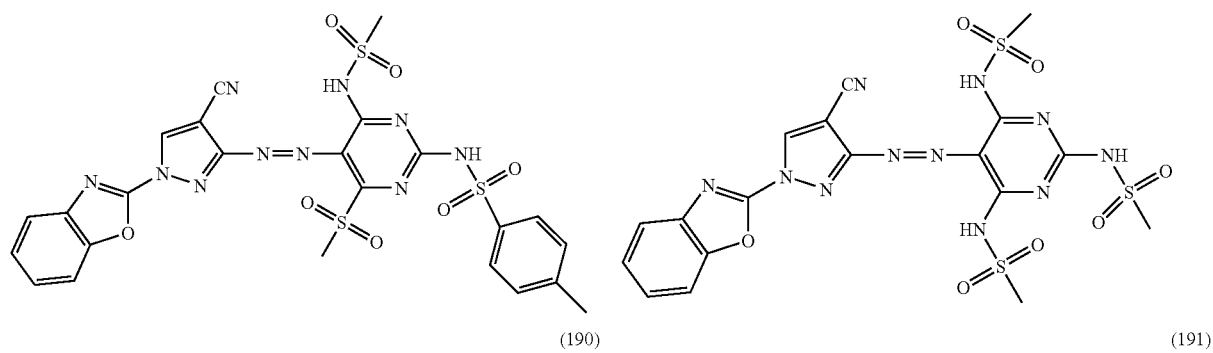
(189)
(190)
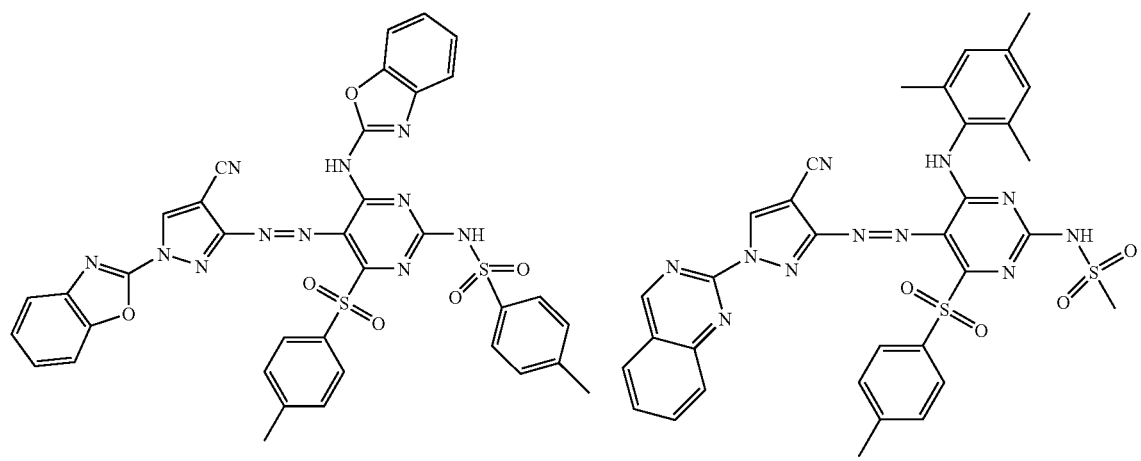
(191)
(192)
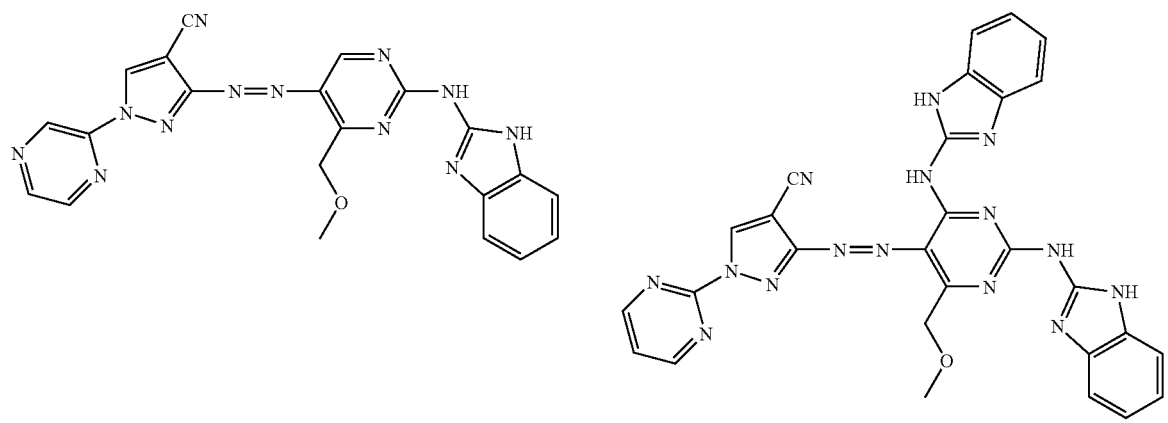
(193)
(194)
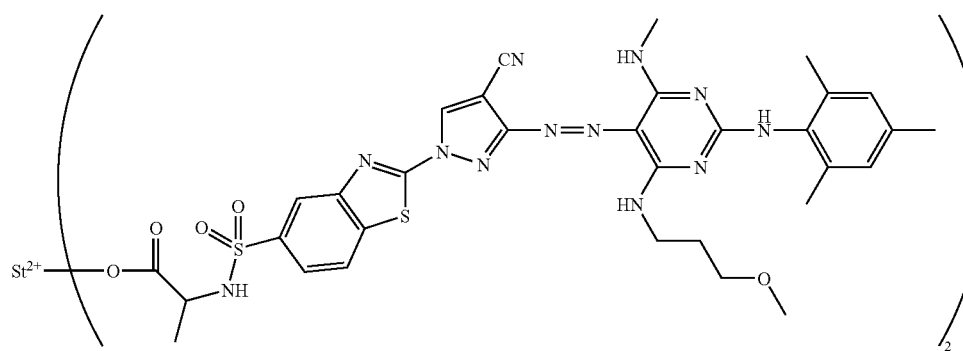

(195)
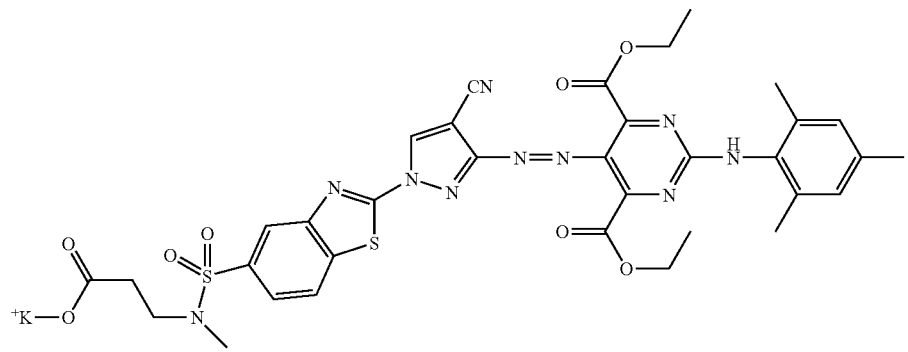
(196)
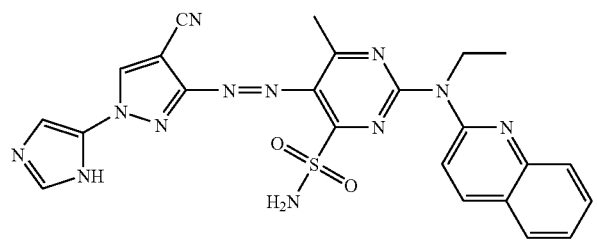
(197)
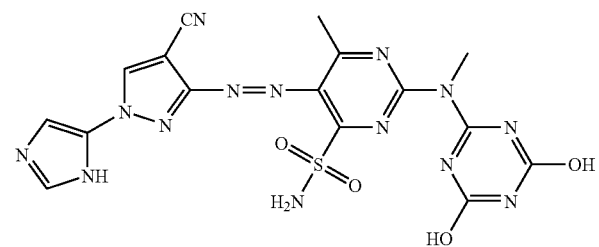
(198)
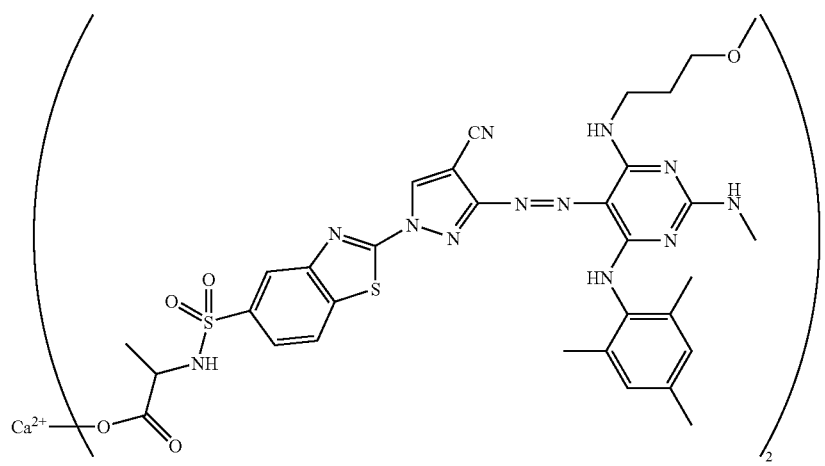
(199)
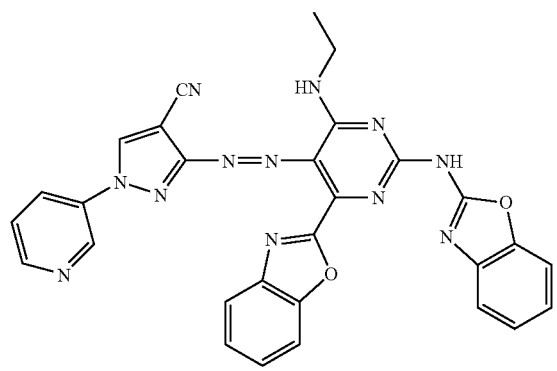
(200)
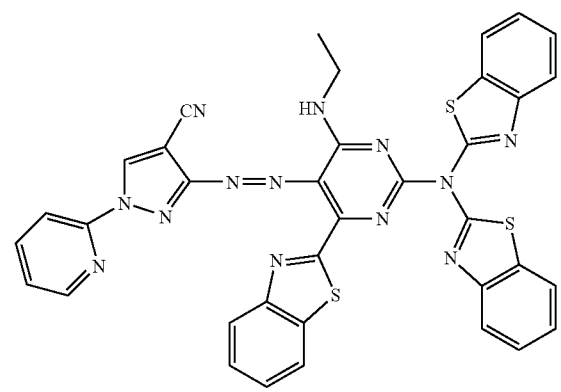

-continued

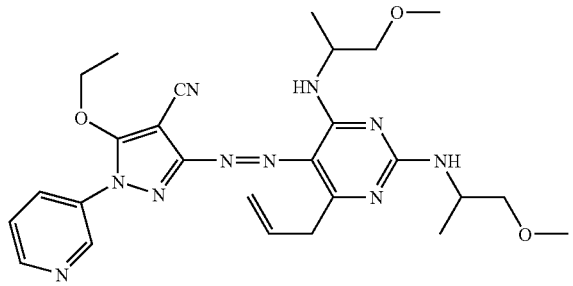
(201)

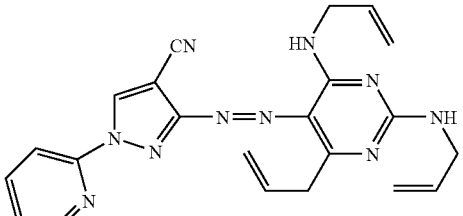
(202)

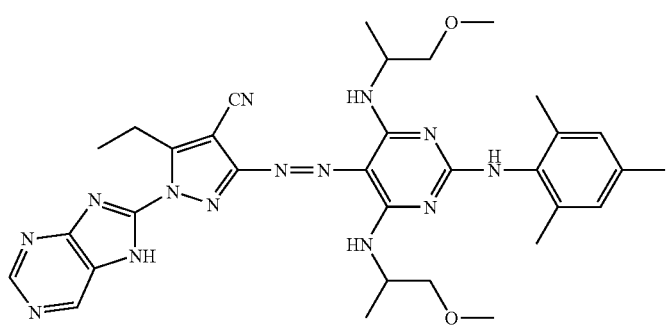
(203)

As a dye in the colored-curable composition of the present invention, the formula (V) may be solely used, or a plurality of types thereof may be used in combination.

The concentration in the colored curable composition of the dye in the present invention differs depending on the molecular weight and the molar absorption coefficient. However, it is preferably 0.5 to 90 mass % with respect to total solid content of the composition, more preferably 5 to 80 mass %, and most preferably 10 to 70 mass %.

The colored curable composition of the present invention comprises the specific dye as an essential component, and it preferably comprises a radiation-sensitive composition, a polymerizable monomer, and a coating solvent. It may further comprise other components such as a binder and a cross linking agent as required. Hereunder is a description of these optional components.

<Binder>

The colored curable composition of the present invention may contain a binder for the purpose of improving film properties or the like. The binder used in the invention is not particularly limited as long as it is alkali-soluble, and is preferably selected in view of heat-resistance, developability, availability, and the like.

The alkali-soluble binder is preferably a linear organic polymer soluble in organic solvents and developable with an aqueous weakly alkaline solution. Examples of such linear organic polymer include polymers having a carboxylic acid at their side chain, for example methacrylic acid copolymers, acrylic acid copolymers, itaconic acid copolymers, crotonic acid copolymers, maleic acid copolymers and partially esterified maleic acid copolymers as described in the specifications of JP-A Nos. 59-44615, 59-53836 and 59-71048, and JP-B Nos. 54-34327, 58-12577 and 54-25957. Acidic cellulose derivatives having a carboxylic acid at the side chain are particularly useful. Other useful binders include polymers prepared by adding an acid anhydride to a polymer having a hydroxyl group, polyhydroxystyrene resins, polysiloxane resins, poly(2-hydroxyethyl (meth)acrylate), polyvinyl pyrrolidone, polyethylene oxide and polyvinyl alcohol.

The binder resin may contain monomers having a hydrophilic group as copolymerization components. Examples of such monomer include alkoxyalkyl(meth)acrylate, hydroxyalkyl(meth)acrylate, glycerol(meth)acrylate, (meth)acrylamide, N-methylol acrylamide, sec- and tert-alkyl acrylamide, dialkylaminoalkyl(meth)acrylate, morpholino(meth)acrylate, N-vinyl pyrrolidone, N-vinyl caprolactam, vinyl imidazole, vinyl triazole, methyl(meth)acrylate, ethyl(meth)acrylate, branched or linear propyl(meth)acrylate, branched or linear butyl(meth)acrylate, and phenoxyhydroxypropyl (meth)acrylate.

Other useful monomers having a hydrophilic group include monomers having a tetrahydrofurfuryl group, phosphoric acid, a phosphate ester, a quaternary ammonium salt, an ethyleneoxy chain, a propyleneoxy chain, sulfonic acid or a salt of sulfonic acid, a morpholinoethyl group or the like.

The binder may have a polymerizable groups at its side chain for improving cross linking efficiency. Polymers containing allyl groups, (meth)acrylic groups, allyloxyalkyl groups or the like at their side chain are useful. Examples of the polymer having such polymerizable group include KS RESIST 106 (trade name, manufactured by Osaka Organic Chemical Industries, Ltd.) and CYCLOMER-P Series (trade name, manufactured by Daicel Chemical Industries, Ltd.).

Alcohol-soluble nylons and polyethers of 2,2-bis(4-hydroxyphenyl)propane and epichlorohydrin are also useful for enhancing the strength of cured coating films.

Among these binders, from the view point of heat resistance, polyhydroxystyrene resins, polysiloxane resins, acrylic resins, acrylamide resins and acrylic/acrylamide copolymer resins are preferable, and from the viewpoint of controlling developability, acrylic reins, acrylamide resins and acrylic/acrylamide copolymer resins are preferable. Preferable acrylic resins include copolymers comprising the monomers selected from benzyl(meth)acrylate, (meth)acrylate, hydroxyethyl(meth)acrylate, (meth)acrylamide or the like, KS-RESIST 106 (trade name, manufactured by Osaka Organic Chemical Industries, Ltd.) and CYCLOMER-P Series (trade name, manufactured by Daicel Chemical Industries Co.). As the binder used in the invention, alkali-soluble (meth)acrylic resins are preferable, and (meth)acrylic resins having alkali-soluble polymerizable side chains are more preferable.

Alkali-soluble phenol resins may be used as the binder employed in the invention. When the colored curable composition of the invention is a positive-type composition, the alkali-soluble phenol resin can be favorably used therein. Examples of the alkali-soluble phenol resin include a novolac resin and vinyl polymers.

The novolac resin can be obtained, for example, by condensation of a phenol and an aldehyde in the presence of an acid catalyst. Examples of the phenol include phenol, cresol, ethylphenol, butylphenol, xylenol, phenylphenol, catechol, resorcinol, pyrogallol, naphthol and bisphenol A.

Examples of the aldehyde include formaldehyde, paraformaldehyde, acetaldehyde, propionaldehyde and benzaldehyde.

One or more of phenol compounds and one or more of aldehyde compounds may be used in combination.

Specific examples of the novolac resin include methacresol and paracresol, and a condensation product of a mixture of methacresol and paracresol with formalin.

The molecular weight distribution of the novolac resin may be adjusted by a method such as fractionation. Also, low molecular weight components having a phenolic hydroxyl group such as bisphenol C and bisphenol A may be added to the novolac resin.

The mass average molecular weight (as converted to polystyrene-equivalent value measured by GPC) of the binder is preferably 1000 to $2\times10^5$, more preferably 2000 to $1\times10^5$, and particularly preferably 5000 to $5\times10^4$.

The amount of use of the binder in the colored curable composition of the invention is preferably 0 to 90% by mass, more preferably 0 to 60% by mass, and particularly preferably 0 to 30% by mass, relative to the total solid content in the composition.

<Cross Linking Agent>

In the invention, the curing reaction of the film can be more facilitated than usual by using the dye represented by the formula (V) or (II), and a film having good curability can be obtained. When a cross linking agent is used additionally, more highly cured films may be obtained.

The cross linking agent is not particularly limited as long as it can harden films in cross linking reaction, and examples thereof include (a) epoxy resins; (b) melamine, guanamine, glycoluril, and urea compounds substituted by at least one group selected from methylol, alkoxymethyl, and acyloxymethyl groups; and (c) phenol, naphthol, and hydroxyanthracene compounds substituted by at least one group selected from methylol, alkoxymethyl, and acyloxymethyl groups. Among them, multifunctional epoxy resins are particularly preferable.

The epoxy resin (a) is not particularly limited as long as it contains an epoxy group and has cross linking property, and examples thereof include bivalent glycidyl group-containing low-molecular weight compounds such as bisphenol A glycidyl ether, ethylene glycol diglycidyl ether, butanediol diglycidyl ether, hexanediol diglycidyl ether, dihydroxybiphenyl diglycidyl ether, phthalic diglycidyl ester, and N,N-diglycidylaniline; trivalent glycidyl group-containing low-molecular weight compounds represented by trimethylolpropane triglycidyl ether, trimethylol phenol triglycidyl ether, and Tris P-PA triglycidyl ether; quadrivalent glycidyl group-containing low-molecular weight compounds represented by pentaerythritol tetraglycidyl ether and tetramethylol bisphenol A tetraglycidyl ether; multivalent glycidyl group-containing low-molecular weight compounds represented by dipentaerythritol pentaglycidyl ether and dipentaerythritol hexaglycidyl ether; and glycidyl group-containing polymeric compounds such as polyglycidyl (meth)acrylate and 1,2-epoxy-4-(2-oxiranyl)cyclohexane adducts of 2,2-bis(hydroxymethyl)-1-butanol.

The number of methylol, alkoxymethyl, and acyloxymethyl groups contained as substituent groups in the cross linking agent (b) is from 2 to 6 when it is a melamine compound, and is from 2 to 4 when it is a glycoluril, guanamine, or urea compound, but is preferably from 5 to 6 when it is a melamine compound, and is preferably from 3 to 4 when it is a glycoluril, guanamine, or urea compound.

Hereinafter, the melamine compound, guanamine compound, glycoluril compound and urea compound described in item (b) above is collectively referred to as compounds of item (b) (methylol group-containing compounds, alkoxymethyl group-containing compounds, or acyloxymethyl group-containing compounds) in some cases.

The methylol group-containing compound of item (b) is prepared by heating an alkoxymethyl group-containing compound of item (b) in alcohol in the presence of an acid catalyst such as hydrochloric acid, sulfuric acid, nitric acid, or methanesulfonic acid. The acyloxymethyl group-containing compound of item (b) is prepared by mixing and stirring a methylol group-containing compound of item (b) with an acyl chloride in the presence of a basic catalyst.

Hereinafter, specific examples of the compounds of item (b) having substituents as described above will be listed.

Examples of the melamine compounds include hexamethylolmelamine, hexamethoxymethylmelamine, compounds obtained by methoxymethylating 1 to 5 methylol groups of hexamethylolmelamine and mixtures thereof, hexamethoxyethylmelamine, hexacyloxymethylmelamine, and compounds obtained by acyloxymethylating 1 to 5 methylol groups of hexamethylolmelamine and mixtures thereof.

Examples of the guanamine compounds include tetramethylolguanamine, tetramethoxymethylguanamine, compounds obtained by methoxymethylating 1 to 3 methylol groups of tetramethylolguanamine and mixtures thereof, tetramethoxyethylguanamine, tetraacyloxymethylguanamine, compounds obtained by acyloxymethylating 1 to 3 methylol groups of tetramethylolguanamine and mixtures thereof.

Examples of the glycoluril compounds include tetramethylol glycoluril, tetramethoxymethyl glycoluril, compounds obtained by methoxymethylating 1 to 3 methylol groups of tetramethylol glycoluril and mixtures thereof, and compounds obtained by acyloxymethylating 1 to 3 methylol groups of tetramethylol glycoluril and mixtures thereof.

Examples of the urea compounds include tetramethylolurea, tetramethoxymethylurea, compounds obtained by methoxymethylating 1 to 3 methylol groups of tetramethylolurea and mixtures thereof, and tetramethoxyethylurea. These compounds can be used singly, or in the form of a mixture thereof.

Only one compound of item (b) may be used, or a plurality of compounds of item (b) may be used in combination.

The cross linking agent (c), i.e., the phenol, naphthol, or hydroxyanthracene compound substituted by at least one group selected from methylol, alkoxymethyl, and acyloxymethyl groups, prevents intermixing with the topcoat photoresist and improves the strength of the film further by thermal cross linking in a similar manner to the cross linking agent (b) above.

Hereinafter, these compounds may be referred to collectively as compounds of item (c) (methylol group-containing compounds, alkoxymethyl group-containing compounds, and acyloxymethyl group-containing compounds).

The number of the methylol, acyloxymethyl, and alkoxymethyl groups contained in the cross linking agent (c) is at least two per molecule, and compounds having a skeletal phenol compound substituted at all 2- and 4-sites are preferable, from the viewpoints of thermal cross linking property and storage stability. In addition, the skeletal naphthol or hydroxyanthracene compound is also preferably a compound having substituents at all ortho- and para-positions relative to the OH group. The 3- or 5-position of the skeletal phenol compound may be unsubstituted or substituted. In addition, in the skeletal naphthol compound, the positions other than ortho-positions relative to the OH group may be unsubstituted or substituted.

The methylol group-containing compound of item (c) is prepared by using a compound having hydrogen atoms at the ortho- and para-positions (2- or 4-sites) to the phenolic OH group as raw material and reacting it with formalin in the presence of a basic catalyst such as sodium hydroxide, potassium hydroxide, ammonia, or a tetraalkylammonium hydroxide.

The alkoxymethyl group-containing compound of item (c) is prepared by heating a methylol group-containing compound of item (c) in alcohol in the presence of an acid catalyst such as hydrochloric acid, sulfuric acid, nitric acid, or methanesulfonic acid.

The acyloxymethyl group-containing compound of item (c) is prepared by reacting the methylol group-containing compound with an acyl chloride in the presence of a basic catalyst.

Examples of the skeletal compounds for the cross linking agent (c) include phenol, naphthol, and hydroxyanthracene compounds having no substituent on the ortho- and para-positions relative to the phenolic OH group, and specific examples thereof for use include phenol, cresol isomers, 2,3-xylenol, 2,5-xylenol, 3,4-xylenol, 3,5-xylenol, bisphenols such as bisphenol A, 4,4'-bishydroxybiphenyl, Tris P-PA (manufactured by Honshu Chemical Industry Co., Ltd.), naphthol, dihydroxynaphthalene, and 2,7-dihydroxyanthracene.

Specific examples of the cross linking agent (c) include trimethylol phenol, tri(methoxymethyl)phenol, compounds obtained by methoxymethylating 1 or 2 methylol groups of trimethylol phenol, trimethylol-3-cresol, tri(methoxymethyl)-3-cresol, compounds obtained by methoxymethylating 1 or 2 methylol groups of trimethylol-3-cresol, dimethylol cresol such as 2,6-dimethylol-4-cresol, tetramethylol bisphenol A, tetramethoxymethylbisphenol A, compounds obtained by methoxymethylating 1 to 3 methylol groups of tetramethylol bisphenol A, tetramethylol-4,4'-bishydroxybiphenyl, tetramethoxymethyl-4,4'-bishydroxybiphenyl, TrisP-PA in form of hexamethylol, hexamethoxymethylated TrisP-PA, compounds obtained by methoxymethylating 1 to 5 methylol groups of hexamethylol body of TrisP-PA, and bishydroxymethylnaphthalenediol.

Further examples include hydroxyanthracene compounds such as 1,6-dihydroxymethyl-2,7-dihydroxyanthracene, and acyloxymethyl-containing compounds such as compounds obtained by acyloxymethylating some or all of the methylol groups of the above-mentioned methylol-containing compounds.

Preferable examples of those compounds include trimethylol phenol, bishydroxymethyl-p-cresol, tetramethylol bisphenol A, hexamethylol body of TrisP-PA (manufactured by Honshu Kagaku Kogyo Co., Ltd.), or phenol compounds obtained by substituting some or all of the methylol groups of these compounds with alkoxymethyl groups or with methylol group(s) and alkoxymethyl group(s). Only one compound of item (c) may be used, or a plurality of compounds of item (c) may be used in combination.

The colored curable composition according to the invention does not necessarily contain a cross linking agent. The content of the cross linking agents (a) to (c), if used, in the colored curable composition may vary according to the raw materials used, but is preferably from 1 to 70 wt %, more preferably from 5 to 50 wt %, and particularly preferably from 7 to 30 wt %, with respect the total solid matters (by weight) in the composition.

<Polymerizable Monomer>

The colored curable composition according to the invention preferably contains at least one polymerizable monomer. The polymerizable monomer is contained principally when the colored curable composition according to the invention is used as a negative composition.

When the colored curable composition according to the invention is of positive type, the colored curable composition may contain a polymerizable monomer together with a radiation-sensitive compound such as a photopolymerization initiator, as described below. In this case, the curing degree of the pattern obtained can be further enhanced. The polymerizable monomer is described below.

The polymerizable monomer is preferably a compound having a boiling point of 100° C. or higher under atmospheric pressure and containing at least one addition-polymerizable ethylenic group. Examples thereof include monofunctional acrylates and methacrylates such as polyethylene glycol mono(meth)acrylate, polypropylene glycol mono(meth)acrylate, and phenoxyethyl (meth)acrylate; polyfunctional acrylates and methacrylates such as polyethylene glycol di(meth)acrylate, trimethylolethane tri(meth)acrylate, neopentylglycol di(meth)acrylate, pentaerythritol tri(meth)acrylate, pentaerythritol tetra(meth)acrylate, dipentaerythritol penta(meth)acrylate, dipentaerythritol hexa(meth)acrylate, hexanediol (meth)acrylate, trimethylolpropane tri(acryloyloxypropyl)ether, tri(acryloyloxyethyl)isocyanurate, multifunctional alcohols (such as glycerol or trimethylolethane) ethyleneoxide or propyleneoxide adducts that are (meth)acrylated, the urethane acrylates such as those described in JP-B Nos. 48-41708 and 50-6034, and JP-A No. 51-37193, the polyester acrylates such as those described in JP-A No. 48-64183, and JP-B Nos. 49-43191 and 52-30490, and epoxy acrylates, i.e., reaction products of an epoxy resin and a (meth)acrylic acid; and mixture of monomers selected from the above. Also included are the photosetting monomers and oligomers described in the Journal of Adhesion Society of Japan Vol. 20, No. 7, pp 300 to 308.

The polymerizable monomer is preferably a (meth)acrylic ester-based monomer; and a trifunctional or higher-functional (meth)acrylic ester-based monomer is particularly preferable.

The content of the polymerizable monomer in the colored curable composition according to the invention is preferably 0.1 to 90 wt %, more preferably 1.0 to 80 wt %, and particularly preferably 2.0 to 70 wt %, with respect to the solid matter in the composition.

—Radiation Sensitive Compound—

The colored curable composition of the invention may favorably contain at least one radiation sensitive compound. The radiation sensitive compound according to the invention is a compound capable of starting a chemical reaction such as radical generation, acid generation and base generation upon application of a radiation such as UV, deep UV, visible light, IR light and electron beam. The radiation sensitive compound is used for insolubilizing the coating film against alkali developer. The initiating species derived from the compound such as a radical or an acid reacts with the binder that is present in the coating film comprising the composition, thereby achieving insolubilization through a reaction such as cross linking, polymerization, or decomposition of the acidic group, or thereby causing a reaction to occur and proceed such as polymerization of polymerizable monomers or oligomers present in the coating film or cross linking with the cross linking agent. The radiation sensitive compound may be a photopolymerization initiator such as the known initiators described below.

A photopolymerization initiator may be favorably contained in the colored curable composition when the colored curable composition of the invention is a negative-type composition, while a naphthoquinone-diazide compound is favorably contained when the colored curable composition is a positive-type composition.

<Photopolymerization Initiator>

Photopolymerization initiators, which are preferable components when the colored curable composition of the invention is a negative type composition, are described first.

The photopolymerization initiator is not particularly limited as long as the photopolymerization initiator can polymerize the polymerizable monomer through the action of an initiating species generated from the initiator, and is selected preferably from the viewpoints of characteristics, initiation efficiency, absorption wavelength, availability, cost, and others.

The positive type colored curable composition containing a naphthoquinone diazide compound may further contain a photopolymerization initiator, which further enhances the curing degree of the patterned obtained.

Examples of the photopolymerization initiator include at least one active halogen compound selected from halomethyloxadiazole compounds and halomethyl-s-triazine compounds, 3-aryl substituted coumarin compounds, lophine dimers, benzophenone compounds, acetophenone compounds and their derivatives, cyclopentadiene-benzene-iron complex and salts thereof, and oxime compounds. The photopolymerization initiator is preferably at least one compound selected from lophine dimers, benzophenoene compounds, acetophenone compounds, oxime-based compounds, and halomethyl-s-triazine compounds.

Examples of the reactive halogen compounds such as the halomethyloxadiazole compounds include the 2-halomethyl-5-vinyl-1,3,4-oxadiazole compounds and others such as those described in JP-B No. 57-6096; 2-trichloromethyl-5-styryl-1,3,4-oxadiazole, 2-trichloromethyl-5-(p-cyanostyryl)-1,3,4-oxadiazole, and 2-trichloromethyl-5-(p-methoxy styryl)-1,3,4-oxadiazole.

Examples of the trihalomethyl-s-triazine compounds as photopolymerization initiators include the vinyl-halomethyl-s-triazine compounds such as those described in JP-B No. 59-1281, the 2-(naphtho-1-yl)-4,6-bis-halomethyl-s-triazine compounds such as those described in JP-A No. 53-133428; and 4-(p-aminophenyl)-2,6-di-halomethyl-s-triazine compounds.

Other examples thereof include 2,4-bis(trichloromethyl)-6-p-methoxystyryl-s-triazine, 2,6-bis(trichloromethyl)-4-(3,4-methylenedioxyphenyl)-1,3,5-triazine, 2,6-bis(trichloromethyl)-4-(4-methoxyphenyl)-1,3,5-triazine, 2,4-bis(trichloromethyl)-6-(1-p-dimethylaminophenyl-1,3-butadienyl)-s-triazine, 2-trichloromethyl-4-amino-6-p-methoxystyryl-s-triazine, 2-(naphtho-1-yl)-4,6-bis-trichloromethyl-s-triazine, 2-(4-methoxy-naphtho-1-yl)-4,6-bis-trichloromethyl-s-triazine, 2-(4-ethoxy-naphtho-1-yl)-4,6-bis-trichloromethyl-s-triazine, 2-(4-butoxy-naphtho-1-yl)-4,6-bis-trichloromethyl-s-triazine, 2-[4-(2-methoxyethyl)-naphtho-1-yl]-4,6-bis-trichloromethyl-s-triazine, 2-[4-(2-ethoxyethyl)-naphtho-1-yl]-4,6-bis-trichloromethyl-s-triazine, 2-[4-(2-butoxyethyl)-naphtho-1-yl]-4,6-bis-trichloromethyl-s-triazine, 2-(2-methoxy-naphtho-1-yl)-4,6-bis-trichloromethyl-s-triazine, 2-(6-methoxy-5-methyl-naphtho-2-yl)-4,6-bis-trichloromethyl-s-triazine, 2-(6-methoxy-naphtho-2-yl)-4,6-bis-trichloromethyl-s-triazine, 2-(5-methoxy-naphtho-1-yl)-4,6-bis-trichloromethyl-s-triazine, 2-(4,7-dimethoxy-naphtho-1-yl)-4,6-bis-trichloromethyl-s-triazine, 2-(6-ethoxy-naphtho-2-yl)-4,6-bis-trichloromethyl-s-triazine, 2-(4,5-dimethoxy-naphtho-1-yl)-4,6-bis-trichloromethyl-s-triazine, 4-[p-N,N-di(ethoxycarbonylmethyl)aminophenyl]-2,6-di(trichloromethyl)-s-triazine, 4-(o-methyl-p-N,N-di(ethoxycarbonylmethyl)aminophenyl)-2,6-di(trichloromethyl)-s-triazine, 4-(p-N,N-di(chloroethyl)aminophenyl)-2,6-di(trichloromethyl)-s-triazine, 4-[o-methyl-p-N,N-di(chloroethyl)aminophenyl]-2,6-di(trichloromethyl)-s-triazine, 4-(p-N-chloroethylaminophenyl)-2,6-di(trichloromethyl)-s-triazine, 4-(p-N-ethoxycarbonylmethylaminophenyl)-2,6-di(trichloromethyl)-s-triazine, 4-[p-N,N-di(phenyl)aminophenyl]-2,6-di(trichloromethyl)-s-triazine, 4-(p-N-chloroethylcarbonylaminophenyl)-2,6-di(trichloromethyl)-s-triazine, 4-[p-N-(p-methoxyphenyl)carbonylaminophenyl]-2,6-di(trichloromethyl)-s-triazine, 4-[m-N,N-di(ethoxycarbonylmethyl)aminophenyl]-2,6-di(trichloromethyl)-s-triazine, 4-[m-bromo-p-N,N-di(ethoxycarbonylmethyl)aminophenyl]-2,6-di(trichloromethyl)-s-triazine, 4-[m-chloro-p-N,N-di(ethoxycarbonylmethyl)aminophenyl]-2,6-di(trichloromethyl)-s-triazine, 4-[m-fluoro-p-N,N-di(ethoxycarbonylmethyl)aminophenyl]-2,6-di(trichloromethyl)-s-triazine, 4-[o-bromo-p-N,N-di(ethoxycarbonylmethyl)aminophenyl]-2,6-di(trichloromethyl)-s-triazine, 4-[o-chloro-p-N,N-di(ethoxycarbonylmethyl)aminophenyl]-2,6-di(trichloromethyl)-s-triazine, 4-[o-fluoro-p-N,N-di(ethoxycarbonylmethyl)aminophenyl]-2,6-di(trichloromethyl)-s-triazine, 4-[o-bromo-p-N,N-di(chloroethyl)aminophenyl]-2,6-di(trichloromethyl)-s-triazine, 4-[o-chloro-p-N,N-di(chloroethyl)aminophenyl]-2,6-di(trichloromethyl)-s-triazine, 4-[o-fluoro-p-N,N-di(chloroethyl)aminophenyl]-2,6-di(trichloromethyl)-s-triazine, 4-[m-bromo-p-N,N-di(chloroethyl)aminophenyl]-2,6-di(trichloromethyl)-s-triazine, 4-[m-chloro-p-N,N-di(chloroethyl)aminophenyl]-2,6-di(trichloromethyl)-s-triazine, 4-[m-fluoro-p-N,N-di(chloroethyl)aminophenyl]-2,6-di(trichloromethyl)-s-triazine, 4-(m-bromo-p-N-ethoxycarbonylmethylaminophenyl)-2,6-di(trichloromethyl)-s-triazine, 4-(m-chloro-p-N-ethoxycarbonylmethylaminophenyl)-2,6-di(trichloromethyl)-s-triazine, 4-(m-fluoro-p-N-ethoxycarbonylmethylaminophenyl)-2,6-di(trichloromethyl)-s-triazine, 4-(o-bromo-p-N-ethoxycarbonylmethylaminophenyl)-2,6-di(trichloromethyl)-s-triazine, 4-(o-chloro-p-N- ethoxycarbonylmethylaminophenyl)-2,6-di(trichloromethyl)-s-triazine, 4-(o-fluoro-p-N-ethoxycarbonylmethylaminophenyl)-2,6-di(trichloromethyl)-s-triazine, 4-(m-bromo-p-N-chloroethylaminophenyl)-2,6-di(trichloromethyl)-s-triazine, 4-(m-chloro-p-N-chloroethylaminophenyl)-2,6-di(trichloromethyl)-s-triazine, 4-(m-fluoro-p-N-chloroethylaminophenyl)-2,6-di(trichloromethyl)-s-triazine, 4-(o-bromo-p-N-chloroethylaminophenyl)-2,6-di(trichloromethyl)-s-triazine, 4-(o-chloro-p-N-chloroethylaminophenyl)-2,6-di(trichloromethyl)-s-triazine, and 4-(o-fluoro-p-N-chloroethylaminophenyl)-2,6-di(trichloromethyl)-s-triazine.

Other useful examples thereof include TAZ series products (e.g., TAZ-107, TAZ-110, TAZ-104, TAZ-109, TAZ-140, TAZ-204, TAZ-113, TAZ-123, etc.) manufactured by Midori Kagaku Co., Ltd.; T series products (e.g., T-OMS, T-BMP, T-R, T-B, etc.) manufactured by PANCHIM; IRGACURE series products (e.g., IRGACURE 369, IRGACURE 784, IRGACURE 651, IRGACURE 184, IRGACURE 500, IRGACURE 1000, IRGACURE 149, IRGACURE 819, IRGACURE 261, etc.) manufactured by Ciba Specialty Chemicals; DAROCUR series products (e.g., DAROCUR 1173, etc.) manufactured by Ciba Specialty Chemicals; 4,4'-bis(diethylamino)-benzophenone, 2-(O-benzoyloxime)-1-[4-(phenylthio)phenyl]-1,2-octandione, 2-benzyl-2-dimethylamino-4-morpholinobutylophenone, 2,2-dimethoxy-2-phenylacetophenone, 2-(o-chlorophenyl)-4,5-diphenylimidazolyl dimer, 2-(o-fluorophenyl)-4,5-diphenylimidazolyl dimer, 2-(o-methoxyphenyl)-4,5-diphenylimidazolyl dimer, 2-(p-methoxyphenyl)-4,5-diphenylimidazolyl dimer, 2-(p-dimethoxyphenyl)-4,5-diphenylimidazolyl dimer, 2-(2,4-dimethoxyphenyl)-4,5-diphenylimidazolyl dimer, 2-(p-methyl mercaptophenyl)-4,5-diphenylimidazolyl dimer, and benzoin isopropylether.

In addition to the photopolymerization initiators described above, the composition according to the invention may contain other known photopolymerization initiators. Specific examples thereof include the vicinal polyketol aldonyl compounds described in U.S. Pat. No. 2,367,660; the α-carbonyl compounds described in U.S. Pat. Nos. 2,367,661 and 2,367,670; the acyloin ethers described in U.S. Pat. No. 2,448,828; the α-hydrocarbon-substituted aromatic acyloin compounds described in U.S. Pat. No. 2,722,512; the polynuclear quinone compounds described in U.S. Pat. Nos. 3,046,127 and 2,951,758; the combination of triallylimidazole dimer and p-aminophenylketone described in U.S. Pat. No. 3,549,367; and the benzothiazole compounds and trihalomethyl-s-triazine compounds described in JP-B No. 51-48516.

The content of photopolymerization initiator in the colored curable composition is preferably 0.01 to 50 wt %, more preferably 1 to 40 wt %, and particularly preferably 1 to 30 wt %, with respect to the solid matter of the polymerizable monomer. When the content is less than 0.01% by mass, polymerization is hardly advanced. When the content exceeds 50% by mass, the molecular weight may be lowered to reduce the film strength although the polymerization ratio increases.

The photopolymerization initiator may be used in combination with a sensitizer or a photostabilizer. Specific examples thereof include benzoin, benzoin methylether, 9-fluorenone, 2-chloro-9-fluorenone, 2-methyl-9-fluorenone, 9-anthrone, 2-bromo-9-anthrone, 2-ethyl-9-anthrone, 9,10-anthraquinone, 2-ethyl-9,10-anthraquinone, 2-t-butyl-9,10-anthraquinone, 2,6-dichloro-9,10-anthraquinone, xanthone, 2-methylxanthone, 2-methoxyxanthone, 2-ethoxyxanthone, thioxanthone, 2,4-diethylthioxanthone, acridone, 10-butyl-2-chloroacridone, benzil, dibenzalacetone, p-(dimethylamino)phenylstyrylketone, p-(dimethylamino)phenyl-p-methylstyrylketone, benzophenone, p-(dimethylamino)benzophenone (or Michler's ketone), p-(diethylamino)benzophenone, benzanthrone, the benzothiazole compounds and others described in JP-B No. 51-48516, and TINUVIN 1130 and 400.

The composition according to the invention preferably contains a thermal polymerization inhibitor. Favorable examples of the thermal polymerization inhibitors include hydroquinone, p-methoxyphenol, di-t-butyl-p-cresol, pyrogallol, t-butylcatechol, benzoquinone, 4,4'-thiobis(3-methyl-6-t-butylphenol), 2,2'-methylene-bis(4-methyl-6-t-butylphenol), and 2-mercaptobenzimidazole.

The photopolymerization initiator is preferably a compound that does not generate an acid by decomposition from the points of the light resistance and heat resistance of dye. Among the above initiators, examples of the compound that does not generate an acid by decomposition include oxime compounds, triarylimidazole dimer, benzothiazole compounds, benzophenone compounds, acetophenone compounds and derivatives thereof, and cyclopentadiene-benzene-iron complexes and salts thereof.

Naphthoquinone Diazide Compound

Next, the naphthoquinone diazide compound that can be contained in the colored curable composition of the invention when the composition is of positive type will be described.

The naphthoquinone diazide compound is a compound having at least one o-quinone diazide group, and specific examples thereof include o-naphthoquinonediazide-5-sulfonic ester, o-naphthoquinonediazide-5-sulfonic amide, o-naphthoquinonediazide-4-sulfonic ester, and o-naphthoquinonediazide-4-sulfonic amide. These ester and amide compounds can be prepared, for example, by a known method using a phenol compound represented by Formula (I) described in JP-A Nos. 2-84650 and 3-49437.

When the colored curable composition according to the invention is used as a positive composition, the alkali-soluble phenol resin and the cross linking agent described above are preferably dissolved in amounts of respectively approximately 2 to 50 wt % and approximately 2 to 30 wt %. The naphthoquinone diazide compound and the colorant described above are preferably added normally in amounts of respectively approximately 2 to 30 wt % and approximately 2 to 50 wt % in the solution containing the binder and the cross linking agent.

<Solvent>

In preparation of the colored curable composition according to the invention, a solvent can be contained in general. The solvent is basically not particularly limited as long as it satisfies the requirements in the solubility of respective components and the coating property of the colored curable composition, and is preferably selected in consideration of the solubility of binder, coating property, and stability.

Specific examples of the solvent include esters such as ethyl acetate, n-butyl acetate, isobutyl acetate, amyl formate, isoamyl acetate, isobutyl acetate, butyl propionate, isopropyl butyrate, ethyl butyrate, butyl butyrate, alkyl esters, methyl lactate, ethyl lactate, methyl oxyacetate, ethyl oxyacetate, butyl oxyacetate, methyl methoxyacetate, ethyl methoxyacetate, butyl methoxyacetate, methyl ethoxyacetate, and ethyl ethoxyacetate;

alkyl 3-oxypropionate esters such as methyl 3-oxypropionate and ethyl 3-oxypropionate; methyl 3-methoxypropionate, ethyl 3-methoxypropionate, methyl 3-ethoxypropionate, ethyl 3-ethoxypropionate), methyl 2-oxypropionate, ethyl 2-oxypropionate, propyl 2-oxypropionate, methyl 2-methoxypropionate, ethyl 2-methoxypropionate, propyl 2-methoxypropionate, methyl 2-ethoxypropionate, ethyl 2-ethoxypropionate, methyl 2-oxy-2-methylpropionate, ethyl 2-oxy-2-methylpropionate, methyl 2-methoxy-2-methylpropionate, ethyl 2-ethoxy-2-methylpropionate, methyl pyruvate, ethyl pyruvate, propyl pyruvate, methyl acetoacetate, ethyl acetoacetate, methyl 2-oxobutanoate, and ethyl 2-oxobutanoate;

ethers such as diethylene glycol dimethylether, tetrahydrofuran, ethylene glycol monomethylether, ethylene glycol monoethylether, methylcellosolve acetate, ethylcellosolve acetate, diethylene glycol monomethylether, diethylene glycol monoethylether, diethylene glycol monobutylether, propylene glycol methylether, propylene glycol methylether acetate, propylene glycol ethylether acetate, and propylene glycol propylether acetate; ketones such as methylethylketone, cyclohexanone, 2-heptanone, and 3-heptanone; and aromatic hydrocarbons such as toluene and xylene.

Among them, more preferable are methyl 3-ethoxypropionate, ethyl 3-ethoxypropionate, ethylcellosolve acetate, ethyl lactate, diethylene glycol dimethylether, butyl acetate, methyl 3-methoxypropionate, 2-heptanone, cyclohexanone, ethylcarbitol acetate, butyl carbitol acetate, propylene glycol methylether, propylene glycol methylether acetate, and the like.

—Various Additives—

The composition according to the invention may contain, as needed, various additives such as fillers, polymeric compounds other than those described above, surfactants, adhesion accelerators, antioxidants, ultraviolet absorbents, aggregation inhibitors, and others.

Specific examples of the various additives include: fillers such as glass and alumina; polymeric compounds other than binder resin such as polyvinylalcohol, polyacrylic acid, polyethylene glycol monoalkylethers, and polyfluoroalkyl acrylates; surfactants such as nonionic, cationic, and anionic surfactants; adhesion accelerators such as vinyltrimethoxysilane, vinyltriethoxysilane, vinyltris(2-methoxyethoxy)silane, N-(2-aminoethyl)-3-aminopropylmethyldimethoxysilane, N-(2-aminoethyl)-3-aminopropyltrimethoxysilane, 3-aminopropyltriethoxysilane, 3-glycidoxypropyltrimethoxysilane, 3-glycidoxypropylmethyldimethoxysilane, 2-(3,4-epoxycyclohexyl)ethyltrimethoxysilane, 3-chloropropylmethyldimethoxysilane, 3-chloropropyltrimethoxysilane, 3-methacryloxypropyltrimethoxysilane, and 3-mercaptopropyltrimethoxysilane; antioxidants such as 2,2-thiobis(4-methyl-6-t-butylphenol) and 2,6-di-t-butylphenol; ultraviolet absorbents such as 2-(3-t-butyl-5-methyl-2-hydroxyphenyl)-5-chlorobenzotriazole and alkoxybenzophenones; and aggregation inhibitors such as sodium polyacrylate.

In addition, an organic carboxylic acid, preferably a low-molecular weight organic carboxylic acid having a molecular weight of 1,000 or less, may be added to the composition, for acceleration of alkaline solubilization of the region that has not been exposed to radiation (non-image region) and improvement of the developing property of the colored curable composition according to the invention.

Specific examples thereof include fatty monocarboxylic acids such as formic acid, acetic acid, propionic acid, butyric acid, valeric acid, pivalic acid, caproic acid, diethylacetic acid, enanthic acid, and caprylic acid; fatty dicarboxylic acids such as oxalic acid, malonic acid, succinic acid, glutaric acid, adipic acid, pimelic acid, suberic acid, azelaic acid, sebacic acid, brassic acid, methylmalonic acid, ethylmalonic acid, dimethylmalonic acid, methylsuccinic acid, tetramethylsuccinic acid, and citraconic acid; aliphatic tricarboxylic acids such as tricarballylic acid, aconitic acid, and camphoronic acid; aromatic monocarboxylic acids such as benzoic acid, toluic acid, cuminic acid, hemellitic acid, and mesitylene acid; aromatic polycarboxylic acids such as phthalic acid, isophthalic acid, terephthalic acid, trimellitic acid, trimesic acid, mellophanic acid, and pyromellitic acid; other carboxylic acids such as phenylacetic acid, hydratropic acid, hydrocinnamic acid, mandelic acid, phenylsuccinic acid, atropic acid, cinnamic acid, methyl cinnamate, benzyl cinnamate, cinnamylideneacetic acid, coumalic acid, and umbellic acid.

(Positive-Type Composition)

In order to obtain a positive-type image, that is, if the composition of the present invention is a positive-type composition, the composition of the present invention may contain a photosensitizer together with a solvent. An example of the photosensitizer preferably includes the aforementioned naphthoquinone diazide compound, such as o-benzoquinone diazide sulfonic acid ester or o-naphthoquinone diazide sulfonic acid ester. Moreover, the curable composition containing the positive-type colorants may contain a curing agent.

Moreover, if the colored curable composition of the present invention is a positive-type composition, normally the alkali-soluble phenolic resin and the curing agent are preferably dissolved in an organic solvent, respectively at the rate of about 2 to 50 mass % and 2 to 30 mass %. Regarding the dosage, the naphthoquinone diazide compound and the organic solvent soluble dye are preferably added respectively at the rate of about 2 to 30 mass % and 2 to 50 mass %, with respect to the solution having the alkali-soluble resin and the curing agent dissolved therein, from the viewpoint of the curing property, the spectral characteristic, and the like.

As the curing agent, there are preferably used the melamine compound and the methylol group containing compound described as an example of the cross linking agent, and the like.

In the case of the positive-type composition, an alkali-soluble resin may be mixed, examples of which include a novolac resin, and a vinylphenolic resin.

The colored curable composition of the present invention can be suitably used for forming color pixels such as of a color filter used for a liquid crystal display (LCD) or a solid-state image sensor (such as CCD and CMOS), or for producing a printing ink, an inkjet ink, and a paint.

<<Color Filter and Manufacturing Method Therefore>>

The color filter of the present invention comprises at least one type of the colored curable compositions of the present invention. That is, the color filter of the present invention has a color layer comprising at least one type of the colored curable compositions of the present invention.

Moreover, such a color filter can be produced by a manufacturing method comprising: a color layer formation step of coating any one of the aforementioned colored curable compositions of the present invention on a substrate, so as to form a color layer; and a pattern formation step of pattern exposing the color layer to light through a mask, and developing it, so as to form a colored pattern.

Hereunder the color filter of the present invention is described in detail through its manufacturing method.

In the method of manufacturing a color filter of the present invention, the colored curable composition of the present invention is used. In the color filter of the present invention, the colored curable composition of the present invention is coated on a substrate by a coating method such as spin coating, cast coating, and roll coating, so as to form a radiation-sensitive colored curable composition layer (color layer) (color layer formation step). This is then exposed through a predetermined mask pattern, and developed by a developer, so as to form a negative-type or positive-type colored pattern (resist pattern) (pattern formation step). Then, as required, a post curing step of curing the formed pattern by means of heating and/or exposing, can be performed. The colored pattern obtained in such a manner constitutes pixels in the color filter.

The thickness of the color layer formed from the colored curable composition is appropriately selected according to the purpose. However, generally, it is preferably 0.2 μm to 5.0 μm, more preferably 0.3 μm to 2.5 μm, and most preferably 0.3 μm to 1.5 μm.

As to the light or radiation used for this pattern formation step or the post curing step, in particular, ultraviolet rays such as g rays, h rays, and i rays are preferably used. In the pattern formation step, preferably i rays are irradiated with an exposure amount of 100 to 5000 mJ/cm$^2$. Moreover, in the post curing step, preferably i rays are irradiated with an exposure amount of 100 to 50000 mJ/cm$^2$.

In the production of the color filter having pixels of a plurality of color hues, by repeating the pattern formation step (and the curing step as required) according to the desired number of colors in a case of a negative-type, or by repeating the pattern formation step and the post baking step (post curing step) according to the desired number of colors in a case of a positive-type, the color filter comprising the desired number of color hues can be produced.

As to the developer used for the method of manufacturing the color filter of the present invention, any developer may be used as long as it has a composition which dissolves the uncured area of the colored curable composition of the present invention but does not dissolve the radiation irradiated area (cured area). Specifically, a combination of various organic solvents or an alkali aqueous solution can be used.

Examples of the organic solvent employable for development include the above-mentioned solvents used for preparing the composition of the present invention.

As to the alkali aqueous solution employable for development, there is used an alkali aqueous solution having an alkali compound such as sodium hydroxide, potassium hydroxide, sodium carbonate, sodium silicate, sodium metasilicate, ammonia water, ethylamine, diethylamine, dimethylethanolamine, tetramethylammonium hydroxide, tetraethylammonium hydroxide, choline, pyrrole, piperidine, and 1,8-diazabicyclo-[5.4.0]-7-undecene dissolved so that the concentration becomes 0.001 to 10 mass %, and preferably 0.01 to 1 mass %. If the developer comprising such alkali aqueous solution is used, generally it is washed with water after the development.

The color filter of the present invention can be used for a liquid crystal display or a solid-state image sensor such as a CCD, and is suitable particularly for a high resolution CCD device or CMOS device having a million pixels or more. The color filter of the present invention may be used as a color filter arranged between, for example, photoreceivers of respective pixels and microlenses for collecting light, which constitute the CCD.

The exemplary embodiments of the present invention are described below.

<1> A colored curable composition comprising a dye represented by the following formula (V).

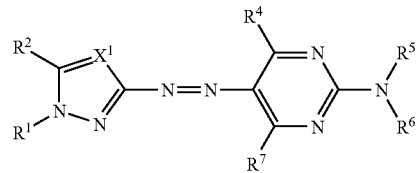

Formula (V)

[In the formula, $R^1$ represents a heterocyclic group, and $R^2$ represents a hydrogen atom or a substituent. $X^1$ represents —N═, or —C($R^3$)═, wherein $R^3$ represents a hydrogen atom or a substituent. If $X^1$ is —C($R^3$)═, $R^2$ and $R^3$ may be mutually bonded to form a 5-, 6-, or 7-membered ring. $R^4$ represents a hydrogen atom or a substituent. $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group. $R^5$ and $R^6$ may be mutually bonded to form a 5-, 6-, or 7-membered ring. $R^7$ represents a hydrogen atom or a substituent.]

<2> A colored curable composition comprising a dye represented by the following formula (II).

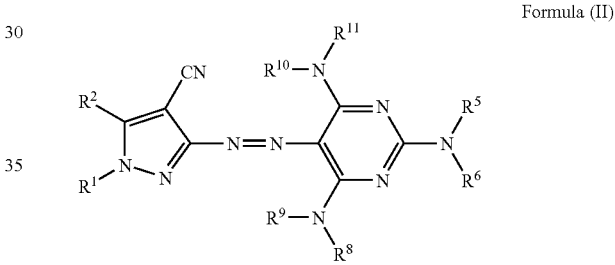

Formula (II)

[In the formula, $R^1$ represents a heterocyclic group, and $R^2$ represents a hydrogen atom or a substituent. $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group. $R^5$ and $R^6$ may be mutually bonded to form a 5-, 6-, or 7-membered ring. $R^8$, $R^9$, $R^{10}$, and $R^{11}$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group. $R^5$ and $R^6$, $R^8$ and $R^9$, and $R^{10}$ and $R^{11}$ may be mutually bonded to form a 5-, 6-, or 7-membered ring.

<3> A colored curable composition of <1> or <2> further comprising a polymerizable monomer.

<4> A colored curable composition of <3> wherein the polymerizable monomer contains a (meta)acrylic ester monomer.

<5> A colored curable composition of <3> or <4> wherein the polymerizable monomer contains a tri- or higher-functional (meta)acrylic ester monomer.

<6> A colored curable composition of any one of <1> through <5> further comprising a binder.

<7> A colored curable composition of <6> wherein the binder contains an alkali-soluble (meta)acrylic resin.

<8> A colored curable composition of <6> or <7> wherein the binder contains a (meta)acrylic resin having an alkali-soluble polymerizable side chain.

<9> A colored curable composition of any one of <1> through <8> further comprising a photopolymerization initiator.

<10> A colored curable composition of <9> wherein the photopolymerization initiator contains at least one active halogen compound selected from a halomethyloxadiazole compound and a halomethyl-s-triazine compound, and at least one compound selected from a group consisting of a 3-aryl substituted coumarin compound, a lophine dimmer, a benzophenon compound, an acetophenon compound and derivatives thereof, a cyclopentadiene-benzene-iron complex and salts thereof, and an oxime compound.

<11> A colored curable composition of <9> or <10> wherein the photopolymerization initiator contains at least one compound that does not generate acids by decomposition.

<12> A colored curable composition of <9> wherein the photopolymerization initiator contains at least one compound selected from a group consisting of a lophine dimmer, a benzophenon compound, an acetophenon compound, an oxime compound, and a halomethyl-s-triazine compound.

<13> A colored curable composition of any one of <1> through <12> further comprising a cross linking agent.

<14> A positive-type colored curable composition comprising a dye represented by the formula (V), a photosensitizer, and a solvent.

<15> A positive-type colored curable composition of <14> wherein the photosensitizer is o-benzoquinone diazide sulfonic acid ester or o-naphthoquinone diazide sulfonic acid ester.

<16> A positive-type colored curable composition of <14> further comprising a curing agent.

<17> A color filter comprising a color layer comprising at least one colored curable composition described in any one of <1> through <16>.

<18> A method of manufacturing a color filter comprising: coating the colored curable compositions described in any one of <1> through <16> on a substrate, so as to form a color layer; pattern exposing the color layer to light through a mask; and developing the color layer to form a colored pattern.

This manufacturing method may comprise a step of curing the pattern by means of heating and/or exposing as required, or these steps may be repeated for a plurality of times.

Moreover, these dyes may be changed to form a color filter having a plurality of colors.

EXAMPLES

The present invention is further specifically described with reference to examples. However, the present invention is not limited to the following examples provided it does not depart from the scope. Here "part" is based on mass unless specifically described.

Example 1

Synthesis Example

Synthesis of Exemplary Compound (1) (Same as Exemplary Compound (101))

The specific synthesis method [steps (1) to (4)] of the exemplary compound (1) is shown together with its reaction scheme (the following reaction scheme A). By changing the starting material, an other compound can be synthesized in the same manner. However, the synthesis method of the pyrimidine azo composition of the present invention is not limited to this.

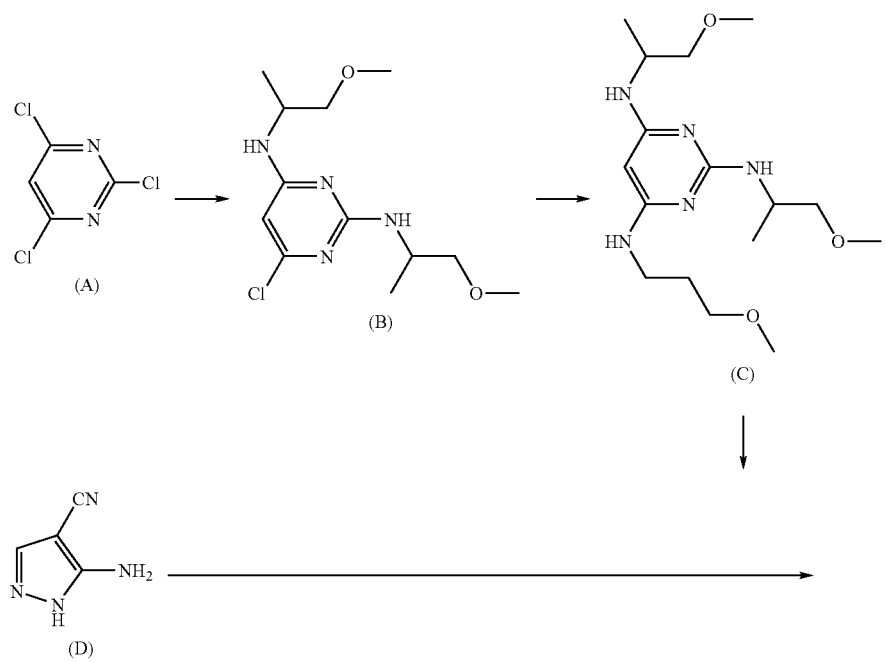

Reaction Scheme A

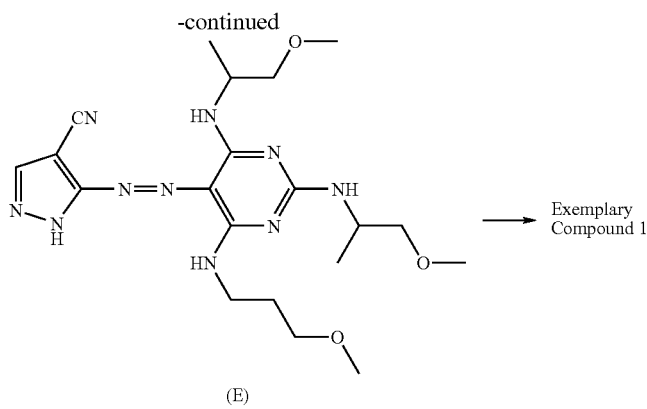

(1) Synthesis of Compound (B)

50.0 g (0.273 moles) of compound (A) was dripped into 61.0 g (0.684 moles) of 2-amino-1-methoxypropane, which was then heated to 75° C. and stirred. 76 ml (0.545 moles) of triethylamine was dripped into this solution. After dripping, it was heated and stirred at 105° C. to 115° C. for 7.5 hours. After the reaction, the reaction liquid was cooled down to room temperature, and then extracted by adding 300 ml of water and 300 ml of ethyl acetate. This ethyl acetate solution was washed with water and dried with anhydrous magnesium sulfate. This ethyl acetate solution was concentrated at reduced pressure, and then purified by silica gel column chromatography (eluent: n-hexane/ethyl acetate=10/1). 70.0 g of the compound (B) was obtained with a yield of 88.8%. The compound (A) used was made by Sigma-Aldrich Co.

(2) Synthesis of Compound (C)

70.0 g (0.242 moles) of the compound (B) obtained in the above manner was added with 53.9 g (0.605 moles) of methoxypropylamine, which was then heated and stirred at an outside temperature of 160° C. to 170° C. for 29 hours. After the reaction, the reaction liquid was cooled down to room temperature, and then extracted by adding 400 ml of water and 400 ml of ethyl acetate. This ethyl acetate solution was washed with water and dried with anhydrous magnesium sulfate. This ethyl acetate solution was concentrated at reduced pressure, and then purified by silica gel column chromatography (eluent: n-hexane/ethyl acetate=3/1). 51.8 g of the compound (C) was obtained with a yield of 62.8%.

(3) Synthesis of Compound (E)

While stirring at 0° C., a solution having 5.00 g (0.046 moles) of compound (D) dissolved in 56.0 ml of phosphoric acid was added with 3.51 g (0.051 moles) of sodium nitrite, which was then stirred for 1 hour. The reaction liquid was added with 5.0 ml of acetic acid solution having 15.3 g (0.045 moles) of the compound (C), and stirred at 25° C. for 3 hours. The reaction liquid was added with 500 ml of ethyl acetate and 500 ml of water, then neutralized by sodium hydrogencarbonate. The organic layer was sufficiently washed with water to remove the solvent. The residue was added with 200 ml of ethyl acetate to dissolve, then added with 600 ml of n-hexane to remove the deposited consistent body. Then, the filtrate was further added with 600 ml of n-hexane to filter out the deposited yellow body. The obtained crystal was dried, and 19.0 g of the compound (E) was obtained with a yield of 89.1%.

(4) Synthesis of Exemplary Compound (1)

3.8 g (0.0083 moles) of the compound (E) was added with 20 ml of dimethylacetoamido, 2.18 g (0.0259 moles) of sodium hydrogencarbonate, 2.10 g (0.0124 moles) of 2-chlorobenzothiazole, and 2.0 ml of distilled water, which was then stirred at 90° C. to 95° C. for 15 hours. After the reaction, the reaction liquid was cooled down to room temperature, and then extracted by adding 400 ml of water and 400 ml of ethyl acetate. This ethyl acetate solution was washed with 300 ml of saturated sodium chloride solution twice, then washed with water, and dried with anhydrous magnesium sulfate. This ethyl acetate solution was concentrated at reduced pressure, and then purified by silica gel column chromatography (eluent: n-hexane/ethyl acetate=3/1). It was dissolved in 100 ml of ethyl acetate, and then added with 400 ml of n-hexane. The deposited solid was filtered out, washed with 100 ml of n-hexane, and dried. 4.2 g of yellow crystal exemplary compound (1) of the present invention serving as the target material was obtained with a yield of 85.7%.

The melting point of the obtained exemplary compound (1) was measured, and the maximum absorption wavelength (λmax) and the molar absorption coefficient (ε) in ethyl acetate of the obtained exemplary compound (1) were measured by a spectrophotometer UV-3100PC (made by Shimadzu Corporation.), which showed a melting point of 132° C. to 133° C., a maximum absorption wavelength λmax=437.1 nm, and ε=46250.

The structure of the exemplary compound (1) obtained in the above manner was confirmed by NMR, which showed 1H-NMR (300 MHz, solvent: dimethyl-d6sulfoxide, reference material: tetramethylsilane) δ [10.65 ppm (t), 10.53 ppm (t), 10.48 ppm (d), 10.40 ppm (t)] (total 1H), [9.498 (s), 9.501 (s)] (total 1H), 8.15 (1H, d), 7.95 (1H, d), 7.55-7.64 (1H, m), 7.57 (1H, t), 7.47 (1H, t), [6.94 (t), 6.78-6.80 (m), 6.69 (d)] (total 1H), 4.37-4.53 (1H, m), 4.25-4.37 (1H, m), 3.23-3.70 (17H, m), 1.78-1.89 (2H, m), 1.22-1.32 (6H, m).

Example 2

Synthesis Example

Synthesis of Exemplary Compound (2)

10.0 g (0.0168 moles) of the compound (1) was added with 50 ml of N-methyl-2-pyrrolidone, 9.56 g (0.0674 moles) of methyl iodide, 1.5 g (0.0353 moles) of lithium hydroxide monohydrate, and 2.7 g (0.0084 moles) of tetrabutylammonium bromide, which was then stirred at room temperature for 20 hours. The reaction mixture was extracted by adding 400 ml of water and 400 ml of ethyl acetate. This ethyl acetate solution was washed with 300 ml of saturated sodium chloride solution twice, then washed with water, and dried with anhydrous magnesium sulfate. This ethyl acetate solution was concentrated at reduced pressure, and then purified by silica gel column chromatography (eluent: n-hexane/ethyl acetate=3/1). It was dissolved in 100 ml of ethyl acetate, and then added with 400 ml of n-hexane. The deposited solid was filtered out, washed with 100 ml of n-hexane, and dried. 10.0 g of yellow crystal exemplary compound (2) of the present invention was obtained with a yield of 97.8%.

The maximum absorption wavelength ($\lambda$max) and the molar absorption coefficient (E) in ethyl acetate of the obtained exemplary compound (2) were measured by the spectrophotometer UV-3100PC (made by Shimadzu Corporation.), which showed a maximum absorption wavelength $\lambda$max=440.5 nm, and $\epsilon$=50620.

The structure of the exemplary compound (2) obtained in the above manner was confirmed by NMR, which showed 1H-NMR (300 MHz, solvent: dimethyl-d6sulfoxide, reference material: tetramethylsilane) $\delta$ [10.22-10.28 ppm (m), 10.17 ppm (t), 10.13 ppm (t)] (total 1H), [9.248 (s), 9.23 (s)] (total 1H), 7.91 (1H, d), 7.70 (1H, d), 7.32 (1H, t), 7.25 (1H, t), [6.62 (t), 6.50 (t)] (total 1H), 4.90-5.03 (1H, m), 4.10-4.28 (1H, m), 2.98-3.45 (17H, m), 2.78-2.84 (3H, m), 1.54-1.66 (2H, m), 0.87-1.10 (6H, m).

Example 3

Synthesis Example

Synthesis of Exemplary Compound (22)

2-chloropyrimidine was interacted with the compound (E) of the reaction scheme A, and the exemplary compound (22) was synthesized in the same manner as the synthesis of the exemplary compound (1).

The $\lambda$max of this dye was 430.1 nm and $\epsilon$ was 36030.

The structure of the exemplary compound (22) obtained in the above manner was confirmed by NMR, which showed 1H-NMR (300 MHz, solvent: dimethyl-d6sulfoxide, reference material: tetramethylsilane) $\delta$ [10.51 ppm (t), 10.43 ppm (d), 10.37 ppm (t), 10.29 ppm (d)] (total 1H), [9.45 (s), 9.44 (s)] (total 1H), [8.95 (d), 8.94 (d)] (total 1H), 7.48-7.58 ppm (1H, m) [6.97 (t), 6.83 (t), 6.78 (d), 6.69 (d)] (total 1H), 4.40-4.60 (1H, m), 4.25-4.40 (1H, m), 3.23-3.66 (17H, m), 1.78-1.91 (2H, m), 1.12-1.30 (6H, m).

Example 4

Synthesis Example

Synthesis of Exemplary Compound (31)

3-methyl-5-(phenylsulfonyl)-1,2,4-thiadiazole was interacted with the compound (E) of the reaction scheme A, and the exemplary compound (31) was synthesized in the same manner as the synthesis of the exemplary compound (1).

The $\lambda$max of this dye was 435.0 nm and $\epsilon$ was 42010.

The structure of the exemplary compound (31) obtained in the above manner was confirmed by NMR, which showed 1H-NMR (300 MHz, solvent: dimethyl-d6sulfoxide, reference material: tetramethylsilane) $\delta$ [10.62 ppm (t), 10.52 ppm (t), 10.44 ppm (d), 10.38 ppm (t)] (total 1H), [9.38 (s), 9.38 (s), 9.37 (s)] (total 1H), 7.62-7.701 (1H, m), [6.94 (t), 6.78-6.80 (m), 6.69 (d)] (total 1H), 4.37-4.50 (1H, m), 4.25-4.37 (1H, m), 3.20-3.70 (17H, m), 2.57 (3H, s), 1.78-1.88 (2H, m), 1.14-1.30 (6H, m).

Example 5

Synthesis Example

Synthesis of Exemplary Compound (32)

2-methylpyrazine was interacted with the compound (E) of the reaction scheme A, and the exemplary compound (32) was synthesized in the same manner as the synthesis of the exemplary compound (1).

The $\lambda$max of this dye was 432.9 nm and $\epsilon$ was 39120.

The structure of the exemplary compound (32) obtained in the above manner was confirmed by NMR, which showed 1H-NMR (300 MHz, solvent: dimethyl-d6sulfoxide, reference material: tetramethylsilane) $\delta$ [10.57 ppm (t), 10.50 ppm (t), 10.40 ppm (d), 10.37 ppm (t)] (total 1H), 9.43 (1H, s), 9.22 (1H, m), 8.73 (1H, d), 8.62 (1H, s), 7.51-7.59 (1H, m), [6.96 (t), 6.78-6.83 (1H, m), 6.70 (d)] (total 1H), 4.40-4.55 (1H, m), 4.25-4.40 (1H, m), 3.23-3.68 (17H, m), 1.78-1.90 (2H, m), 1.12-1.32 (6H, m).

Example 6

1) Preparation of Resist Solution

The following composition was mixed and dissolved to prepare a resist solution.

| [Composition for resist solution] | |
|---|---|
| Propylene glycol monomethylether acetate (PGMEA) | 19.00 parts |
| Ethyl lactate | 36.00 parts |
| Cyclohexanone | 0.87 parts |
| Binder (allyl methacrylate/methacrylic acid) copolymer (65:35 in mole ratio) in 41% PGMEA solution) | 30.51 parts |
| Dipentaerythritol hexaacrylate | 12.20 parts |
| Polymerization inhibitor (p-methoxyphenol) | 0.0075 parts |
| Fluorinated surfactant | 0.95 parts |
| 2-(O-benzoyloxime)-1-[4-(phenylthio)phenyl]-1,2-octanedione (photopolymerization initiator) | 0.600 parts |

2) Preparation of Glass Substrate with an Undercoat Layer

A glass substrate (CORNING 1737, made by Corning Incorporated) was ultrasonically washed with aqueous 0.5% NaOH, followed by washing with water, dehydration and baking (200° C./20 minutes).

Then, the resist solution of 1) was coated on the washed glass substrate to a thickness of 2 μm using a spin coater, and heated and dried at 220° C. for 1 hour, to obtain a cured film.

3) Preparation of Colorant-Containing Resist Solution (Colored Curable Composition [Negative-Type])

9.4 g of the resist solution obtained in 1) and 0.6 g of the aforementioned exemplary compound (101) serving as the dye of the invention were mixed and dissolved to obtain a colorant-containing resist solution (solution of colored curable composition [negative-type]).

4) Exposure and Development of Colorant-Containing Resist Solution (Image Formation)

The dye resist solution obtained in 3) was coated on the undercoat layer of the glass substrate with the underlayer obtained in 2), to a thickness of 1.0 μm using a spin coater, and pre-baked at 120° C. for 120 seconds.

Next, the coated film was irradiated with a light at a wavelength of 365 nm using an exposure device with an exposure amount of 500 mJ/cm² through a mask with a thickness of 20 μm. After the exposure, the substrate was developed at 25° C. for 60 seconds using a developer (trade name: CD-2000 (60%), made by Fuji Film Electronics Materials Co. Ltd.). The substrate was rinsed in running water for 20 seconds, and spray-dried.

In this manner, there was obtained a pattern suitable for a yellow color filter.

5) Evaluation

The preservation stability of the resist solution prepared as described above, the heat resistance and light resistance of the coated film coated on the glass substrate using the dye resist solution, and the pattern forming property, were evaluated in the following manner. The results are shown in Table 1.

(1) Preservation Stability

After the resist solution was stored at room temperature for 1 month, a level of precipitation of abnormal substances was visually evaluated according to following criteria:

<Judging Criteria> a: no precipitation observed b: slight precipitation observed c: precipitation observed (2) Heat Resistance The glass substrate coated with the dye resist was placed on a hot plate and heated at 200° C. for 1 hour. The color difference ΔEab value before and after the heat resistance test was measured using a chromaticity meter MCPD-1000 (made by Otsuka Electronic Co.), and was evaluated by the following criteria. The smaller ΔEab value shows better heat resistance.

<Judging Criteria> a: ΔEab value<5 b: 5<ΔEab value<10 c: 10<ΔEab value (3) Light Resistance

The glass substrate coated with the dye resist solution was irradiated with a xenon lamp at an illuminance of 50,000 lux for 20 hours (corresponds to 1,000,000 lux-h). The color difference ΔEab value before and after the light resistance test was measured. The smaller ΔEab value shows better light resistance.

<Judging Criteria> a: ΔEab value<3 b: 3≦ΔEab value≦10 c: 10<ΔEab value (4) Pattern Forming Property

In the present Example, the image formation was confirmed in a normal method by observing with an optical microscope and SEM photography. Moreover, the "developability of unexposed area" and the "residual film ratio of exposed area" were measured by a calorimeter (brand name: MCPD-1000, made by Otsuka Electronics Co., Ltd.).

Moreover, the "developability of unexposed area" shows a ratio of change in the absorbance value in the film before and after development, and the value is preferably greater in a case of a negative-type photosensitive composition. Furthermore, the "residual film ratio of exposed area" shows a maintenance factor of the absorbance value in the film before and after development, and the value is preferably greater in a case of a negative-type photosensitive composition.

Great values of both developability of unexposed area and residual film ratio of exposed area mean an excellent pattern forming property.

<Judging Criteria> a: "developability of unexposed area" is 95% or more, and "residual film ratio of exposed area" is 95% or more b: either "developability of unexposed area" or "residual film ratio of exposed area" is 90% or more but less than 95%, or both of "developability of unexposed area" and "residual film ratio of exposed area" are 90% or more but less than 95% c: "developability of unexposed area" and/or "residual film ratio of exposed area" are less than 90%

Examples 7 to 15

The 3) colorant-containing resist solution was prepared in the same manner as that of Example 6, except that the exemplary compound (101) was replaced by the dye of Table 1 below. The results are shown in Table 1.

Comparative Examples 1 and 2

The 3) colorant-containing resist solution was prepared in the same manner as that of Example 6, except that the exemplary compound (101) was replaced as shown in Table 1 below. The results are shown in Table 1.

TABLE 1

| | Dye | Preservation stability | Heat resistance | Light resistance | Pattern forming property |
|---|---|---|---|---|---|
| Example 6 | Exemplary Compound (101) | a | a | a | a |
| Example 7 | Exemplary Compound (102) | a | b | a | a |
| Example 8 | Exemplary Compound (112) | b | a | a | a |
| Example 9 | Exemplary Compound (113) | b | a | a | a |
| Example 10 | Exemplary Compound (116) | a | a | b | a |
| Example 11 | Exemplary Compound (123) | b | a | a | a |
| Example 12 | Exemplary Compound (127) | a | b | a | a |
| Example 13 | Exemplary Compound (203) | b | a | b | a |

TABLE 1-continued

| | Dye | Preservation stability | Heat resistance | Light resistance | Pattern forming property |
|---|---|---|---|---|---|
| Example 14 | Exemplary Compound (149) | a | a | a | a |
| Example 15 | Exemplary Compound (156) | a | a | a | a |
| Comparative Example 1 | C.I. Solvent Yellow 162 | c | c | c | b |
| Comparative Example 2 | C.I. Solvent Yellow 82 | c | c | c | c |

From the results of Table 1, it was found that in the colored curable composition of the Examples employing the dye of the present invention, the preservation stability in its solution form was superior, the pattern forming property with such colored curable compositions was superior, and the heat resistance and the light resistance of the formed pattern were superior, in comparison with the Comparative Examples employing other dyes.

Example 16

1) Preparation of Colored Curable Composition [Positive-Type]

A colored curable composition [positive-type] was obtained by mixing and dissolving the composition below.

| [Composition] | |
|---|---|
| Ethyl lactate (EL) | 30 parts |
| Resin P-1 mentioned below | 3.0 parts |
| Naphthoquinone diazide compound N-1 mentioned below | 1.8 parts |
| Cross linking agent: Hexamethoxymethylol modified melamine | 0.6 parts |
| Photoacid generating agent: TAZ-107 (made by Midori Chemical Co.) | 1.2 parts |
| Fluorinated surfactant (trade name: F-475, made by Dai-Nippon Ink Chemical Industry Co.) | 0.0005 parts |
| Exemplary compound (101) in the present invention | 1.5 parts |

The resin P-1 and naphthoquinone diazide compound (N-1) were synthesized in the following manner.

—Synthesis of Resin P-1—

70.0 g of benzyl methacrylate, 13.0 g of methacrylic acid, 17.0 g of 2-hydroxyethyl methacrylate, and 600 g of 2-methoxypropanol were placed in a three-neck flask which was attached with a stirrer, a reflux condenser tube, and thermometer. The mixture was mixed with a catalytic quantity of a polymerization initiator (trade name: V-65, made by Wako Pure Chemical Industries, Inc.), and was stirred for 10 hours at 65° C. in a nitrogen stream. The resin solution obtained was dripped into 20 L of ion-exchange water with vigorous stirring, and a white powder was obtained. The white powder was dried at 40° C. for 24 hours in a vacuum, and 145 g of resin P-1 was obtained. The molecular weight was measured by GPC, which showed the weight average molecular weight Mw=28,000, and number average molecular weight Mn=11,000.

—Synthesis of Naphthoquinone Diazide Compound (N-1)—

42.45 g of Trisp-PA (made by Honshu Chemical Co.), 61.80 g of o-naphthoquinone diazide-5-sulfonylchloride, and 300 ml of acetone were placed in a three-neck flask, into which 24.44 g of triethylamine was added dropwise at room temperature for 1 hour. After the dripping, it was stirred for another 2 hours. Then, the reaction solution was poured into a large volume of water with stirring. Precipitated naphthoquinone diazide sulfonic acid ester was collected by suction filtration, and dried in a vacuum at 40° C. for 24 hours, to obtain photosensitive compound N-1.

2) Exposure and Development of Colored Curable Composition (Image Formation)

In the same manner as that of Example 6, the colored curable composition prepared as described above was coated on the glass substrate with an undercoat layer, and then pre-baked, exposed, developed, rinsed and dried to obtain a magenta image pattern. Then, this pattern image was heated at 180° C. for 5 minutes (post-bake). The formed magenta pattern image showed a satisfactory rectangular profile.

The preservation stability of the colored curable composition using the dye of the present invention, and the heat resistance and the light resistance of the coated film, were evaluated by the same method as for Example 6, and showed a superior preservation stability, and satisfactory heat resistance and light resistance.

Examples 17 to 26

A coated silicon wafer substrate with an undercoat layer was obtained by operations all the same as those of Example 6, except that the glass substrate therein was replaced by a silicon wafer substrate.

Next, a square pattern of 2 μm was exposed with an exposure amount of 500 mJ/cm² using an i-rays reduction projection exposure apparatus, and was developed using a developer (CD-2000 (60%) made by FujiFilm Electronic Materials Co. Ltd.), at 23° C. for 60 seconds. It was then rinsed for 20 seconds with running water, and spray dried. As a result, there was obtained a suitable pattern as a color filter for a CCD with a rectangular cross section.

Examples 27 to 36

Positive-type colored curable compositions were prepared following the method of Example 1 described in Japanese Patent Application Laid-Open No. 2002-14222, except that C.I. Solvent Yellow 162 described therein was replaced with dyes of the present invention (10 types of dyes used in Examples 6 to 15) in equimolar amounts. Yellow filter layers were formed using the obtained compositions in the same manner as described in Example 1 of the above publication.

They were evaluated for the preservation stability of the colored curable composition, the heat resistance, and the light resistance according to the method of Example 6 of the present invention. As a result, there were observed similar tendencies to the results of Table 1.

The pyrimidine azo compound represented by the formula (I) and a tautomer thereof are useful as an azo dye. The applications of this azo dye include a color filter for recording and reproducing a color image used for a solid-state image sensor such as a CCD and a CMOS or a display such as a LCD and a PDP, a cured composition for producing such color filters, a color image recording material for forming a color image, and dyes. Specifically, the applications include a color filter, a cured composition for forming these color filters, an ink jet-type recording material, a heat sensitive recording material, a pressure sensitive recording material, an electrophotographic recording material, a transfer-type silver halide photosensitive material, a printing ink, a recording pen, a dye for fiber, and a hair dye. Preferred examples thereof include applications for a cured composition for producing a color filter, an ink jet-type recording material, a heat sensitive recording material, and an electrophotographic recording material.

The pyrimidine azo compound and a tautomer thereof serving as a novel compound according to the present invention can be used by optimizing its physical properties such as the solubility and the dispersibility suitable for the application, by adjusting the substituent(s) to be introduced into the compound. Moreover, the dye of the present invention can be also used in the dissolved state, the emulsion dispersed state, and the solid dispersed state, according to the system to be used.

The pyrimidine azo compound of the present invention is a novel compound useful as a dye having a superior color hue, and satisfactory resistance against light, heat, humidity, and active gases in the environment, and has a high spectral absorption coefficient.

Moreover, the present invention can provide a colored curable composition and a color filter having a satisfactory color hue, a satisfactory resistance to heat and light, a superior preservation stability, and a superior pattern forming property, and a simple manufacturing method for the color filter with excellent cost performance.

All publications, patent applications, and technical standards mentioned in this specification are herein incorporated by reference to the same extent as if each individual publication, patent application, or technical standard was specifically and individually indicated to be incorporated by reference.

What is claimed is:

1. A pyrimidine azo compound represented by the following formula (I), or a tautomer thereof:

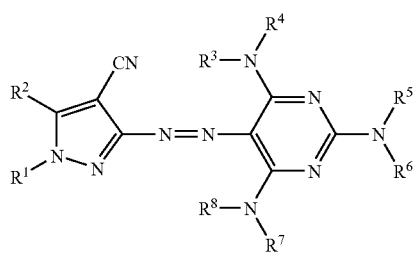

Formula (I)

wherein in the formula (I), $R^1$ represents a heterocyclic group; $R^2$ represents a hydrogen atom or a substituent; $R^3$, $R^4$, $R^5$, $R^6$, $R^7$, and $R^8$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; and $R^3$ and $R^4$, $R^5$ and $R^6$, and $R^7$ and $R^8$ may be mutually bonded to form a 5-, 6-, or 7-membered ring.

2. A colored curable composition comprising a dye represented by the following formula (V):

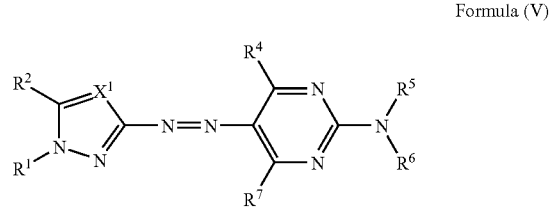

Formula (V)

wherein, in the formula (V), $R^1$ represents a heterocyclic group; $R^2$ represents a hydrogen atom or a substituent; $X^1$ represents —N═, or —C($R^3$)═; $R^3$ represents a hydrogen atom or a substituent; when $X^1$ is —C($R^3$)═, $R^2$ and $R^3$ may be mutually bonded to form a 5-, 6-, or 7-membered ring; $R^4$ represents a hydrogen atom or a substituent; $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; $R^5$ and $R^6$ may be mutually bonded to form a 5-, 6-, or 7-membered ring; and $R^7$ represents a hydrogen atom or a substituent.

3. A colored curable composition according to claim 2 further comprising a polymerizable monomer.

4. A colored curable composition according to claim 3, wherein the polymerizable monomer contains a (meta)acrylic ester monomer.

5. A colored curable composition according to claim 4, wherein the polymerizable monomer contains a tri- or higher-functional (meta)acrylic ester monomer.

6. A colored curable composition according to claim 2 further comprising a binder.

7. A colored curable composition according to claim 6, wherein the binder contains an alkali-soluble (meta)acrylic resin.

8. A colored curable composition according to claim 7, wherein the binder contains a (meta)acrylic resin having an alkali-soluble polymerizable side chain.

9. A colored curable composition according to claim 2 further comprising a photopolymerization initiator.

10. A colored curable composition according to claim 9; wherein the photopolymerization initiator contains at least one active halogen compound selected from a halomethyloxadiazole compound and a halomethyl-s-triazine compound, and at least one compound selected from the group consisting of a 3-aryl substituted coumarin compound, a lophine dimmer, a benzophenon compound, an acetophenon compound and derivatives thereof, a cyclopentadiene-benzene-iron complex and salts thereof, and an oxime compound.

11. A colored curable composition according to claim 9, wherein the photopolymerization initiator contains at least one compound that does not generate acids by decomposition.

12. A colored curable composition according to claim 9, wherein the photopolymerization initiator contains at least one compound selected from the group consisting of a lophine dimmer, a benzophenon compound, an acetophenon compound, an oxime compound, and a halomethyl-s-triazine compound.

13. A colored curable composition according to claim 2 further comprising a cross linking agent.

14. A color filter comprising a color layer containing at least one colored curable composition of claim 2.

15. A method of manufacturing a color filter, comprising:
coating the colored curable composition of claim 2 on a substrate, so as to form a color layer;
pattern exposing the color layer to light through a mask; and
developing the color layer to form a colored pattern.

16. A colored curable composition comprising a dye represented by the following formula (II):

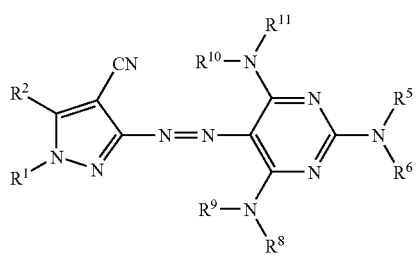

Formula (II)

wherein, in the formula (II), $R^1$ represents a heterocyclic group; $R^2$ represents a hydrogen atom or a substituent; $R^5$ and $R^6$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; $R^5$ and $R^6$ may be mutually bonded to form a 5-, 6-, or 7-membered ring; $R^8$, $R^9$, $R^{10}$, and $R^{11}$ each independently represent a hydrogen atom, an alkyl group, an alkenyl group, an alkynyl group, an aryl group, a heterocyclic group, an acyl group, an alkoxycarbonyl group, an aryloxycarbonyl group, a carbamoyl group, an alkylsulphonyl group, an arylsulphonyl group, or a sulfamoyl group; and $R^5$ and $R^6$, $R^8$ and $R^9$, and $R^{10}$ and $R^{11}$ may be mutually bonded to form a 5-, 6-, or 7-membered ring.

* * * * *